US012192691B2

(12) United States Patent
Hanna et al.

(10) Patent No.: US 12,192,691 B2
(45) Date of Patent: Jan. 7, 2025

(54) SPEAKER AND SHOWER

(71) Applicant: Kohler Co., Kohler, WI (US)

(72) Inventors: Kenneth Scott Hanna, Bellingham, WA (US); Michael James Soetaert, Sheboygan, WI (US); Keith Scott Ruh, Elkhart Lake, WI (US); William Clement Kuru, Plymouth, WI (US); Gregory de Swarte, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 18/489,200

(22) Filed: Oct. 18, 2023

(65) Prior Publication Data

US 2024/0048883 A1 Feb. 8, 2024

Related U.S. Application Data

(60) Continuation of application No. 17/500,348, filed on Oct. 13, 2021, now Pat. No. 11,832,042, which is a (Continued)

(51) Int. Cl.
*H04R 1/02* (2006.01)
*B05B 1/08* (2006.01)

(Continued)

(52) U.S. Cl.
CPC ............... *H04R 1/028* (2013.01); *B05B 1/08* (2013.01); *B05B 1/16* (2013.01); *B05B 1/18* (2013.01);

(Continued)

(58) Field of Classification Search
CPC ...... H02J 7/0042; H02J 7/0044; H02J 7/0045; H02J 7/0027; H02J 2310/22; H04R 1/028;

(Continued)

(56) References Cited

U.S. PATENT DOCUMENTS

| | | | |
|---|---|---|---|
| 1,947,407 | A | 2/1934 | Cornell, Jr. |
| 2,281,499 | A | 4/1942 | Herzbrun et al. |

(Continued)

FOREIGN PATENT DOCUMENTS

| | | |
|---|---|---|
| CN | 1500312 | 5/2004 |
| CN | 3618397 | 3/2007 |

(Continued)

OTHER PUBLICATIONS

International Search Report and Written Opinion for Application No. PCT/US2012/053953 dated Jan. 25, 2013 (10 pages).

(Continued)

*Primary Examiner* — Xu Mei

(74) *Attorney, Agent, or Firm* — Michael Best & Friedrich LLP

(57) ABSTRACT

An assembly including a speaker and a stand. The speaker including a speaker housing, speaker components supported in the speaker housing and operable to produce and audio output, and a rechargeable power source operable to power the speaker components. The stand being operable to support the speaker, the stand including a stand housing and a stand electrical circuit connectable to an external power source. The speaker and the stand are operable to perform a charging operation, the charging operation including the speaker supported on the stand and power supplied to the rechargeable power source. During the charging operation, the speaker components are operable to produce the audio output.

16 Claims, 47 Drawing Sheets

Related U.S. Application Data continuation of application No. 16/237,254, filed on Dec. 31, 2018, now Pat. No. 11,178,475, which is a division of application No. 16/002,397, filed on Jun. 7, 2018, now Pat. No. 10,171,900, which is a continuation of application No. 14/606,831, filed on Jan. 27, 2015, now Pat. No. 10,003,873, which is a continuation-in-part of application No. 14/470,761, filed on Aug. 27, 2014, now Pat. No. 10,945,059, and a continuation-in-part of application No. 14/200,540, filed on Mar. 7, 2014, now Pat. No. 9,095,862, and a continuation-in-part of application No. 13/605,587, filed on Sep. 6, 2012, now abandoned, said application No. 14/200,540 is a continuation of application No. 13/605,587, filed on Sep. 6, 2012, now abandoned, said application No. 14/470,761 is a continuation-in-part of application No. 13/605,587, filed on Sep. 6, 2012, now abandoned.

(60) Provisional application No. 61/932,020, filed on Jan. 27, 2014, provisional application No. 61/871,054, filed on Aug. 28, 2013, provisional application No. 61/637,009, filed on Apr. 23, 2012, provisional application No. 61/631,912, filed on Jan. 13, 2012, provisional application No. 61/573,448, filed on Sep. 6, 2011.

(51) Int. Cl.

| | |
|---|---|
| ***B05B 1/16*** | (2006.01) |
| ***B05B 1/18*** | (2006.01) |
| ***B05B 7/04*** | (2006.01) |
| ***E03C 1/04*** | (2006.01) |
| ***F21V 33/00*** | (2006.01) |

(52) U.S. Cl.

CPC ............ *B05B 1/185* (2013.01); *E03C 1/0408* (2013.01); *F21V 33/004* (2013.01); *F21V 33/0056* (2013.01); *B05B 7/0416* (2013.01); *H04R 1/021* (2013.01); *H04R 1/026* (2013.01); *H04R 2201/021* (2013.01); *H04R 2201/025* (2013.01); *H04R 2201/029* (2013.01); *H04R 2420/07* (2013.01); *H04R 2430/01* (2013.01); *H04R 2499/10* (2013.01)

(58) Field of Classification Search

CPC ................ H04R 1/1025; H04R 1/1033; H04R 2499/10; H04R 29/00; H04R 29/001; H04R 29/003

USPC .... 381/58, 59, 334, 384, 386, 394; 320/107, 320/108, 111, 114, 115

See application file for complete search history.

(56) References Cited

U.S. PATENT DOCUMENTS 3,710,224 A 1/1973 Daniels
4,121,741 A 10/1978 Adamson
4,468,321 A 8/1984 St. John
4,478,367 A 10/1984 Petursson
4,964,181 A 10/1990 Alpret
D326,854 S 6/1992 Terk et al.
5,140,254 A 8/1992 Katzman
D329,233 S 9/1992 Miura
5,165,395 A * 11/1992 Ricci .................. A41D 13/1146 55/DIG. 35
5,228,625 A 7/1993 Grassberger
5,329,650 A 7/1994 Zaccai et al.
5,647,007 A 7/1997 Wooderson et al.
5,664,015 A 9/1997 Ford et al.
5,868,439 A 2/1999 Schmidt
6,021,960 A 2/2000 Kehat
6,061,457 A 5/2000 Stockhamer
6,135,408 A 10/2000 Richter
6,182,910 B1 2/2001 Huen
D440,277 S 4/2001 Slothower
D440,278 S 4/2001 Slothower
6,446,278 B1 9/2002 Lin
6,473,979 B2 11/2002 Lu
6,509,716 B2 1/2003 Yi
D495,776 S 9/2004 Blomstrom
6,823,536 B2 11/2004 Yip
D500,839 S 1/2005 Blomstrom
6,879,818 B2 4/2005 Wageneck
6,892,952 B2 5/2005 Chang et al.
D507,820 S 7/2005 Blomstrom
D511,810 S 11/2005 Hanna
D524,412 S 7/2006 Blomstrom
D526,308 S 8/2006 Kasden
D530,308 S 10/2006 Topping
7,242,165 B2 7/2007 Lee et al.
7,269,862 B2 9/2007 Rooke et al.
D559,357 S 1/2008 Wang
D560,273 S 1/2008 Hanna
7,412,206 B1 8/2008 Hutchings et al.
7,611,073 B2 11/2009 Crutcher
7,711,316 B2 5/2010 Bae
D618,303 S 6/2010 Zhang
D619,202 S 7/2010 Zhang
D619,218 S 7/2010 Lee
7,753,079 B2 7/2010 Nelson
7,761,937 B2 7/2010 Foutz et al.
D633,078 S 2/2011 Lewis
D634,810 S 3/2011 Yoo et al.
7,906,936 B2 3/2011 Azancot et al.
7,909,061 B2 3/2011 Nelson
D652,106 S 1/2012 Yoo
D678,468 S 3/2013 Hanna
8,627,850 B1 1/2014 Booker
8,702,018 B1 4/2014 Rivera
D707,329 S 6/2014 Hanna et al.
8,855,354 B2 10/2014 He
9,088,640 B2 7/2015 Staebler
9,095,862 B2 8/2015 Hanna et al.
9,143,861 B2 9/2015 Schul
9,584,892 B2 * 2/2017 Berkman ............... H04R 1/028
9,735,587 B2 8/2017 Niizuma
10,003,873 B2 * 6/2018 Hanna ................... E03C 1/0408
10,171,900 B2 * 1/2019 Hanna ................... F21V 33/004
10,296,040 B2 5/2019 Park et al.
10,298,037 B2 5/2019 Wang et al.
11,178,475 B2 * 11/2021 Hanna ....................... B05B 1/16
11,387,792 B2 * 7/2022 Little ........................ H03F 3/20
11,832,042 B2 * 11/2023 Hanna ................... E03C 1/0408
2003/0041372 A1 3/2003 Yang
2003/0125842 A1 7/2003 Chang et al.
2003/0211838 A1 11/2003 Wageneck
2003/0232530 A1 12/2003 Vista, Jr. et al.
2004/0078891 A1 4/2004 Yip
2004/0255377 A1 12/2004 Mueller et al.
2006/0283511 A1 12/2006 Nelson
2007/0022528 A1 2/2007 Gilbert
2007/0055116 A1 * 3/2007 Clark .................. A61B 5/0002 600/300
2009/0007330 A1 1/2009 Genord et al.
2009/0031492 A1 2/2009 Foutz et al.
2009/0041267 A1 2/2009 Lee et al.
2009/0052721 A1 * 2/2009 Dabrowski ............ A61C 17/22 381/386
2009/0156249 A1 6/2009 Ruckart
2009/0245567 A1 10/2009 Egyud et al.
2009/0323761 A1 12/2009 Tsai
2010/0043135 A1 2/2010 Patterson et al.
2010/0102182 A1 4/2010 Lin
2010/0170588 A1 7/2010 Nelson
2010/0213278 A1 8/2010 Zan
2010/0237166 A1 9/2010 Nelson
2011/0031331 A1 2/2011 Klicpera
2011/0067815 A1 3/2011 Iizuka et al.
2011/0162743 A1 7/2011 Nelson

(56) References Cited

U.S. PATENT DOCUMENTS

| | | | | |
|---|---|---|---|---|
| 2011/0210188 | A1 | 9/2011 | Yao et al. | |
| 2011/0244973 | A1 | 10/2011 | Brown et al. | |
| 2012/0042973 | A1 | 2/2012 | Ko | |
| 2013/0062437 | A1 | 3/2013 | Hanna | |
| 2013/0279724 | A1 | 10/2013 | Stafford et al. | |
| 2014/0183279 | A1 | 7/2014 | Hanna et al. | |
| 2014/0241555 | A1* | 8/2014 | Terlizzi | H04B 1/385 320/108 |
| 2014/0314265 | A1 | 10/2014 | Freund | |
| 2017/0215004 | A1 | 7/2017 | Wengreen | |

FOREIGN PATENT DOCUMENTS

| | | |
|---|---|---|
| CN | 3637897 | 4/2007 |
| CN | 300718588 | 12/2007 |
| CN | 300755086 | 3/2008 |
| CN | 300822364 | 8/2008 |
| CN | 300991690 | 8/2009 |
| CN | 300997525 | 9/2009 |
| CN | 301006088 | 9/2009 |
| CN | 301063028 | 11/2009 |
| CN | 301067033 | 11/2009 |
| CN | 301130555 | 2/2010 |
| CN | 101689047 | 3/2010 |
| CN | 201470506 | 5/2010 |
| CN | 301238499 | 5/2010 |
| CN | 301264979 | 6/2010 |
| CN | 301410164 | 12/2010 |
| CN | 301605047 | 7/2011 |
| CN | 301626438 | 7/2011 |
| CN | 301914213 | 5/2012 |
| CN | 102572054 | 7/2012 |
| CN | 102792665 | 11/2012 |
| CN | 202516713 | 11/2012 |
| CN | 103152465 | 6/2013 |
| CN | 203635370 | 6/2014 |
| DE | 4242034 | 3/1994 |
| EP | 1958700 | 8/2008 |
| EP | 2218512 | 8/2010 |
| JP | 200818922 | 5/2009 |
| KR | 3020080026963 | 2/2009 |
| WO | 2007051367 | 5/2007 |
| WO | DM/070414 | 8/2008 |
| WO | CM/070423 | 1/2009 |
| WO | 2009051347 | 4/2009 |
| WO | 2009080079 | 7/2009 |
| WO | 2012010072 | 1/2012 |

OTHER PUBLICATIONS

Notice of Allowance from the United States Patent and Trademark Office for U.S. Appl. No. 29/418,868 dated Oct. 23, 2012 (6 pages).
Smartak Audio Wireless Waterproof Shower Speaker with Dock Transmitter known at least sa early as Jul. 12, 2011.
Sangean Digital Shower Radio known at least as early as Jul. 12, 2011.
Sony AM/FM/Weather Shower DC Clock Radio known at least as early as Jul. 12, 2011.
Notification of First Office Action from The State Intellectual Property Office of the People's Republic of China for Application No. 201430121787.8 dated Jul. 1, 2014 (3 pages).
Evaluation Report of Design Patent from the State Intellectual Property Office of the People's Republic of China for Application No. ZL201330110255.X dated Jan. 2, 2014 (22 pages).
Evaluation Report of Design Patent from the State Intellectual Property Office of the People's Republic of China for Application No. ZL201330110628.3 dated Jan. 2, 2014 (20 pages).
Evaluation Report of Design Patent from the State Intellectual Property Office of the People's Republic of China for Application No. ZL201230426055.0 dated Dec. 27, 2013 (24 pages).
Search Report and Written Opinion from the Intellectual Property Office of the United Kingdom for Application No. 14152136 dated Mar. 2, 2015 (3 pages).
Extended European Search Report for Application No. 12830807.9 dated May 4, 2015 (5 pages).
Office Action from The State Intellectual Property Office of the People's Republic of China for Application No. 201280009728.X dated Jul. 13, 2015 (13 pages).
Notice of Allowance from the United States Patent and Trademark Office for U.S. Appl. No. 14/200,540 dated Jun. 5, 2015 (15 pages).
Extended European Search Report from the European Patent Office for Application No. 15152751.2 dated Jun. 30, 2015 (8 pages).
Office Action from the United States Patent and Trademark Office for U.S. Appl. No. 29/514,526 dated Dec. 9, 2015 (7 pages).
Office Action from the United States Patent and Trademark Office for U.S. Appl. No. 29/514,525 dated Dec. 7, 2015 (7 pages).
Search Report from the United Kingdom Intellectual Property Office for Application No. GB1415213.6 dated May 6, 2016 (3 pages).
Final Office Action from the United States Patent and Trademark Office for U.S. Appl. No. 13/605,587 dated Aug. 5, 2016 (12 pages).
Extended European Search Report from the European Patent Office for Application No. 16173829.9 dated Sep. 16, 2016 (6 pages).
Third Office Action with English translation from the State Intellectual Property Office of the People's Republic of China for Application No. 201280009728.X dated Sep. 23, 2016 (17 pages).
Office Action from the United States Patent and Trademark Office for U.S. Appl. No. 14/606,831 dated Jan. 5, 2017 (11 pages).
Office Action from the United States Patent and Trademark Office for U.S. Appl. No. 14/470,761 dated Oct. 25, 2016 (10 pages).
First Office Action from the State Intellectual Property Office of the People's Republic of China for Application No. 201510041205.9 dated Mar. 27, 2017 (9 pages).
Office Action from the United States Patent Office for U.S. Appl. No. 29/548,511 dated Apr. 12, 2017 (6 pages).
Final Office Action from the United States Patent and Trademark Office for U.S. Appl. No. 14/606,831 dated Aug. 9, 2017 (12 pages).
Office Action from the United States Patent and Trademark Office for U.S. Appl. No. 14/470,761 dated Oct. 18, 2017 (13 pages).
Office Action from the United States Patent and Trademark Office for U.S. Appl. No. 15/345,210 dated Oct. 18, 2017 (9 pages).
Office Action from the United States Patent and Trademark Office for U.S. Appl. No. 15/345,210 dated Apr. 25, 2018 (13 pages).
Office Action from the United States Patent and Trademark Office for U.S. Appl. No. 14/470,761 dated Apr. 19, 2018 (15 pages).
Chinese Patent Office Action for Application No. 201510041205.9 dated Jun. 5, 2018 (9 pages, English translation included).
Chinese Patent Office Action for Application No. 201280009728.X dated Apr. 28, 2018 (13 pages, statement of relevance included).
Chinese Patent Office Notice of Reexamination for Application No. 201280009728.X dated Jan. 13, 2021 (12 pages, statement of relevance included).
Chinese Patent Office Action for Application No. 201510041205.9 dated Feb. 12, 2019 (15 pages, English translation included).
United States Patent Office Notice of Allowance for U.S. Appl. No. 29/628,544 dated Apr. 11, 2019 (6 pages).
European Patent Office Action for Application No. 16173829.9 dated Apr. 18, 2019 (7 pages).
European Patent Office Action for Application No. 16173829.9 dated Feb. 26, 2020 (9 pages).
United States Patent Office Action for U.S. Appl. No. 14/470,761 dated Apr. 19, 2019 (15 pages).
United Kingdom Patent Office Examination Report for Application No. GB1415213.6 dated Dec. 2, 2019 (3 pages).
United States Patent Office Action for U.S. Appl. No. 14/470,761 dated Jun. 1, 2020 (15 pages).
United States Patent Office Notice of Allowance for U.S. Appl. No. 15/345,210 dated Jun. 12, 2020 (10 pages).
United States Patent Office Action for U.S. Appl. No. 16/237,254 dated Oct. 15, 2020 (10 pages).
United States Patent Office Notice of Allowance for U.S. Appl. No. 14/470,761 dated Nov. 2, 2020 (8 pages).
Chinese Patent Office Action for Application No. 201280009728.X dated Jul. 8, 2021 (26 pages, Statement of Relevance included).

(56) References Cited

OTHER PUBLICATIONS

Chinese Patent Office Action for Application No. 202110362019.0 dated Sep. 7, 2022 (9 pages, including an English translation).

* cited by examiner

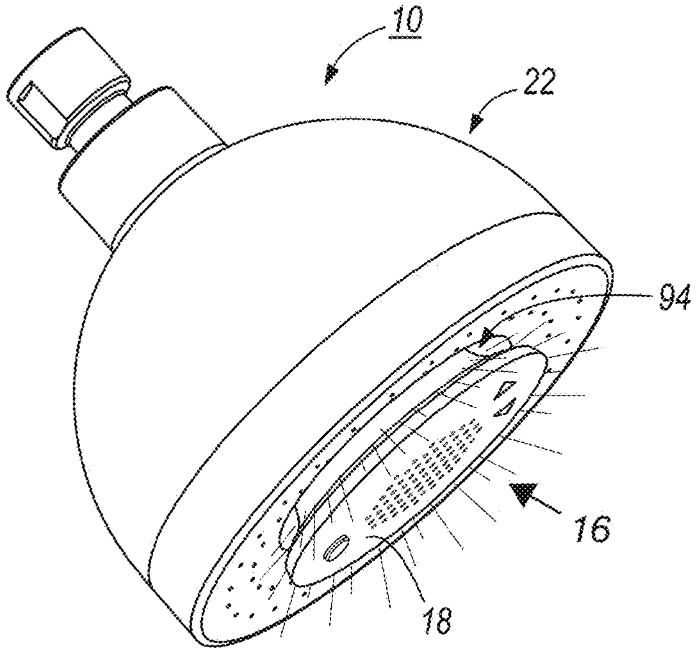
FIG. 11A
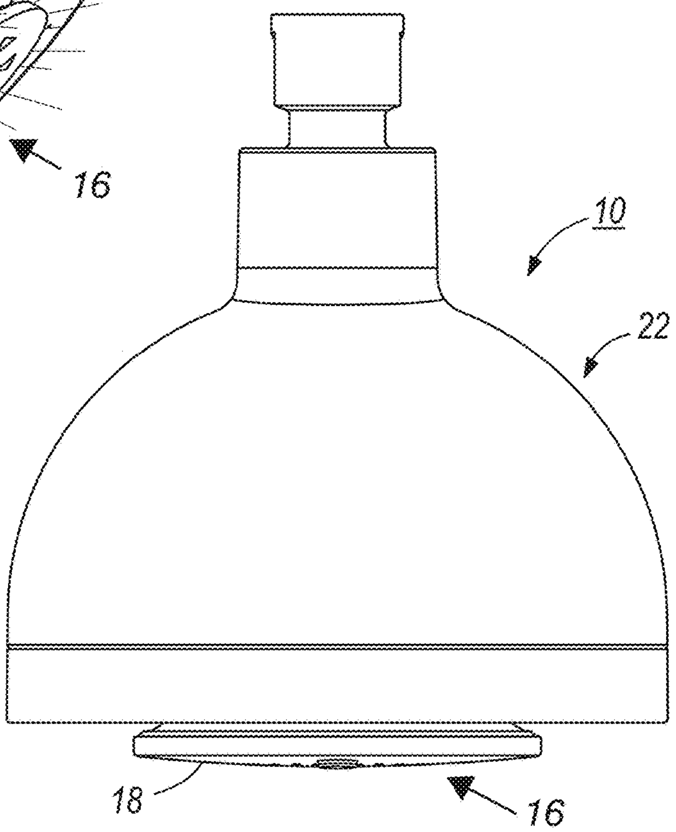
FIG. 11B
FIG. 12A
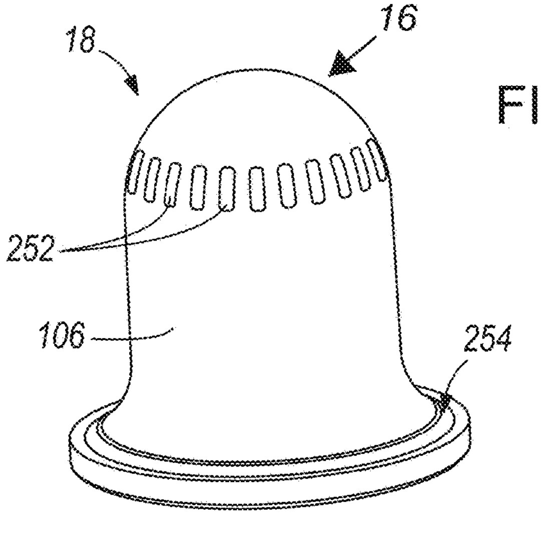
FIG. 12B
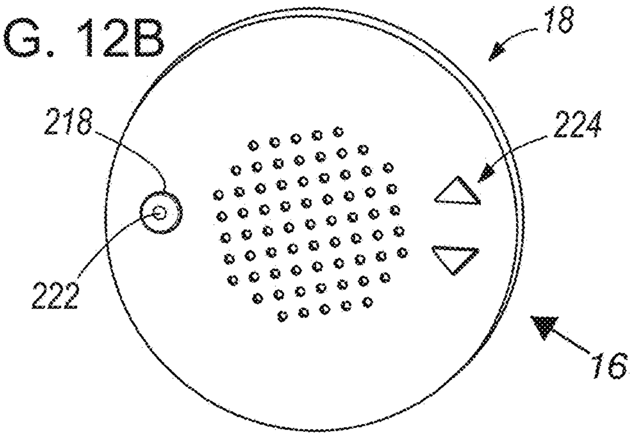

SPEAKER AND SHOWER

RELATED APPLICATIONS

The present application is a continuation application of U.S. patent application Ser. No. 17/500,348, filed Oct. 13, 2021, which is a continuation of U.S. patent application Ser. No. 16/237,254, filed Dec. 31, 2018, which is a divisional application of U.S. patent application Ser. No. 16/002,397, filed Jun. 7, 2018, now U.S. Pat. No. 10,171,900, which is a continuation of U.S. patent application Ser. No. 14/606,831, filed Jan. 27, 2015, now U.S. Pat. No. 10,003,873, which claims priority to U.S. Provisional Patent Application No. 61/932,020, filed Jan. 27, 2014, is a continuation-in-part of U.S. patent application Ser. No. 13/605,587, filed Sep. 6, 2012, which claims priority to U.S. Patent Application No. 61/573,448, filed Sep. 6, 2011, to U.S. Patent Application No. 61/631,912, filed Jan. 13, 2012, and to U.S. Patent Application No. 61/637,009, filed Apr. 23, 2012, is a continuation-in-part of U.S. patent application Ser. No. 14/470,761, filed Aug. 27, 2014, now U.S. Pat. No. 10,945,059, which claims priority to U.S. Patent Application No. 61/871,054, filed Aug. 28, 2013, and which is a continuation-in-part of U.S. patent application Ser. No. 13/605,587, and is a continuation-in-part of U.S. patent application Ser. No. 14/200,540, filed Mar. 7, 2014, now U.S. Pat. No. 9,095,862, which is a continuation of U.S. patent application Ser. No. 13/605,587, and the entire contents of all of which are hereby incorporated by reference.

FIELD

The present invention generally relates to speakers and showers and, more particularly, to an assembly of a shower device and a second device, such as a speaker, a light source, etc.

SUMMARY

In one independent embodiment, an assembly may generally include a speaker including a speaker housing, and speaker components supported in the speaker housing and operable to produce an audio output; a sensor operable to sense an orientation of the speaker housing; and control components operable to determine the orientation of the speaker housing, and control the speaker components based on the orientation of the speaker housing.

The sensor may be supported in the speaker housing. The sensor may include an accelerometer. The sensor may be a first sensor element of a sensor assembly, and the sensor assembly may also include a second sensor element external to the speaker housing.

The assembly may further comprise a support operable to support the speaker, the second sensor element being supported on the support. The support may include a shower device. The shower device may include a shower device housing defining a receptacle, and the speaker may be supportable in the receptacle. The speaker housing is supported for movement relative to the support.

The sensor assembly may sense the relative orientation of the first sensor element and the second sensor element. The control components may be operable to determine the orientation of the speaker housing by determining the relative orientation of the first sensor element and the second sensor element, and the control components may be operable to control the speaker components based on the relative orientation of the first sensor element and the second sensor element.

One of the first sensor element and the second sensor element may include a Hall effect sensor element, and the other of the first sensor element and the second sensor element may include a magnet. The other of the first sensor element and the second sensor element may include a plurality of magnets spaced apart on an associated one of the speaker housing and the support.

The control components may be at least partially supported in the speaker housing. The assembly may further comprise a power source supported in the speaker housing and operable to power the speaker components.

The control components may be operable to determine a change in orientation of the speaker housing, and control the speaker components based on the change in orientation of the speaker housing.

The speaker components may be operable to produce an audio output at a volume, and the control components may be operable to control the speaker components to control the volume of the audio output based on the orientation of the speaker housing. The speaker components may be operable to selectively and alternatively output one of a first audio track and a second audio track, and the control components may be operable to control one of a first audio track and a second audio track to be output by the speaker components based on the orientation of the speaker housing.

In another independent embodiment, a shower and speaker assembly may generally include a shower device including a shower device housing defining an inlet and an outlet in fluid communication with the inlet; and a speaker supported by the shower device housing, the speaker including a speaker housing, speaker components supported in the speaker housing and operable to produce an audio output, a touch sensor engageable by a user, and control components operable to control the speaker components based on user input from the touch sensor.

The touch sensor may include a capacitive touch sensor. The touch sensor may include a resistive touch sensor. The shower device housing may define a receptacle, the outlet including a plurality of nozzles arranged in an annular ring about the receptacle, and the speaker may be supportable in the receptacle.

In yet another independent embodiment, an assembly may generally include a speaker including a speaker housing, speaker components supported in the speaker housing and operable to produce an audio output, a rechargeable power source operable to power the speaker components, and a secondary coil; and a stand operable to support the speaker, the stand including a stand housing, and a primary coil connectable to an external power source. The speaker and the stand are operable to perform a charging operation, the charging operation including the speaker supported on the stand and power supplied to the rechargeable power source through the primary coil and the secondary coil. During the charging operation, the speaker components are operable to produce the audio output.

The speaker may further include a speaker electrical contact, and a circuit electrically connected between the rechargeable power source and the speaker electrical contact, and the assembly may further include a power cord removably, selectively and alternatively connectable to the stand to electrically connect the external power source to the primary coil and to the speaker electrical contact to electrically connect the external power source to the circuit to charge the rechargeable power source.

In a further independent embodiment, an assembly may generally include a multi-mode shower device including a shower device housing defining an inlet connectable to a water supply and a housing port in fluid communication with the inlet, the shower device housing defining a receptacle, and a spray engine supported by the shower device housing and operable to change a mode of the shower device between a first shower mode and a second shower mode different than the first shower mode, the spray engine defining a first engine inlet in fluid communication with a first outlet and a second engine inlet in fluid communication with a second outlet, in the first shower mode, the housing port being in fluid communication with the first engine inlet, in the second shower mode, the housing port being in fluid communication with the second engine outlet; and a speaker supportable by the shower device housing in the receptacle, the speaker including a speaker housing, and speaker components supported in the speaker housing and operable to produce an audio output.

The spray engine may be pivotable relative to the shower device housing to change the mode of the shower device. The spray engine may be pivotable relative to the receptacle.

In another independent embodiment, a shower and speaker assembly may generally include a shower device including a shower device housing defining an inlet and an outlet in fluid communication with the inlet, the shower device housing defining a receptacle; and a speaker supported by the shower device housing in the receptacle, the speaker including a speaker housing assembly including a speaker face and a housing body having an end opposite the speaker face, speaker components supported in the speaker housing and operable to produce an audio output through the speaker face, control components operable to control the speaker components based on user input, and an input component operable by a user, the input component being arranged on the speaker to be positioned in the receptacle when the speaker is supported by the shower device housing.

The housing body may include a front housing portion and a rear housing portion movable relative to the front portion to provide the input component. The control components may be operable to control the speaker components based on relative movement between the front housing portion and the rear housing portion.

The speaker housing assembly may include an intermediate part connected between the front housing portion and the rear housing portion. The intermediate part may be flexible to allow relative movement between the front housing portion and the rear housing portion.

The input component may include a button. The button may be supported on the speaker housing assembly.

In yet another independent embodiment, an assembly may generally include a shower device including a shower device housing defining an inlet and an outlet in fluid communication with the inlet; and a speaker including a speaker housing, and speaker components supported in the speaker housing and operable to produce an audio output; and control components operable to determine a characteristic of the assembly, and control the speaker components based on the characteristic.

The characteristic may include one of content of the audio output, a mode of the shower device and ambient noise. The speaker components may be operable to produce an audio output at a volume, and the control components may be operable to control the speaker components to control the volume of the audio output based on the characteristic.

The assembly may further include a microphone. The control components may be operable to determine one of mode of the shower device and the ambient noise through the microphone.

In a further independent embodiment, an assembly may generally include a shower device including a shower device housing defining an inlet and an outlet in fluid communication with the inlet, a valve assembly operable to control flow through the outlet; a speaker including a speaker housing, and speaker components supported in the speaker housing and operable to produce an audio output; and control components operable to determine one of content of the audio output and a mode of the speaker, and control the valve assembly to adjust the flow based on the one of the content and the mode.

The valve assembly may include a solenoid-controlled valve assembly. The valve assembly may be operable to control the flow between a maximum flow and a minimum flow. The minimum flow may be no flow.

In another independent embodiment, an assembly may generally include a speaker including a speaker housing, speaker components supported in the speaker housing and operable to produce an audio output, and a rechargeable power source operable to power the speaker components; and a stand operable to support the speaker, the standing including a stand housing, and a stand electrical circuit connectable to an external power source. The speaker and the stand are operable to perform a charging operation, the charging operation including the speaker supported on the stand and power supplied to the rechargeable power source. During the charging operation, the speaker components are operable to produce the audio output.

In another independent embodiment, an assembly may generally include a speaker including a speaker housing, speaker components supported in the speaker housing and operable to produce an audio output, a rechargeable power source operable to power the speaker components, a speaker electrical contact, and a circuit electrically connected between the rechargeable power source and the speaker electrical contact; and a stand operable to support the speaker, the stand including a stand housing, and a stand electrical contact connectable to an external power source. When the speaker is supported on the stand, the speaker electrical contact may be electrically connected to the stand electrical contact, and current may be suppliable from the external power source to charge the rechargeable power source.

The speaker may further include a second speaker electrical contact, the circuit electrically connecting the second speaker electrical contact to the rechargeable power source. The assembly may further comprise a power cord removably, selectively and alternatively connectable to the stand to electrically connect the external power source to the stand electrical contact and to the second speaker electrical contact to electrically connect the external power source to the circuit to charge the rechargeable power source.

Independent features and independent advantages of the invention may become apparent to those skilled in the art upon review of the detailed description, claims and drawings.

BRIEF DESCRIPTION OF THE DRAWINGS

FIGS. 11A-11B are views of yet another alternative construction of a shower assembly.

FIGS. 12A-12B are views of a second device, such as a speaker, shown in FIGS. 11A-11B, removed from the shower device.

DETAILED DESCRIPTION

Figure 1A:
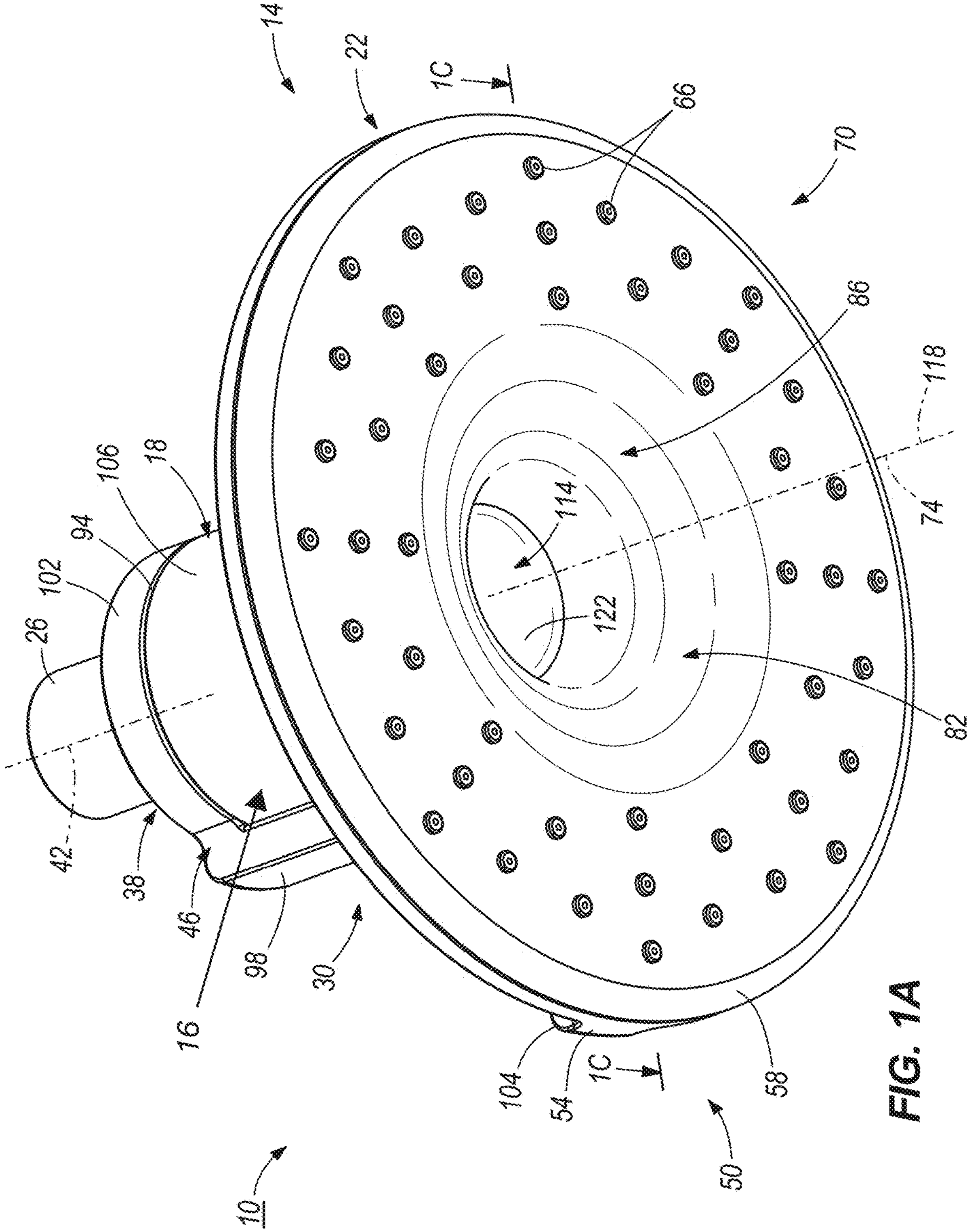
FIGS. 1A-1D are views of a shower assembly.
Figure 1B:
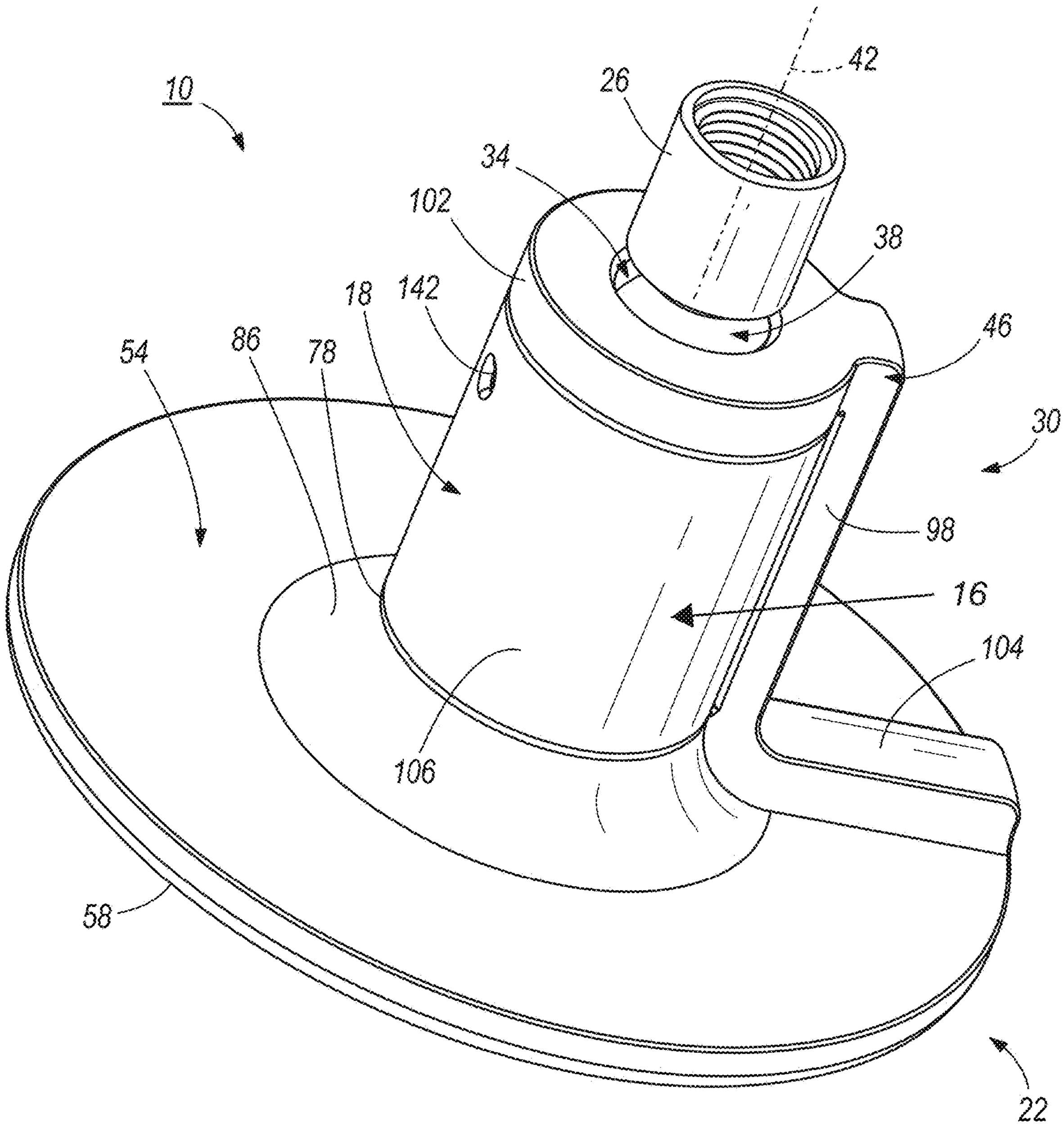

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

A shower assembly 10 is shown in FIGS. 1A-1D. The assembly 10 generally includes a shower device 14 and a second device 16, such as an entertainment device (e.g., a speaker 18, a display, a bubble blower, etc.), a light source, a time keeping device (e.g., a clock, a timer), a dispenser (e.g., of shampoo, soap, aroma, essential oils, softeners, purifiers, etc.) or a combination of such devices.

In the illustrated construction, the shower device 14 includes a showerhead 22. In other constructions (not shown), the assembly 10 may include another shower device having a configuration different than the showerhead 22, such as, for example, a different type of showerhead, a rain can, a hand shower, a wall-mounted water tile, etc., with the second device.

The showerhead 22 includes an inlet connector 26 for threaded connection to a water supply pipe (not shown) of a water supply (e.g., household/residential, commercial, etc.). The showerhead 22 also includes a housing 30, and a ball joint 34 is provided between the housing 30 and the inlet connector 26. The housing 30 has an inlet 38 extending along an inlet axis 42. A waterway 46 extends from the inlet 38 to a showerhead outlet assembly 50.

The outlet assembly 50 includes a back plate 54 and a face plate 58 defining an annular outlet chamber 62 communicating with the waterway 46. Nozzles or outlets 66 are provided on the face plate 58. Water flows through the outlets 66 to define a curtain or envelope 70 (partially shown in FIG. 1A) of water. The illustrated envelope 70 of water is generally conical (extending along an outlet axis 74) and surrounds an open center. The envelope 70 may have other shapes.

The plates 54, 58 define aligned central openings 78, 82, respectively, such that the outlet assembly 50 has a generally annular, doughnut shape. A flared surface 86 extends from the opening 78 to a plane 90 of the face plate 58. In the illustrated construction, the plane 90 is aligned with a front surface of the face plate 58, and the outlets 66 project forwardly of the plane 90.

The housing 30 defines a receptacle 94 for the second device 16. In the illustrated construction, the receptacle 94 is provided along the inlet and outlet axes 42, 74. To accommodate the receptacle 94, the waterway 46 includes a diverted portion 98. The housing 30 defines an inlet chamber 102 behind the receptacle 94, and the diverted portion 98 communicates between the chambers 102, 62. The front wall of the inlet chamber 102 provides a back wall of the receptacle 94. The peripheral surface around the opening 78 in the back plate 54 provides a front surface of the receptacle 94. The outer wall of the diverted portion 98 provides a lateral wall of the receptacle 94. A radial portion 104, formed with the diverted portion 98, extends radially along the back plate 54.

The second device 16 is supported by the showerhead housing 30 and includes a housing 106, in the illustrated construction, removably supportable in the receptacle 94. In other constructions, the second device 16 may not be removable from the shower device 14 (e.g., formed with the shower device 14 as a unit, formed separately and then non-removably attached to the shower device 14, etc.).

The housing 106 defines a container for components/materials associated with the second device 16 (e.g., power components 138, output components 110, material to be dispensed, etc.). With a speaker 18, the housing 106 supports speaker components 110 for producing an output (e.g., audio, sound, etc.) through an outlet 114 along an output axis

118. The speaker 18 is supported in the receptacle 94 with the output axis 118 aligned and co-axial with the outlet axis 74 to project sound through the openings 78, 82.

A sound permeable and substantially water impermeable cover or screen 122 covers the speaker outlet 114. The speaker outlet 114 is arranged in a plane 126, and, in the illustrated construction, the speaker plane 126 is recessed from the plane 90 of the face plate 58 which may also inhibit water from entering the speaker 18.

As shown in FIG. 1A, the outlets 66 surround the output of the second device 16 (the speaker outlet 114). The outlets 66 are arranged in multiple rings on the face plate 58 about the periphery of the speaker outlet 114. The resulting envelope 70 has multiple layers surrounding the output of the second device 16 (e.g., the speaker 18). The face plate 58 and other components of the showerhead 22 may be formed of a material, such as hard plastic, silicone, etc., which may enhance the sound output of the speaker 18.

The illustrated showerhead 22 is designed for use with the second device 16 to enhance the output by the second device 16 (e.g., sound output of the speaker 18) and/or the experience of the user. For example, components of the illustrated showerhead 22 may have a shape and/or construction (e.g., the flared surface 86, the output/pattern of the outlets 66, etc.), may operate (e.g., the envelope 70 resulting from the water flow) and/or may be formed of materials to obtain or promote the desired output/experience. Other design factors (e.g., the combination of the showerhead 22 and the second device 16, materials of the shower enclosure (e.g., a soft tray to reduce the sound of water hitting the floor surface), etc.) may also be considered.

Figure 1C:
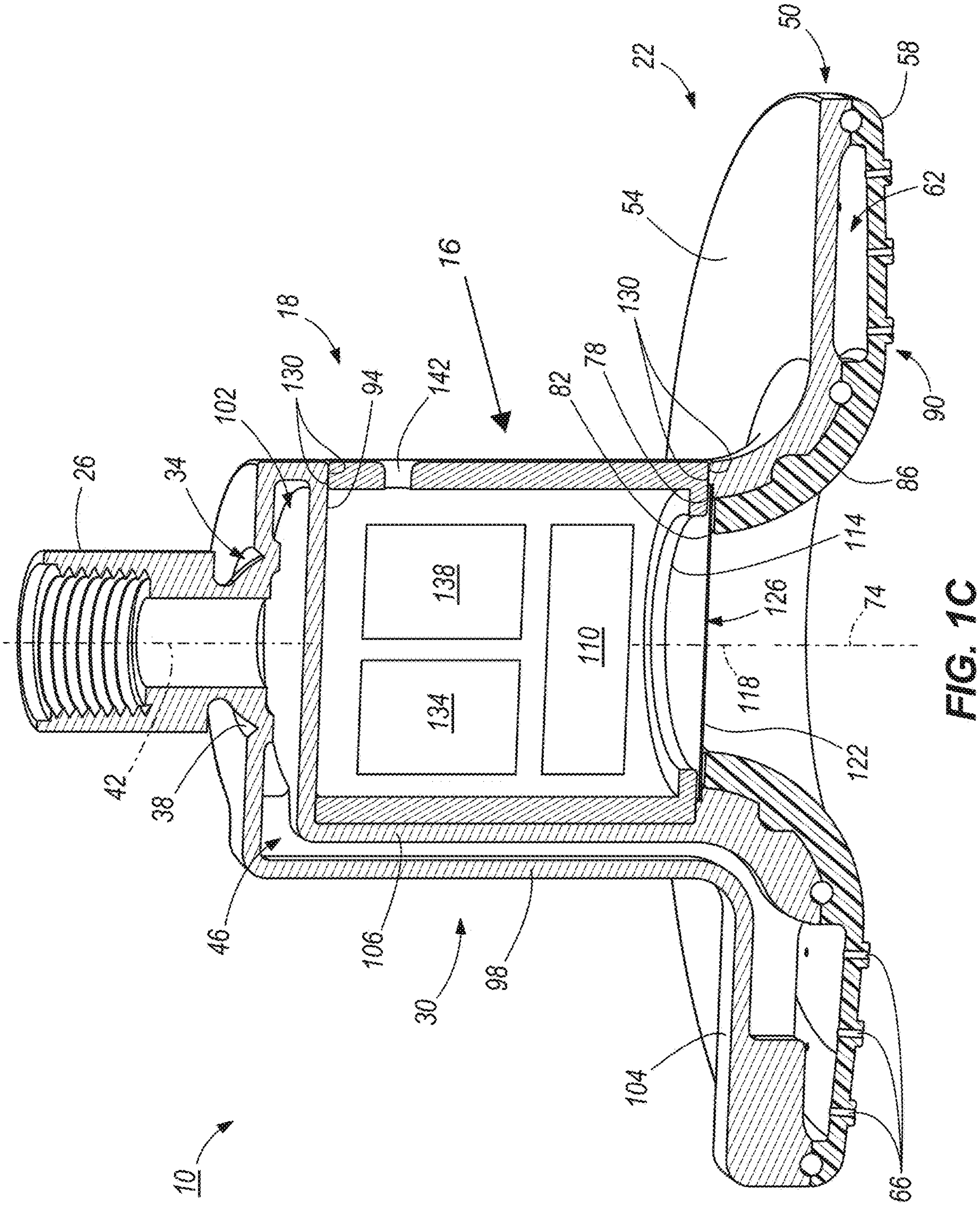

The second device 16 is positioned co-axially with the inlet 38 and the outlets 66 of the showerhead 22. As shown in FIG. 1C, in the illustrated construction, water is axially behind (in the inlet chamber 102) the second device 16. Water is diverted around the second device 16 through the diverted portion 98.

Figure 1D:
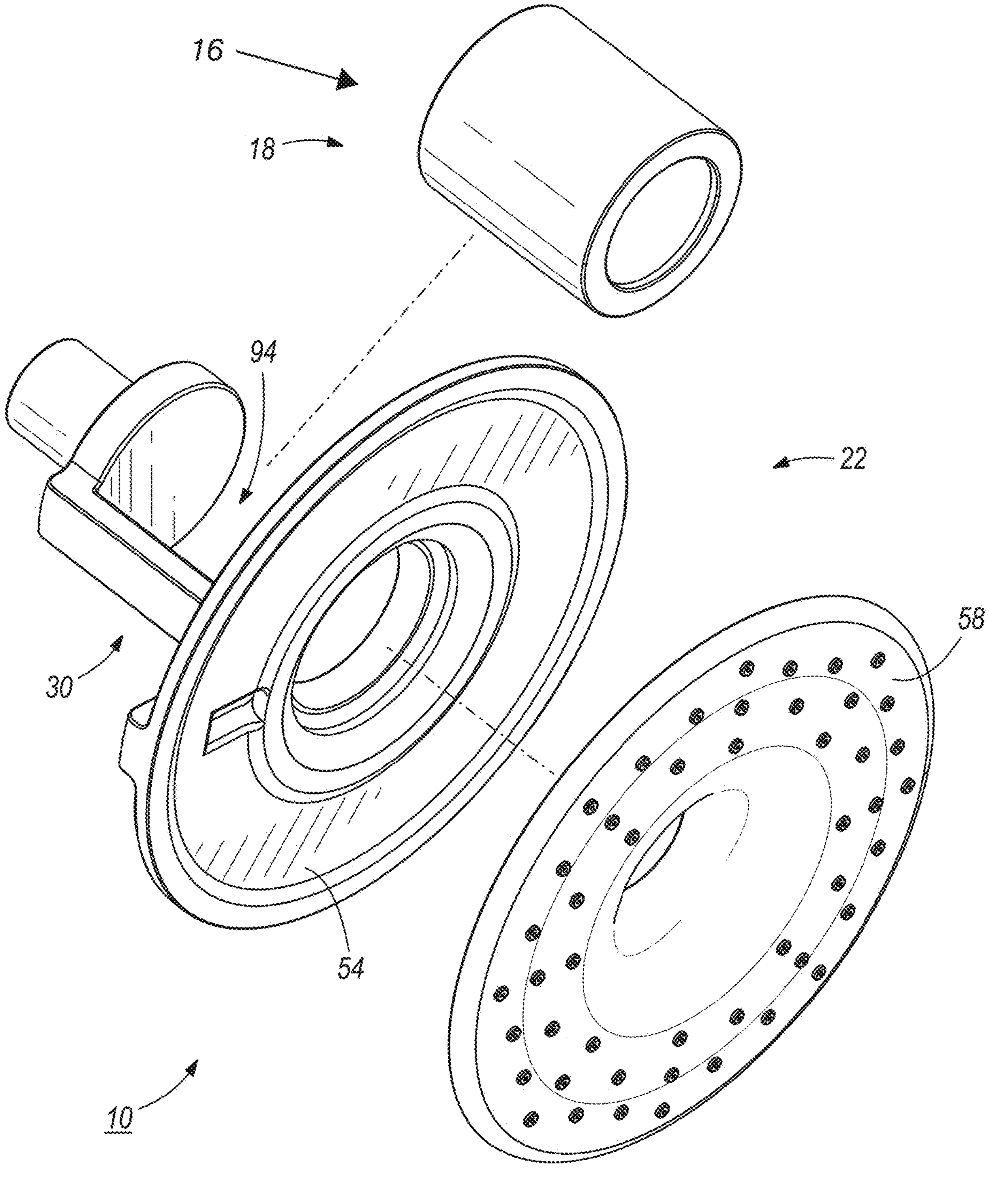

In the illustrated construction, the second device 16 is removably supported by the showerhead housing 30. The second device 16 is inserted into and removed from the receptacle 94 without tools. As shown in FIG. 1D, the second device 16 is inserted laterally (transverse to the outlet axis 74) into the receptacle 94. Also, the second device 16 is connected to the housing 30 behind the back plate 54.

Connecting structure 130 is provided between the second device 16 and the shower device 14 (e.g., between the speaker housing 106 and the showerhead housing 30) to removably connect the housings 106, 30. The connecting structure 130 may include frictional engagement between one or more of the walls of the receptacle 94 and the housing 106 (e.g., a friction fit). Material (not shown) with enhanced frictional properties may be provided on the engaging surfaces. Force-applying structure (not shown) may be provided to increase or augment the frictional force. Such structure may include a flexible "clamping" arrangement of components of the showerhead housing 30 (e.g., the spaced-apart diverted portions 98A of the waterway 46A shown in FIG. 2), magnetic connecting structure (discussed below), etc.

The connecting structure 130 may include inter-engaging connecting members (not shown), such as one or more projections and recesses, rails and grooves, etc. The connecting structure 130 may include positive engagement structure (not shown) to lock the second device 16 to the showerhead housing 30. For example, a movable locking member (not shown; e.g., a projection) may limit movement of the housing 106 from the receptacle 94. A user moves the locking member (through direct engagement, a remote actuator, etc.) to allow the second device 16 to be removed. The locking member may allow insertion of the second device 16 into the receptacle without movement of the locking member by the user (e.g., an angled surface on the locking member is engaged by the housing 106 to move the locking member out of the way).

Figure 8B:
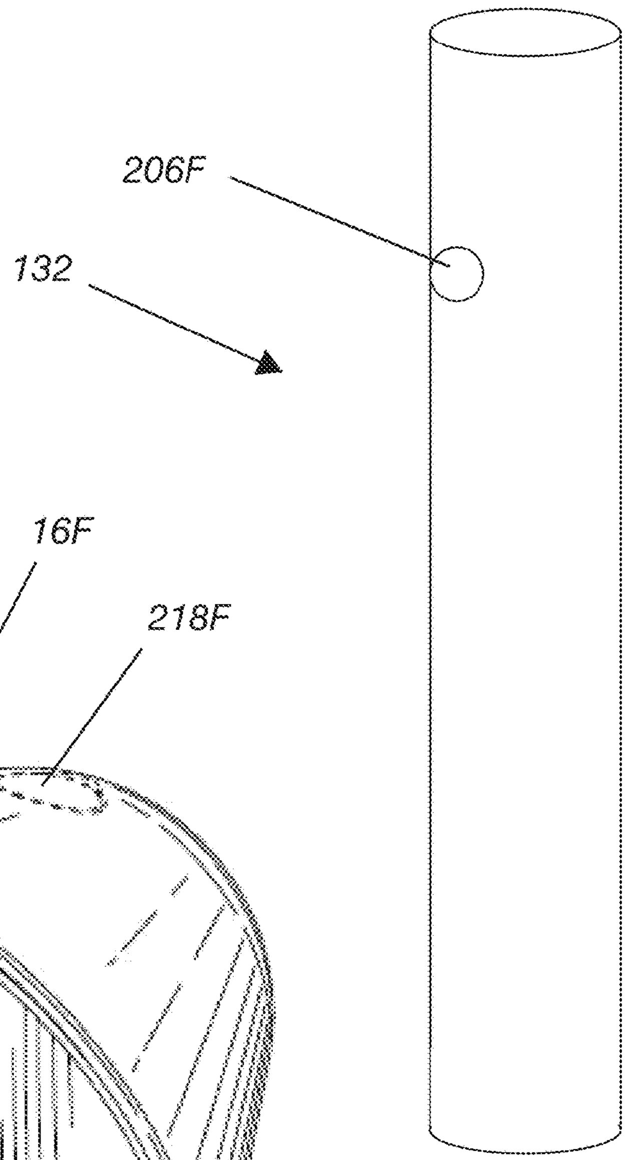
FIGS. 8A-8E are views of alternative second devices, such as an image display device, a light, and an indicator or clock, respectively, for use with a shower assembly shown in FIGS. 6A-6D.

The second device 16 may also be removably connectable to another shower component, such as, for example, a different style/model showerhead (e.g., any of the showerheads shown in FIGS. 2-6D, 11, 13A-13E, 15), a rain can, a hand shower, a wall-mounted water tile, etc., or to a non-shower component, such as a support external to a shower (for example, a support post 132 shown in FIG. 8B), to provide a modular system. In such a system, a single second device 16 is removably connectable to the showerhead 22 and to another different component. The other component includes complementary connecting structure (e.g., frictional structure/materials, force-applying structure, inter-engaging connecting members, etc.) and may include a housing defining a receptacle 94 for supporting the second device 16.

The other shower component may incorporate structure similar to the showerhead 22 (e.g., a ring-shaped shower outlet assembly 50). For example, U.S. Design Pat. No. D565,699 illustrates a hand shower. In the modular system, the illustrated hand shower may be modified to have a housing with a ring-shaped shower outlet assembly similar to the assembly 50 of the showerhead 22. The second device 16 is supported in a similar manner on the modified hand shower.

The removable second device 16 may also be connected separately in the shower enclosure (not shown). For example, the second device 16 may be connected to connecting structure, similar to that described above, mounted on a wall of the shower enclosure, connected to a support (a slide bar for a hand shower, a support/post external to the shower). Alternatively, a suction cup (not shown) may be connected to the second device 16 for connection to a wall or support or a clip (not shown) may be provided to hang the second device 16 from a portion of the shower enclosure or from structure external to the shower.

In the illustrated construction of the speaker 18, the speaker components 110 receive a signal to output from a remote source (not shown), such as a phone, computer, other remotely-communicating source device, etc. (e.g., cell phone, smart phone (iPhone), smart wearable (e.g., smart watch, smart eyewear, etc.), desktop computer, laptop computer, tablet computer (iPad), MP3 player (iPod), other comparable device, etc.). To communicate with the remote source, communication components 134 provide a wireless interface between the output components 110 and the remote source directly or via a network. The communication components 134 include, for example, short-wavelength microwave transmission (e.g., Bluetooth) or IEEE 802.11 ("Wi-Fi") compatible devices.

The communication components 134 may provide one-way communication (e.g., from the remote source to the output components 110) or two-way communication (e.g., between components of the second device and the remote source). If two-way communication is provided, the second device 16 and/or the shower device 14 may include input components (not shown) capable of generating a signal to be sent to the remote source via the communication components 134. For example, the input components may include one or more buttons to control operation of the remote source (e.g., "ON/OFF", "Play/Pause", "Fwd", "Rev", "Volume", "Call Answer", "End Call" buttons, a key pad, a touch pad, a touch screen, etc.). The input components may include a microphone for use with a phone, intercom, etc.

Figure 9A:
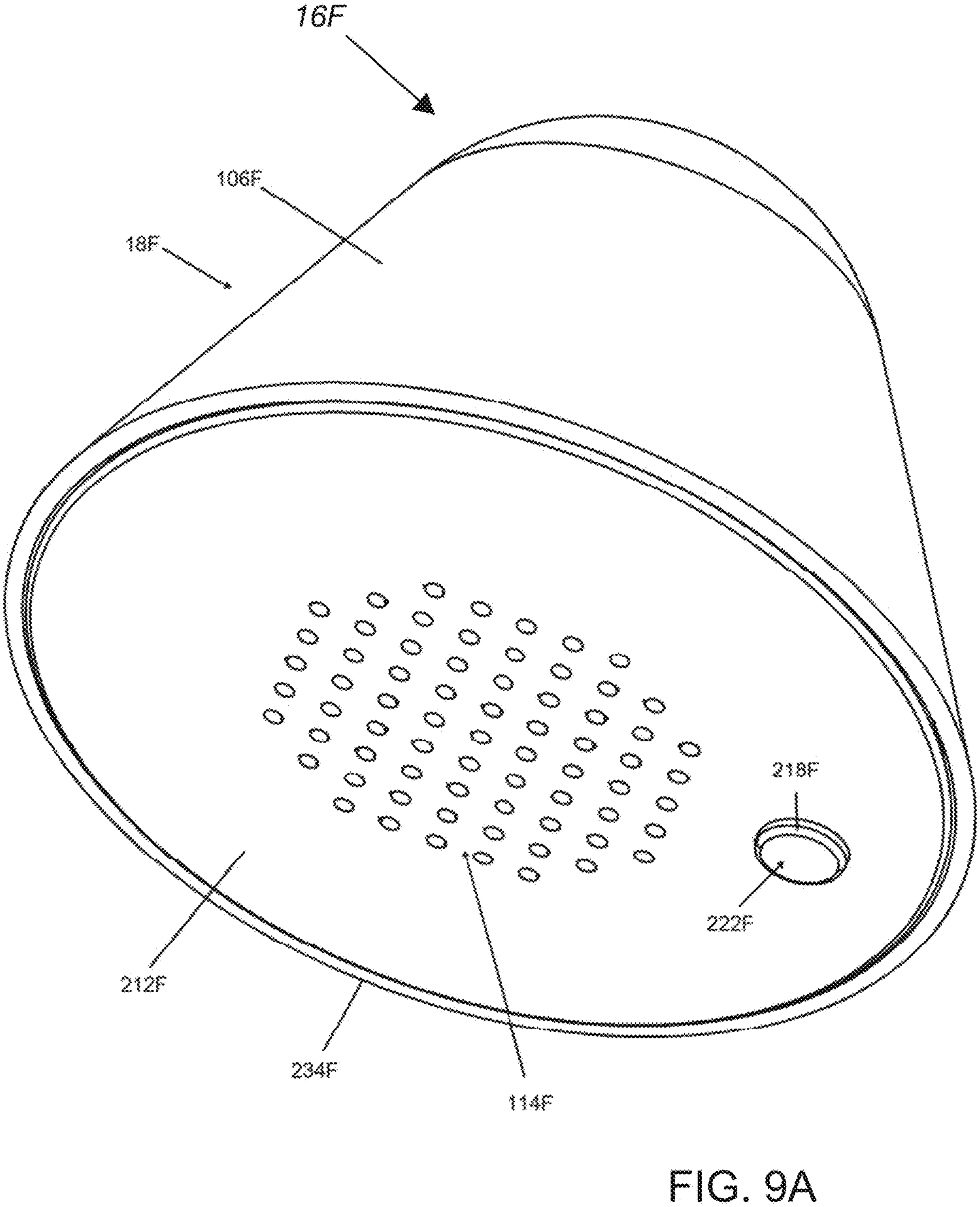
FIGS. 9A-9I are views a second device, such as a speaker assembly, shown in FIGS. 6A-6D.
Figure 9B:
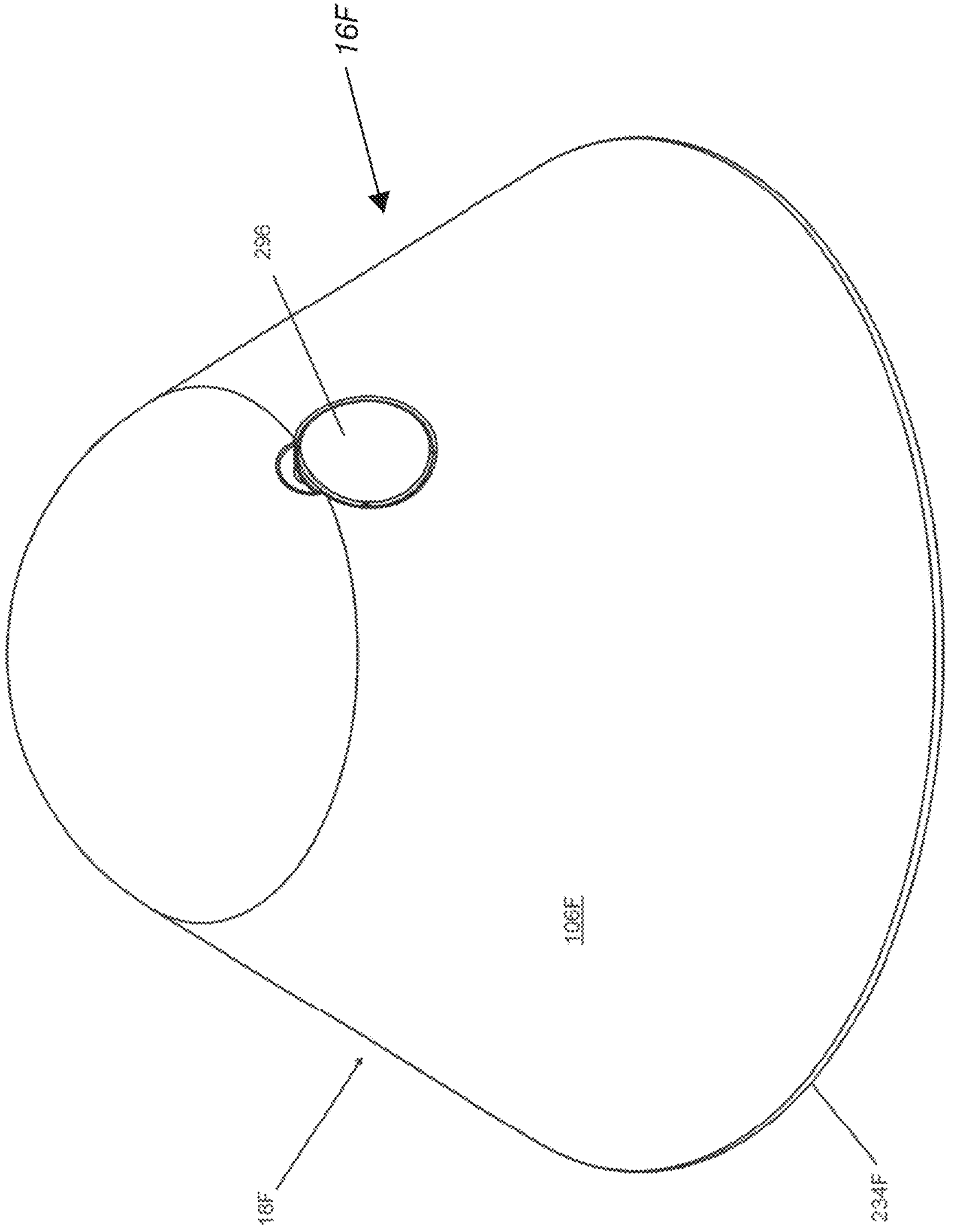
Figure 9C:
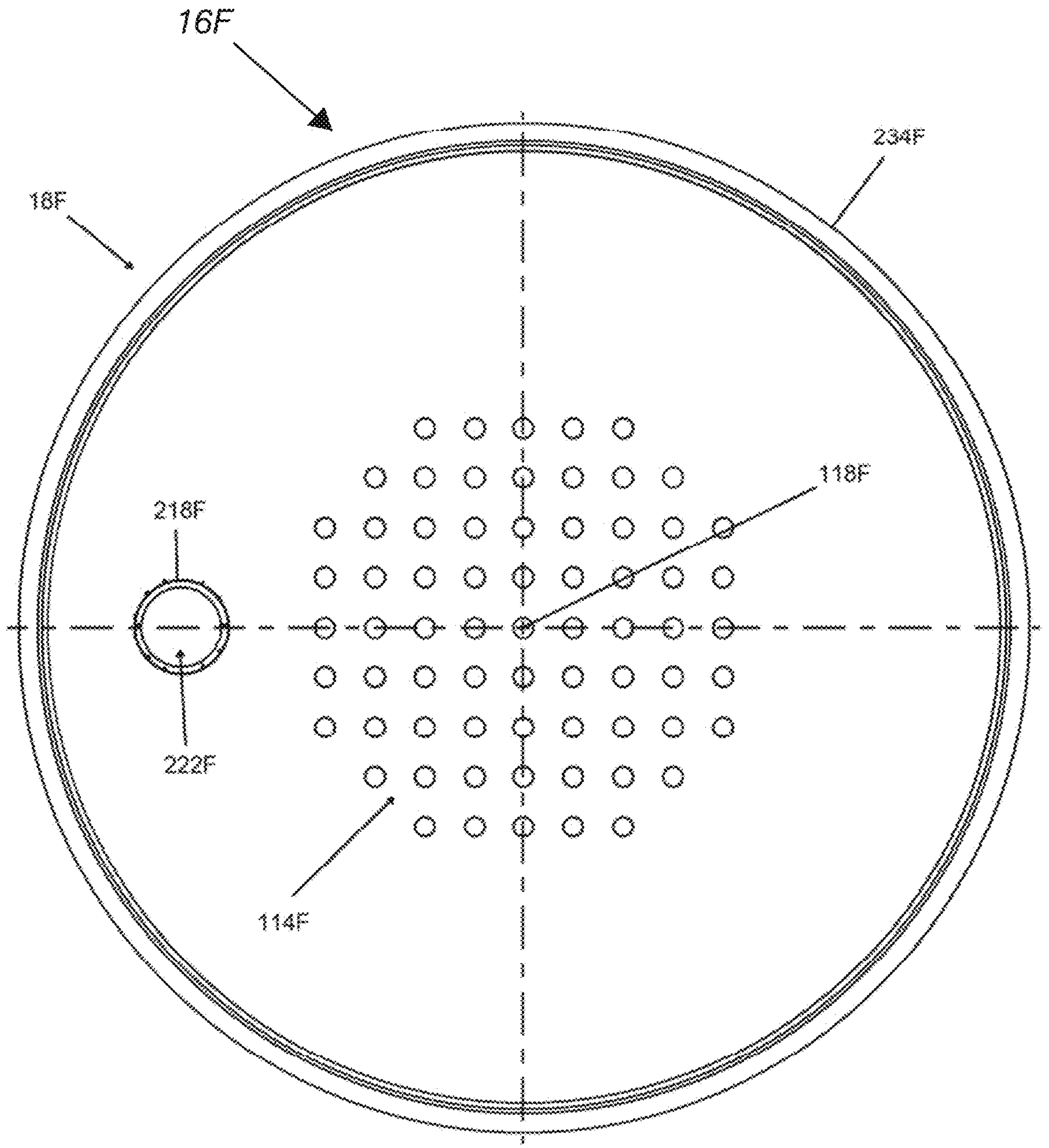
Figure 9D:
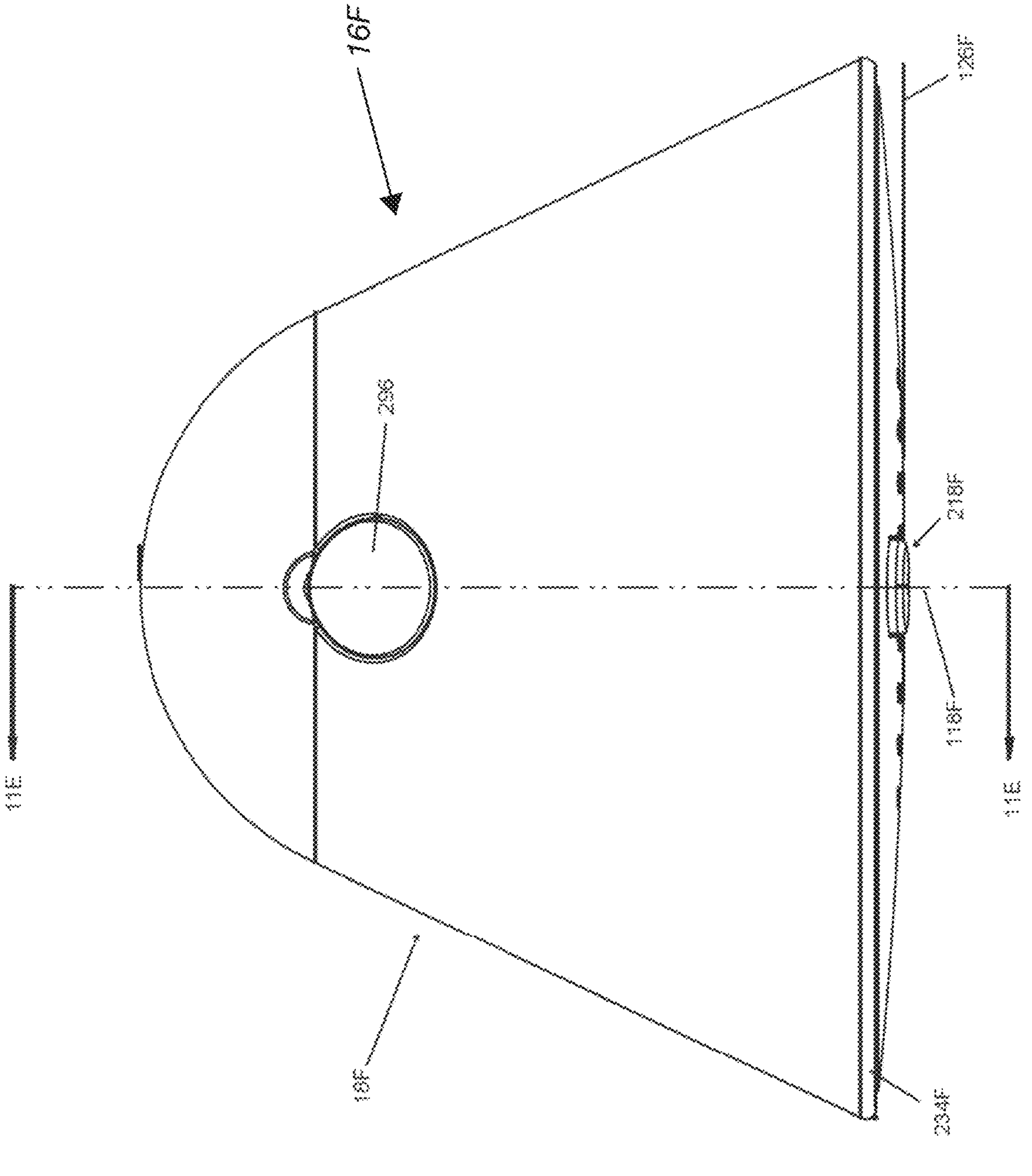
Figure 9E:
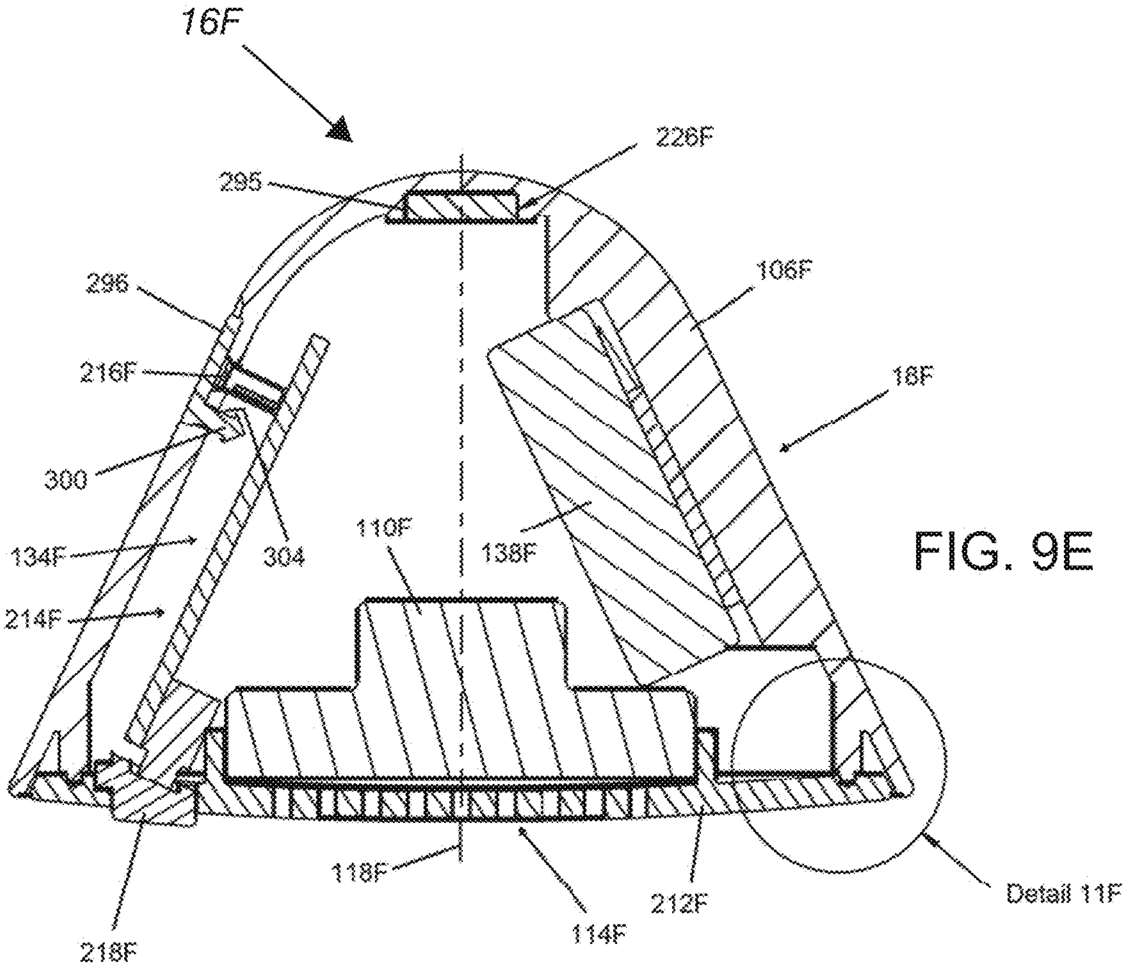
Figure 9F:
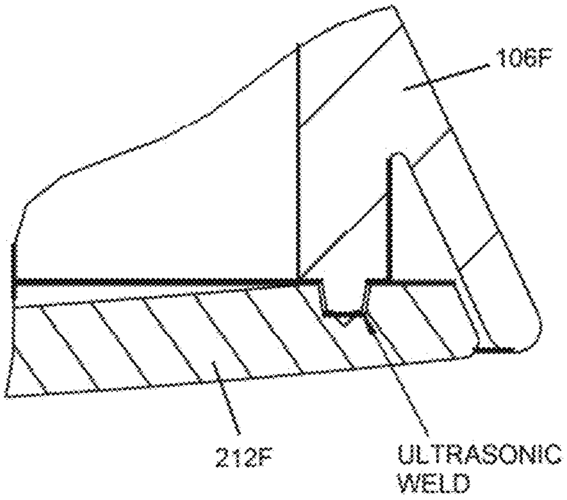
Figure 9G:
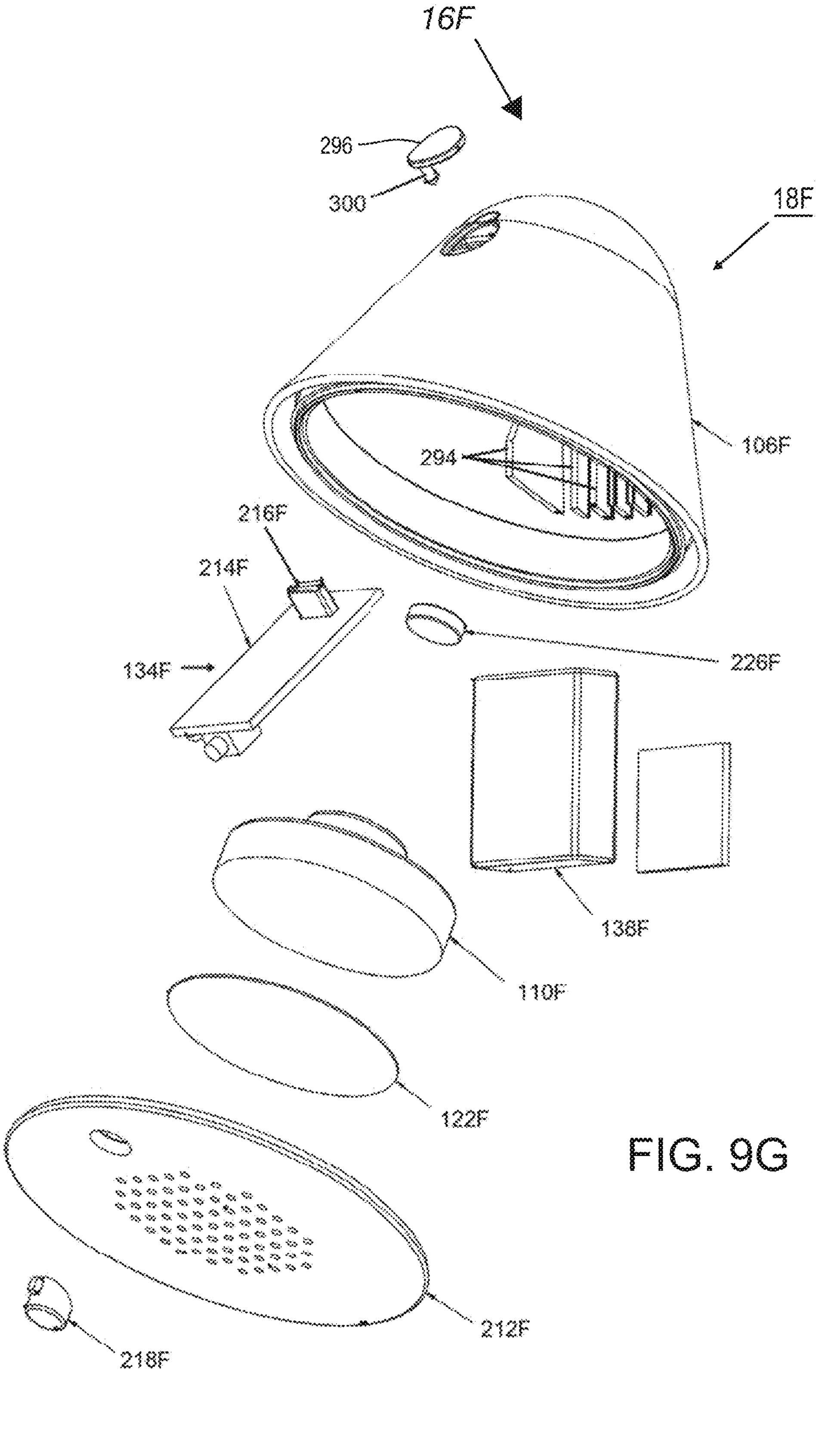
Figure 9H:
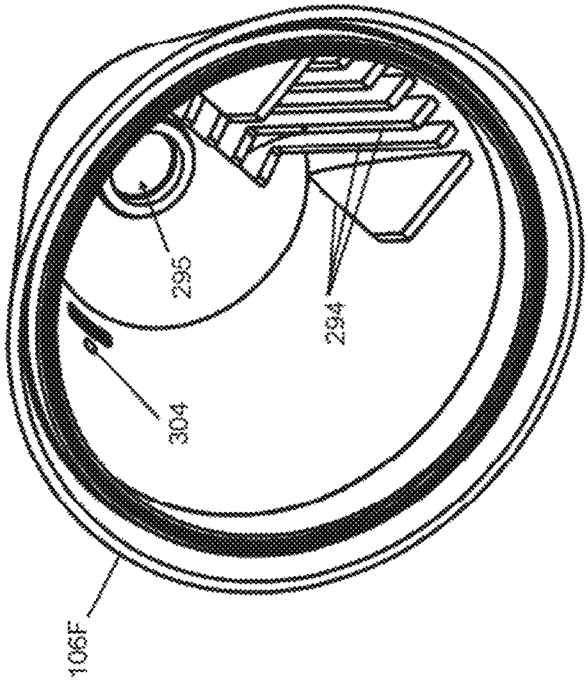
Figure 9I:
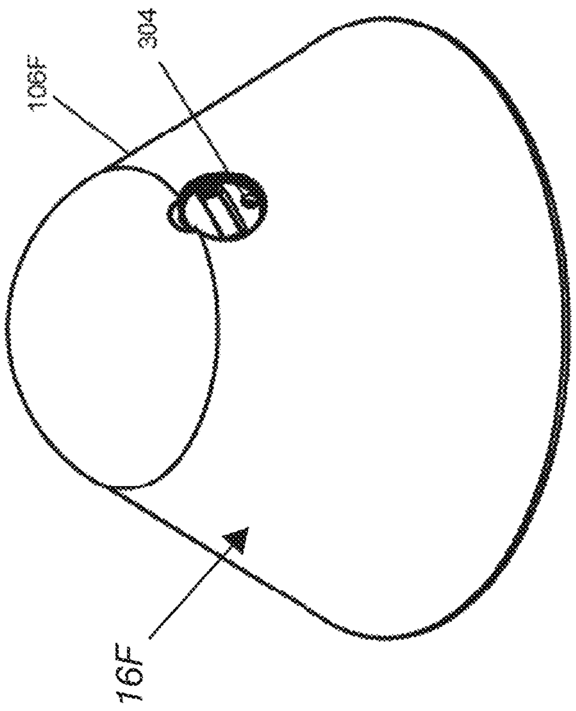

The second device 16 also includes a power source or power components, such as a battery 138, for powering components of the second device 16. In the illustrated construction, the battery 138 is rechargeable when the second device 16 is removed from the receptacle 94. One or more charging terminals 142 are provided on the housing 106 for connection to an external power source (not shown) such as line power through a removable power cord, USB cord, etc. The second device 16 is removed from the showerhead 22, and the terminals 142 are connected to the external power source to recharge the battery 138. When the second device 16 is supported on the showerhead 22, the terminals 142 are covered by a portion of the showerhead housing 30 (e.g., by the diverted portion 98). A terminal cover (not shown; but similar to the cover 296 shown in FIGS. 9B, 9D, and 9G) may also be provided on the housing 106.

It should be understood that electronic components (e.g., the output components 110, the communication components 134, the power components, etc.), associated modules and logical structures are capable of being implemented in software executed by a microprocessor or a similar device or of being implemented in hardware using a variety of components including, for example, application specific integrated circuits ("ASICs"). Terms like "controller" and "module" may include or refer to both hardware and/or software.

Figure 2:
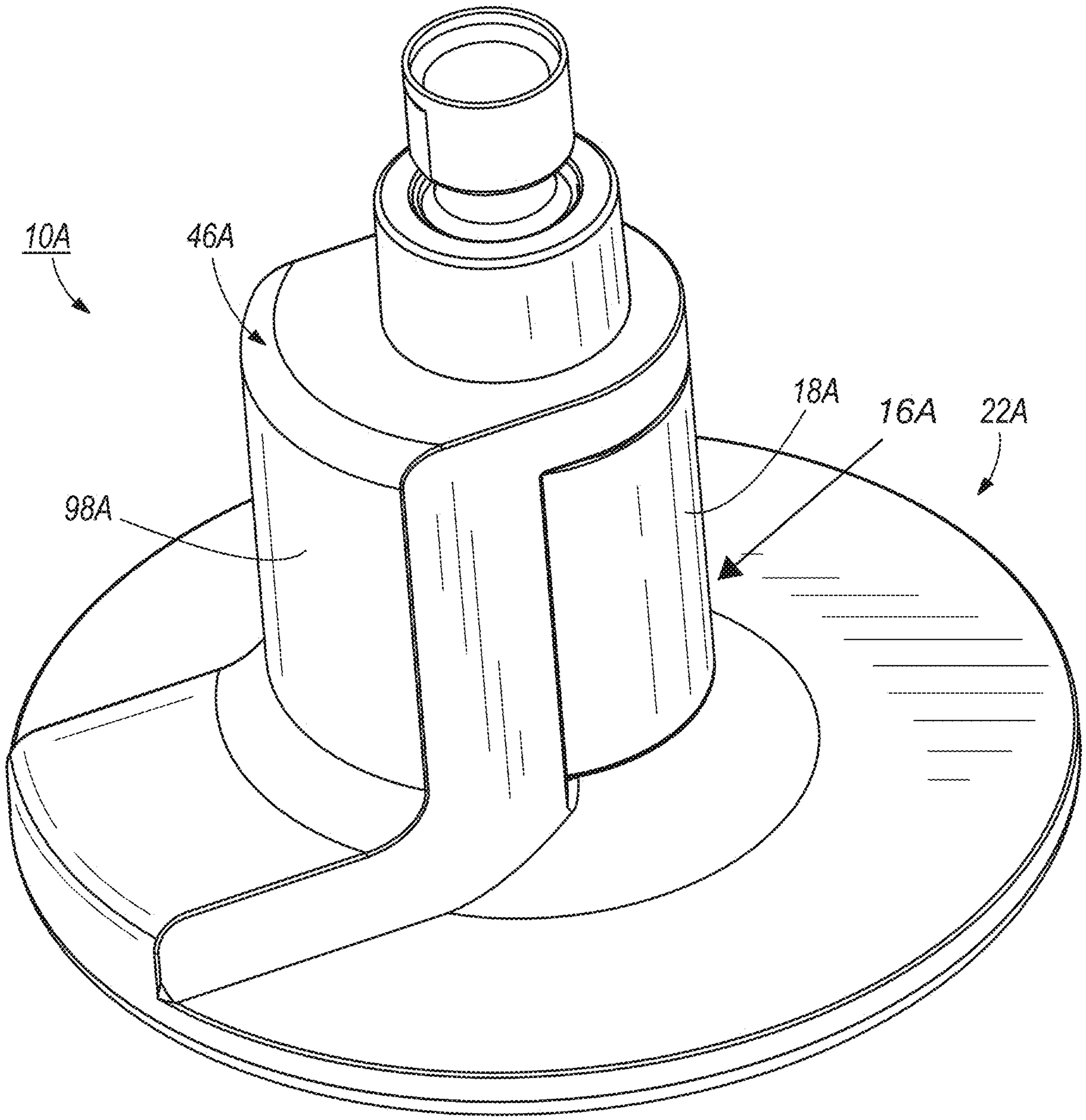
FIG. 2 is a rear perspective view of an alternative construction of a shower assembly.

FIG. 2 illustrates an alternative construction of a shower assembly 10A. The assembly 10A is similar to the assembly 10 described above and shown in FIGS. 1A-1D, and the description above is referred to for common elements. Modified elements are discussed below and have the same reference number "A".

In the assembly 10A, the waterway 46A includes a diverted portion 98A which is wider than the diverted portion 98 shown in FIGS. 1A-1D. The diverted portion 98A provides an arc-shaped recess to at least partially laterally capture the second device 16A (e.g., a speaker 18A). The showerhead 22A may be arranged so that the diverted portion 98A is at the lowest point. The second device 16A can thus rest on the diverted portion 98A when supported in the receptacle 94A.

Figure 3A:
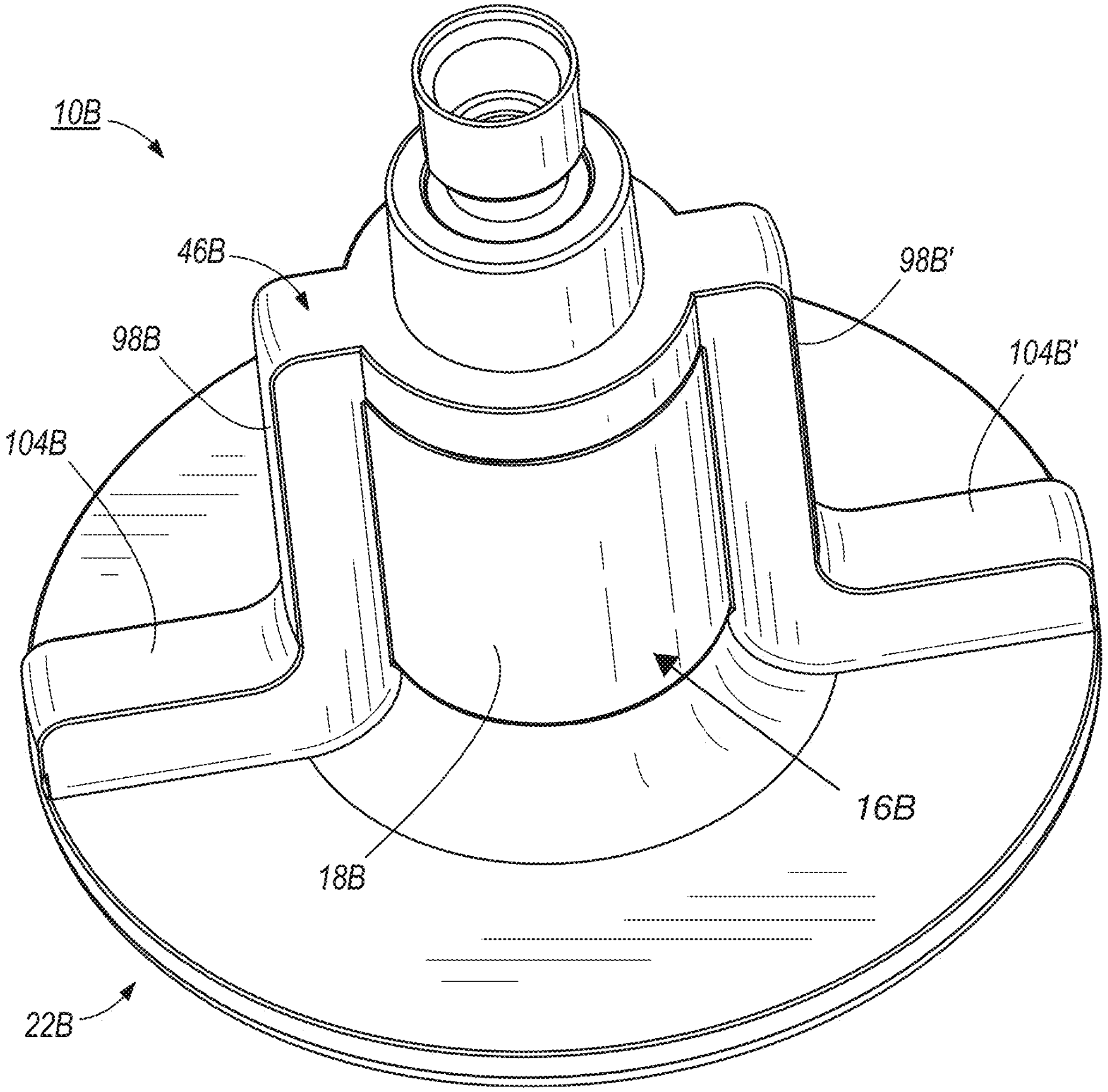
FIGS. 3A-3C are views of another alternative construction of a shower assembly.
Figure 3B:
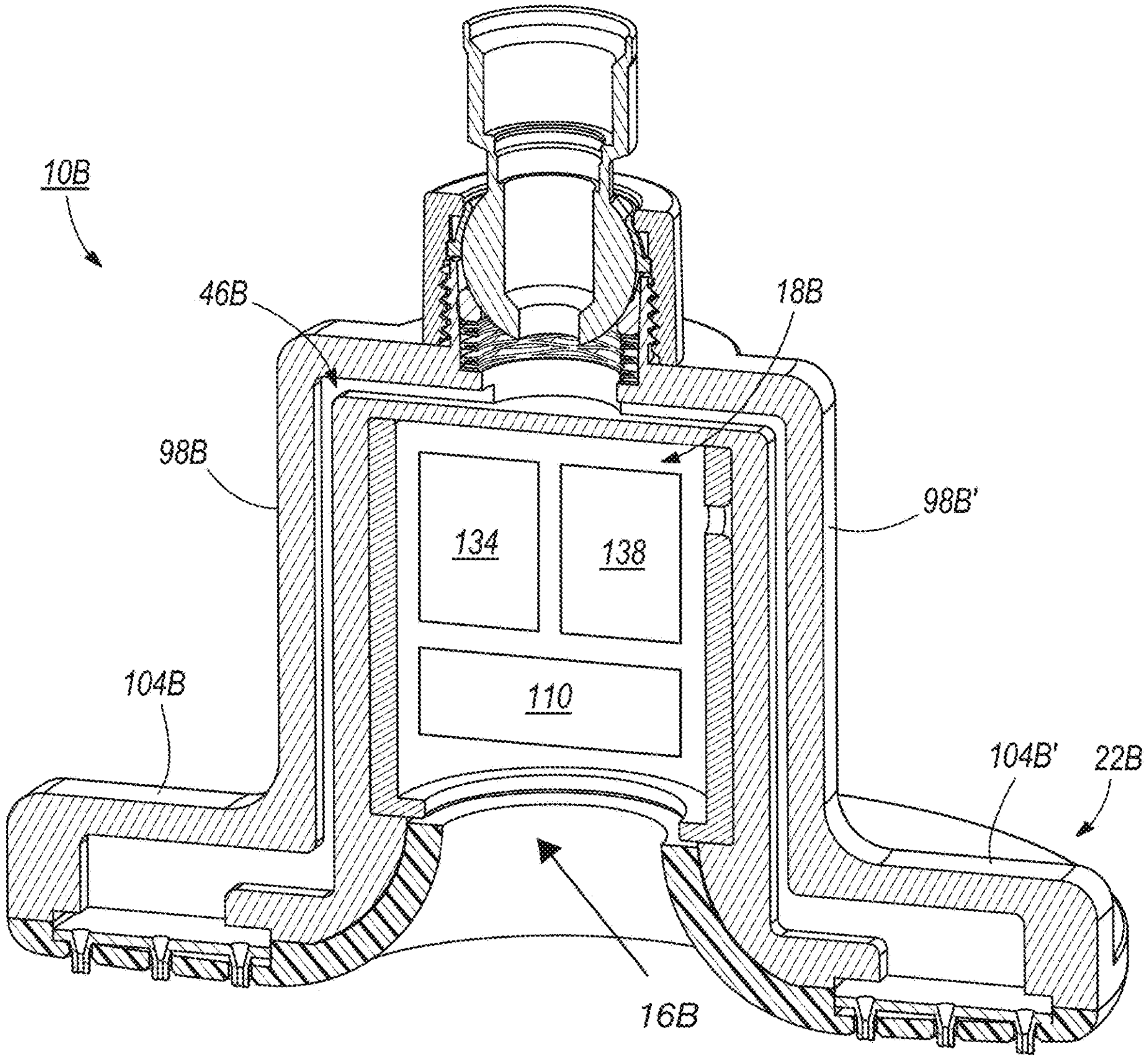
Figure 3C:
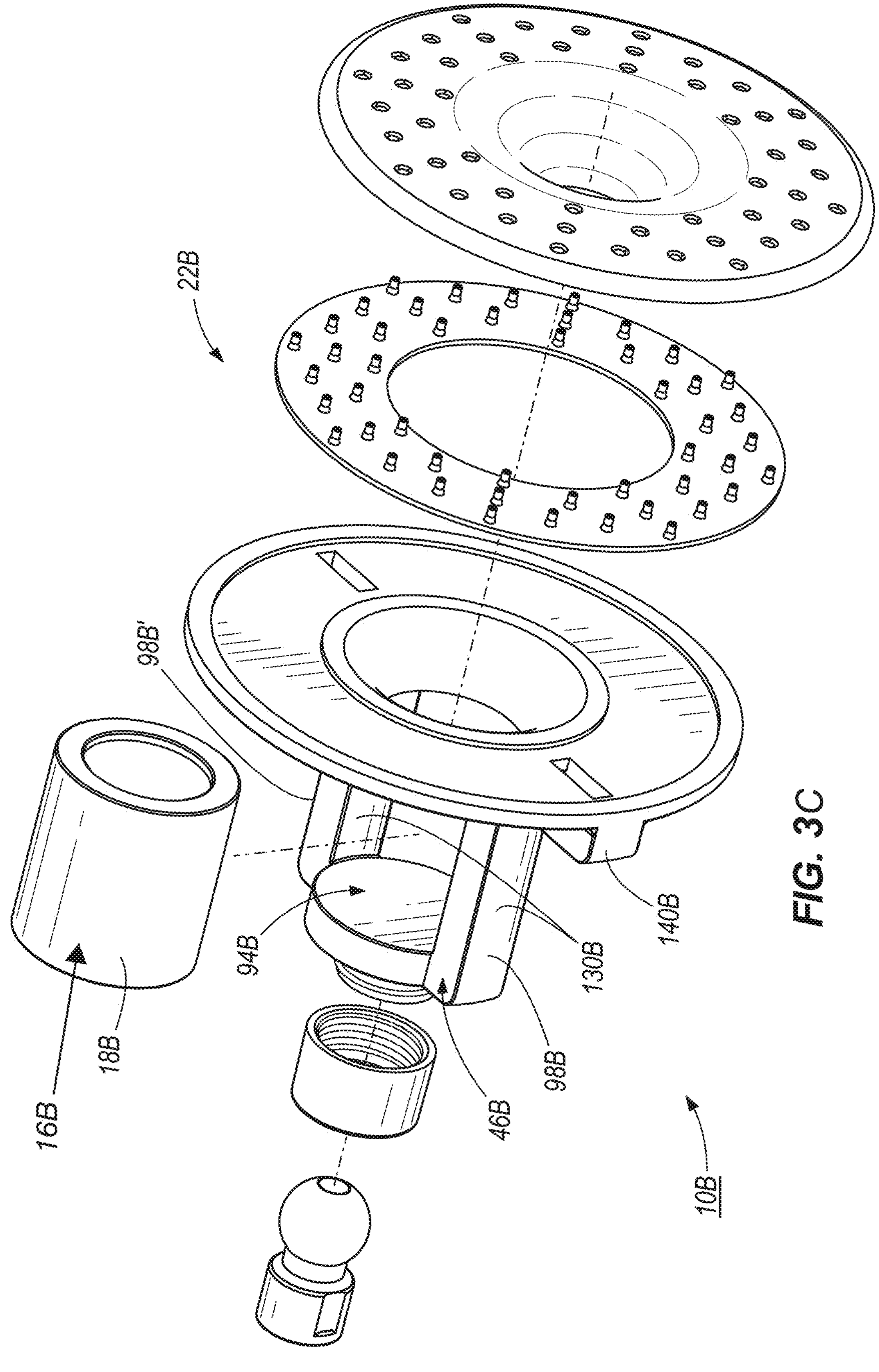

FIGS. 3A-3C illustrate another alternative construction of a shower assembly 10B. The assembly 10B is similar to the assembly 10, 10A described above and shown in FIGS. 1A-1D and 2, respectively, and the description above is referred to for common elements. Modified elements are discussed below and have the same reference number "B".

In the assembly 10B, the waterway 46B includes multiple (two) diverted portions 98B and 98B'. The illustrated diverted portions 98B, 98B' are spaced apart on the showerhead housing 30B by about 180°. The diverted portions 98B, 98B' cooperate to capture the second device 16B (e.g., a speaker 18B). As mentioned above, at least one of the diverted portions 98B, 98B' may be flexible to allow insertion of the second device 16B and/or to apply force to retain the second device 16B (e.g., to provide connecting structure 130B or to supplement other connecting structure).

The use of multiple diverted portions 98B, 98B' may also allow the flow through the showerhead 22B to be adjusted. For example, one diverted portion 98B provides a first flow path, and the other diverted portion 98B' provides a second flow path. Combined flow through both flow paths may provide increased flow through the shower outlet assembly

50B. The flow paths may have different volumes such that flow through one flow path is greater than through the other flow path. A valve arrangement (not shown) may be provided to selectively control flow through one or both of the flow paths (e.g., minimum flow through the smaller flow path, medium flow through the larger flow path, maximum flow through both flow paths). The valve arrangement may include a user control (not shown; e.g., a button or selector).

In other constructions (not shown), the valve arrangement may be automatically controlled through another input (e.g., based on the output of the second device 16B (e.g., the speaker 18B)). In such constructions, the valve arrangement may include one or more electronically-controlled valves (e.g., a solenoid valve similar to the solenoid 548 shown in FIG. 19 and described below) operated by control components (e.g., similar to the control components 524 shown in FIG. 19 and described below). The water flow may be adjusted in relation to the intensity, rhythm, etc. of the sound output of the speaker 18B to also provide a tactile experience from the assembly 10B, in addition to the audio experience. The control components may be selectively activated/deactivated to add/remove the tactile experience.

Figure 4:
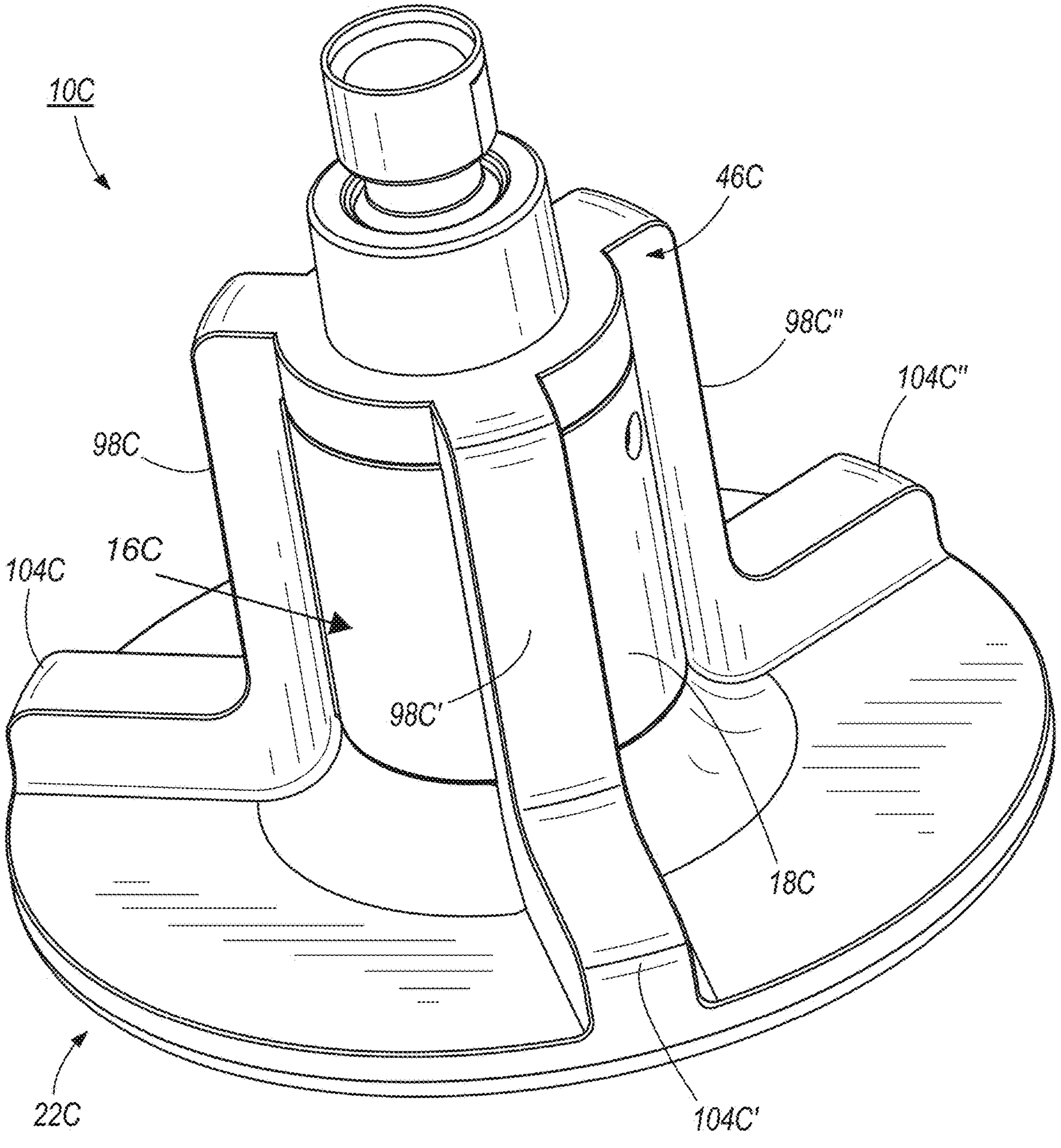
FIG. 4 is a rear perspective view of yet another alternative construction of a shower assembly.

FIG. 4 illustrates yet another alternative construction of a shower assembly 10C. The assembly 10C is similar to the assembly 10, 10A, 10B described above and shown in FIGS. 1A-1D, 2 and 3A-3C, respectively, and the description above is referred to for common elements. Modified elements are discussed below and have the same reference number "C".

In the assembly 10C, the waterway 46C includes multiple (three) diverted portions 98C, 98C' 98C". The illustrated diverted portions 98C, 98C' 98C" are spaced apart on the showerhead housing 30C by about 120°. The diverted portions 98C, 98C' 98C" cooperate to capture the speaker 18C.

As mentioned above, at least one of the diverted portions 98C, 98C' 98C" may be flexible to allow lateral insertion of the second device 16C (e.g., a speaker 18C) and/or to apply force to retain the speaker 18C. However, in the illustrated construction, the second device 16C is inserted into and removed from the receptacle 94C the receptacle 94C from the front of the shower outlet assembly 50C. As also mentioned above, the use of multiple diverted portions 98C, 98C', 98C" may also allow the flow through the showerhead 22C to be adjusted.

Figure 5B:
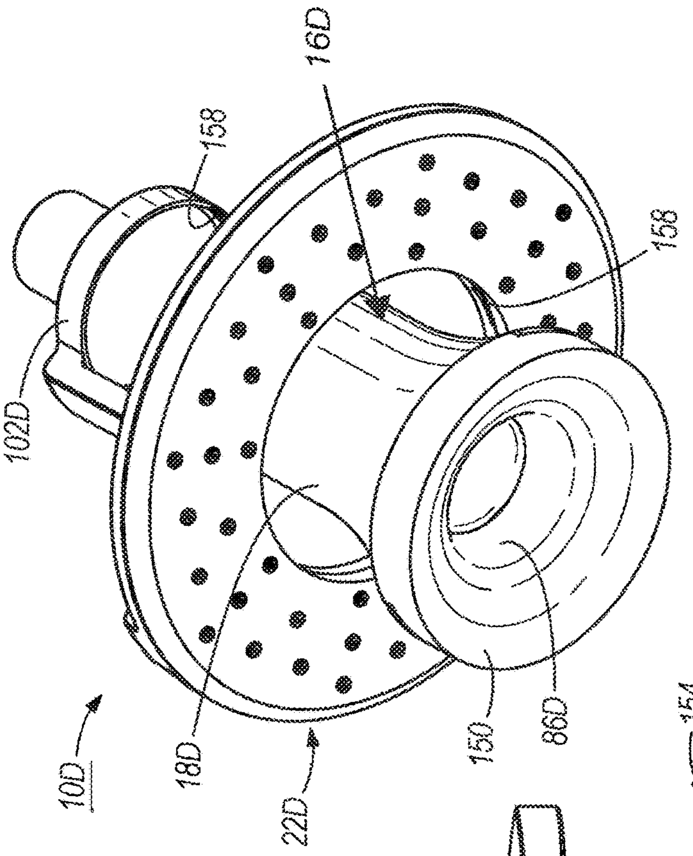
FIGS. 5A-5C are views of a further alternative construction of a shower assembly.
Figure 5C:
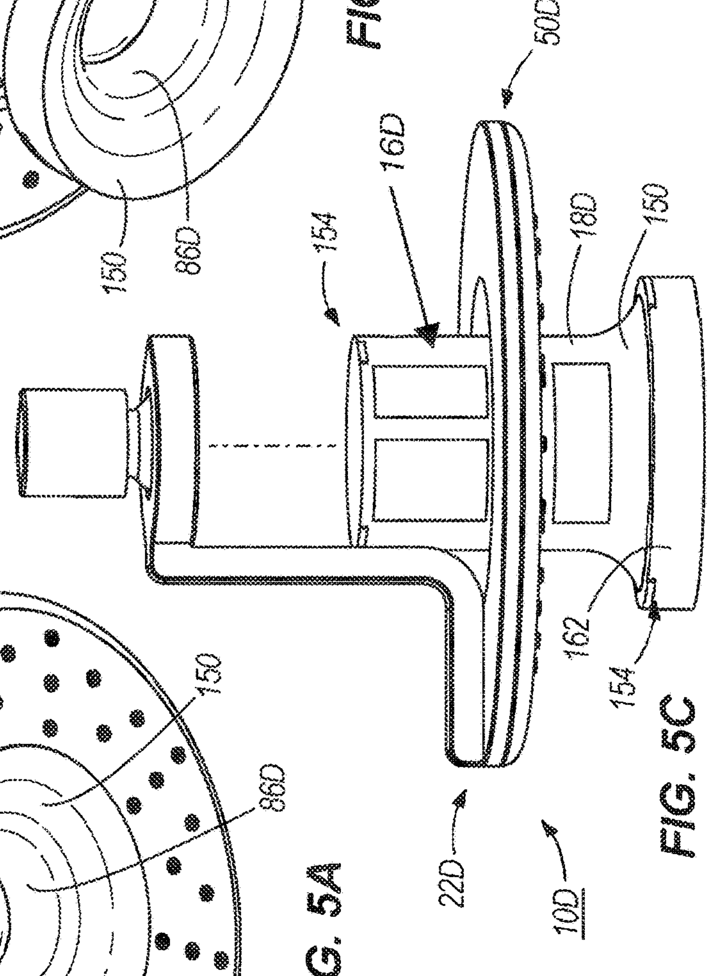
Figure 5A:
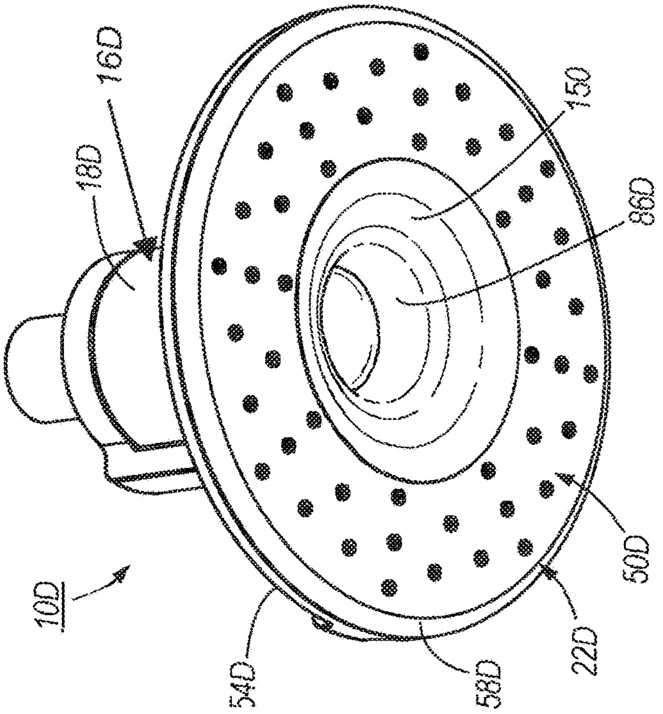

FIGS. 5A-5C illustrate an alternative construction of a shower assembly 10D. The assembly 10D is similar to the assembly 10, 10A, 10B, 10C described above and shown in FIGS. 1A-1D, 2, 3A-3C and 4, respectively, and the description above is referred to for common elements. Modified elements are discussed below and have the same reference number "D".

In the assembly 10D, the second device 16D (e.g., a speaker 18D) is inserted into and removed from the receptacle 94D through the front of the shower outlet assembly 50D. In the illustrated construction, the flared surface 86D is provided on a flared portion 150 on the front of the second device 16D. The back plate 54D and the front plate 58D are generally annular, and the shower outlet assembly 50D is in the shape of a relatively flatter ring (compared to the shower outlet assembly 50 shown in FIGS. 1A-1D).

The connecting structure 130D includes inter-engaging ramp surfaces 154, 158 on the speaker 18D and the showerhead 22D, respectively, engaging upon a ¼ turn. A first set of ramp surfaces 154, 158 is provided on a rim 162 of the flared portion 150 and the shower outlet assembly 50D, and a second set of ramp surfaces 154, 158 is provided on the rear of the speaker housing 106D and the front wall of the inlet chamber 102D. The speaker 18D is thus retained at both ends.

FIGS. 6A-6D illustrate another alternative construction of a shower assembly 10F. The assembly 10F is similar to the assembly 10, 10A, 10B, 10C, 10D described above and shown in FIGS. 1A-1D, 2, 3A-3C, 4, 5A-5C, respectively, and the description above is referred to for common elements. Modified elements are discussed below and have the same reference number "F".

In the illustrated showerhead 22F, several common showerhead components are shown. For example (see FIG. 6D), the inlet connector 26F includes a screen washer 170F and a flow regulator 174F. A holder 178F, a flat ring 182F and a wave spring 186F are provided around the ball joint 34F.

Figure 6A:
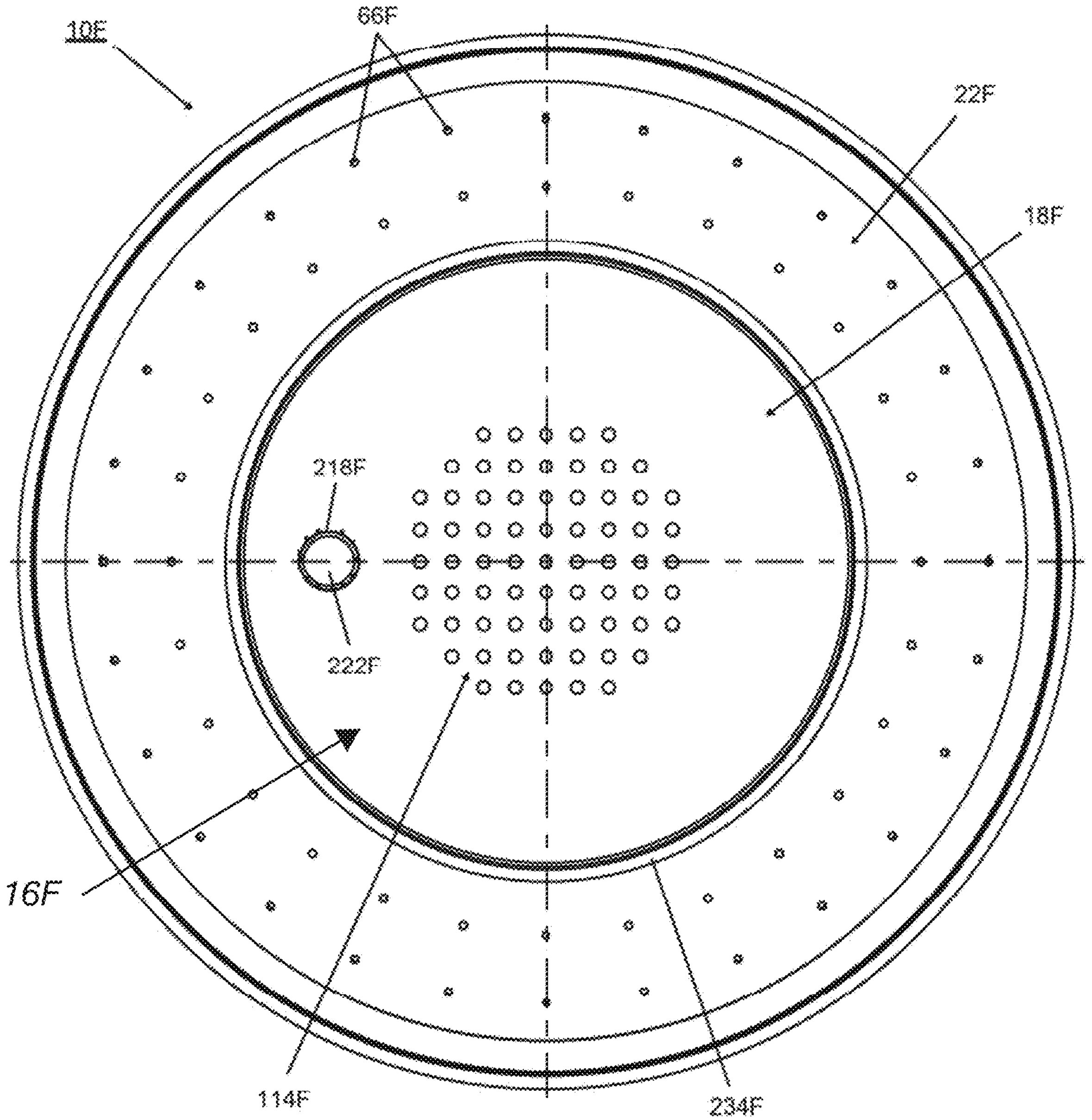
FIG. 6A-6D are views of another alternative construction of a shower assembly.
Figure 6B:
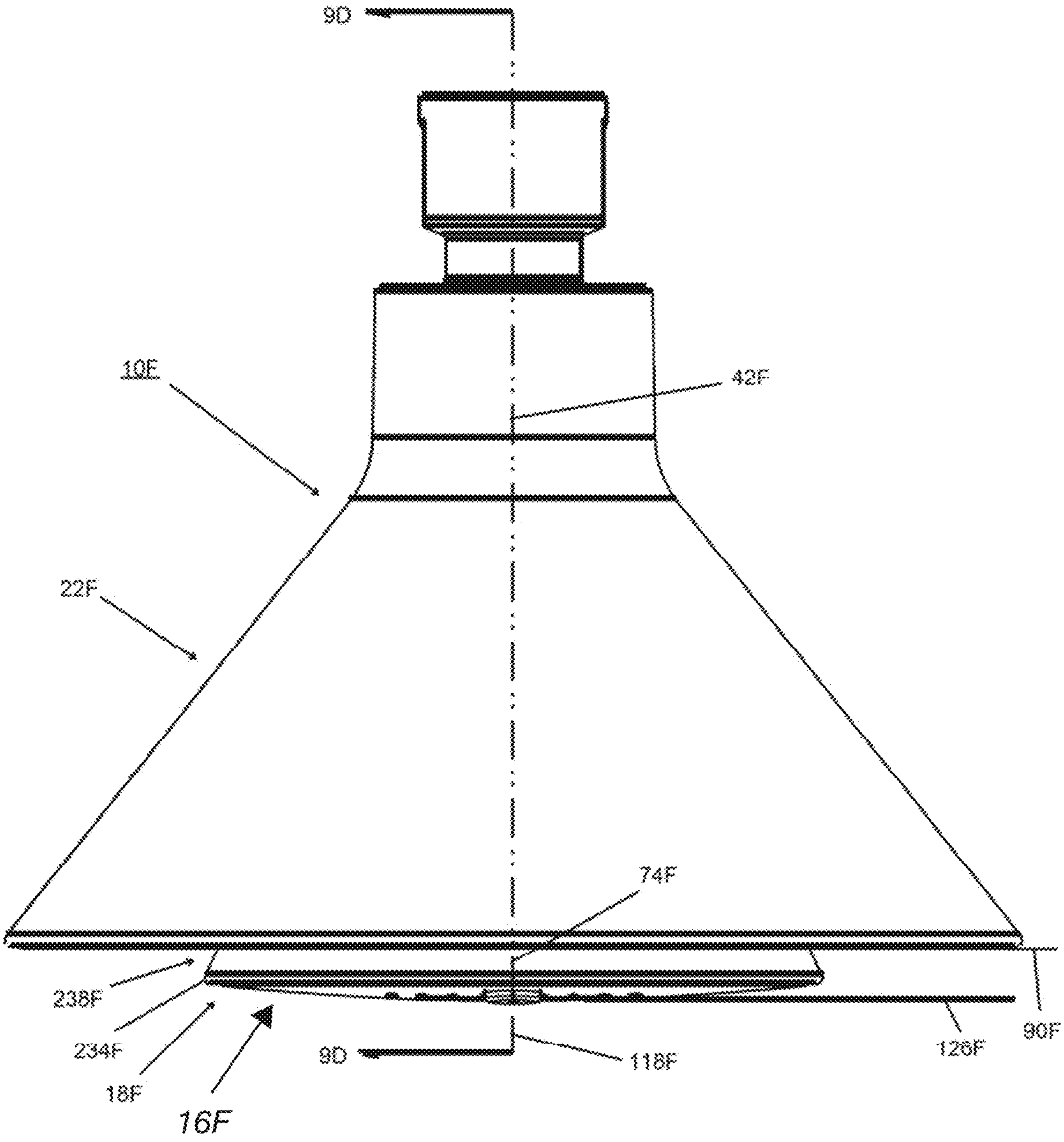

The showerhead 22F includes (see FIGS. 6C-6D and 7) a waterway assembly 190F communicating with the inlet 38F. As shown in FIG. 6D, cooperating threads 192F connect the housing 30F and the waterway assembly 190F. The waterway assembly 190F includes (see FIGS. 6C-6D and 7) outer and inner waterway members 194F, 198F cooperating to define the waterway 46F and the inlet and outlet chambers 102F, 62F, respectively. The waterway members 194F, 198F are connected, for example, by welding (e.g., ultrasonic), adhesive, etc., to provide a fluid tight seam.

The inner waterway member 198F provides a sprayface member defining openings 260. The waterway assembly 190F also includes a nozzle member 264 with nozzles 268, at least some of which have barbs 272. The illustrated nozzles 268 are oriented along respective axes 274. The nozzle member 264 provides the outlets 66F arranged in the face plane 90F (see FIG. 6B). The nozzle member 264 may be formed as a soft thermoplastic elastomer (TPE), and the nozzles/outlets 66F may be self-cleaning.

Figure 6C:
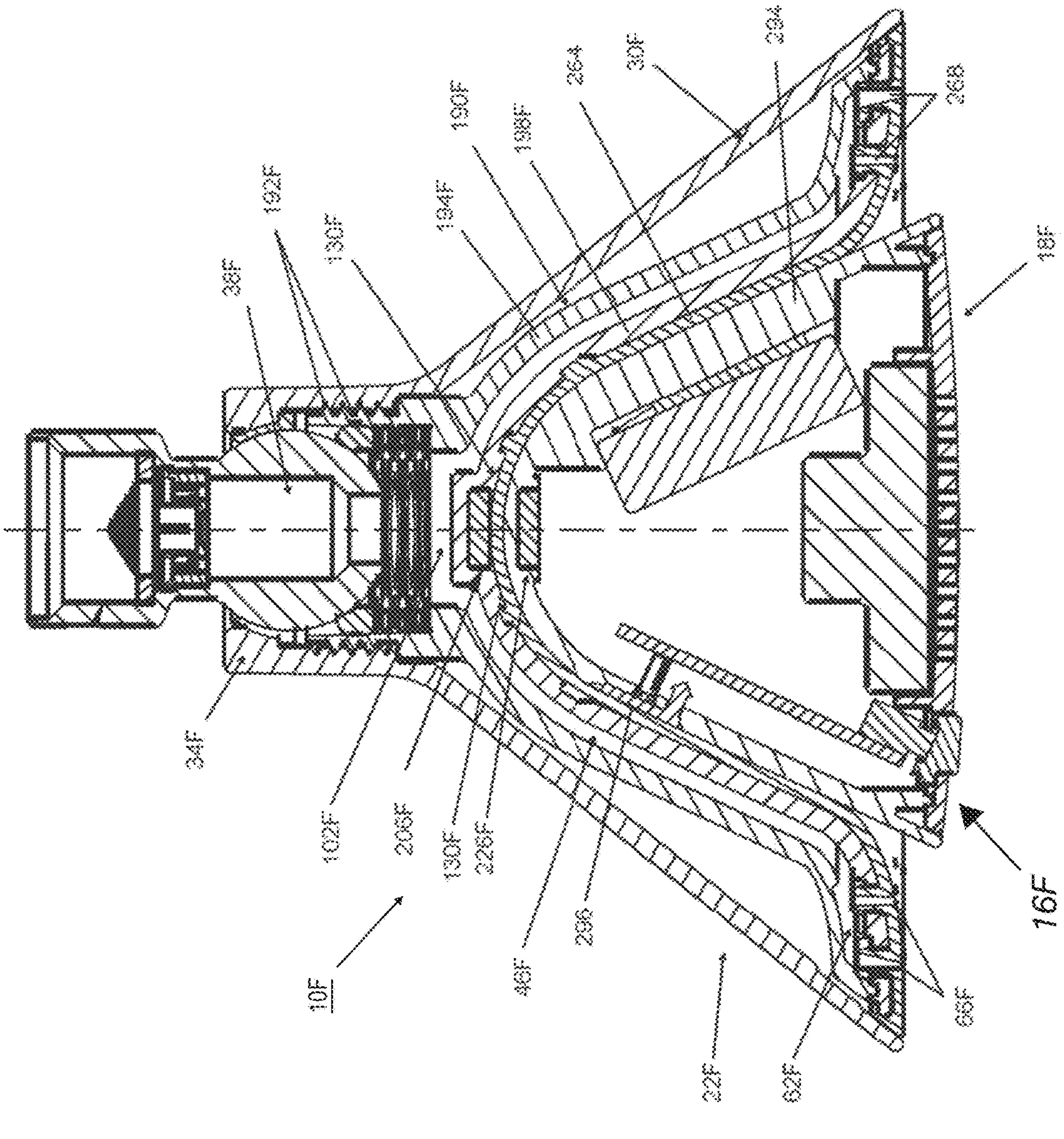
Figure 6D:
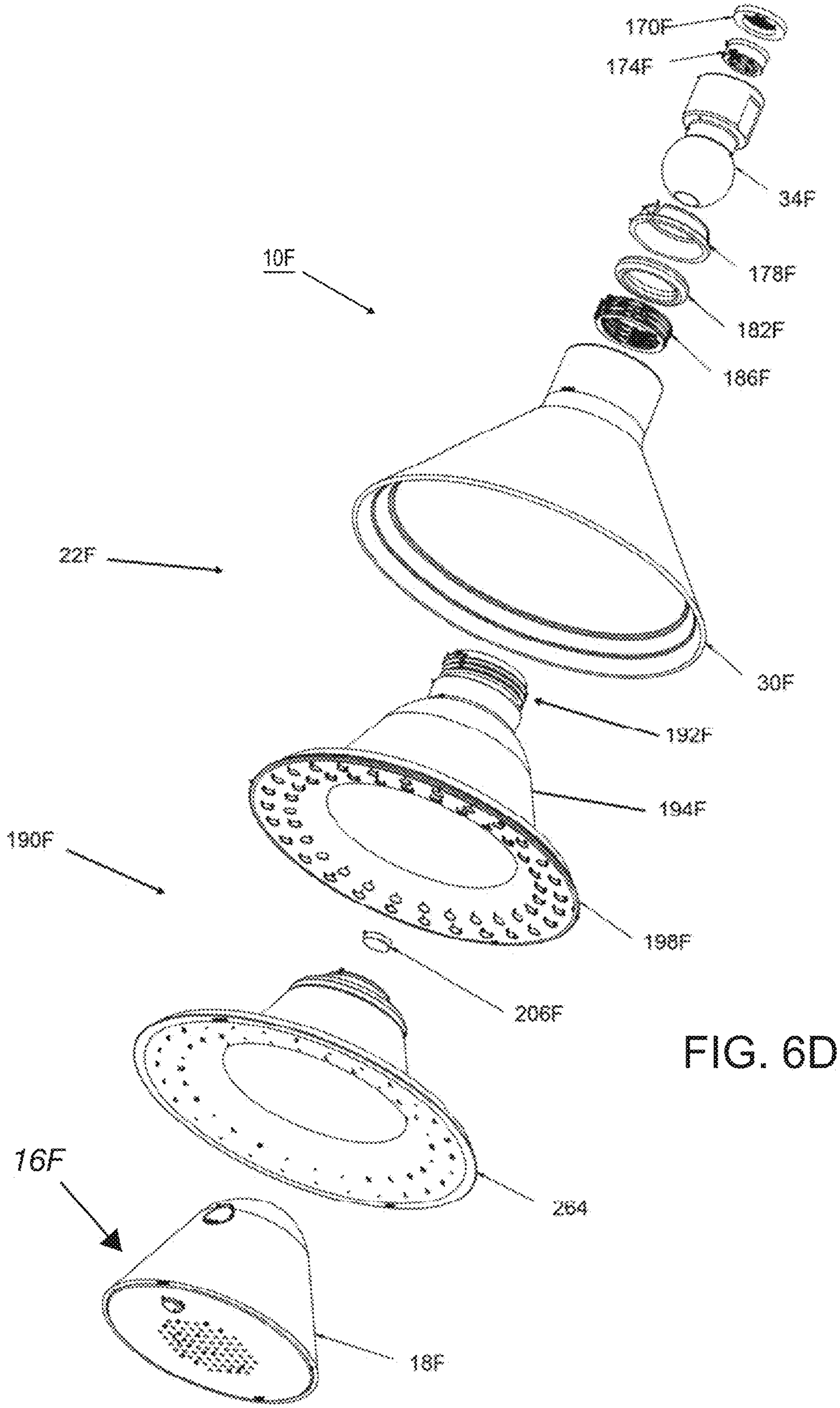

Each nozzle 268 is received in a corresponding opening 260, and, as shown in FIG. 6C, the barbs 272 engage the inner waterway member 198F to connect the members 198F, 264. The construction of the nozzles 268 and the barbs 272 is such that water pressure through each nozzle 268 increases the engagement between the barbs 272 and the inner waterway member 198F. Also, in the illustrated construction, the edge 276 of the nozzle member 264 wraps around the edge 280 of the inner waterway member 198F. Ridges 284 on the outer surface of the nozzle member 264 fit in corresponding grooves 288 in the inner waterway member 198F. Additional or alternative connecting arrangements (e.g., adhesive, welding, etc.) may also be provided to connect and/or seal the members 198F, 264.

Figure 7:
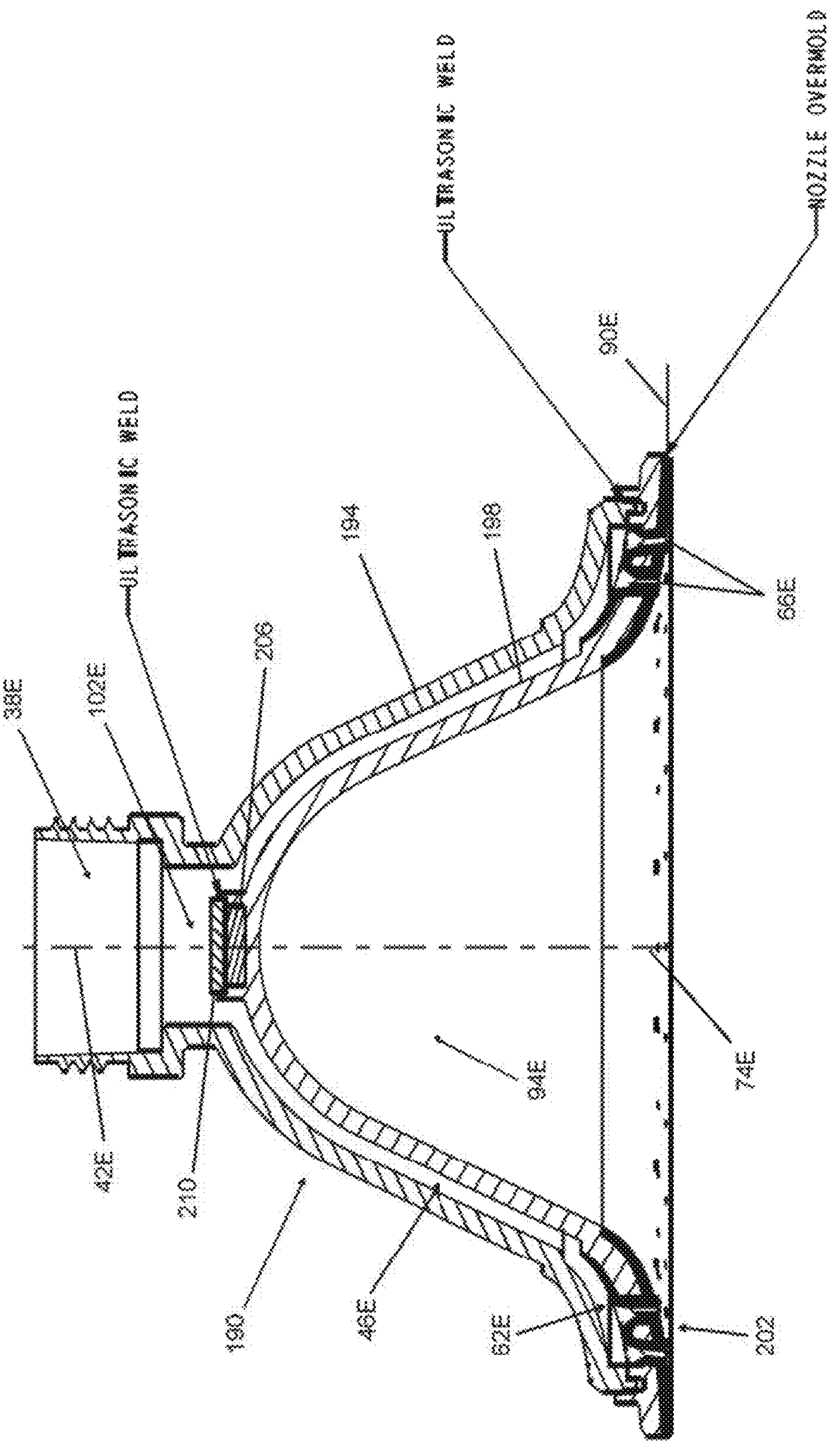
FIG. 7 is a view of an alternative construction of a waterway assembly.

As shown in FIGS. 6C-6D and 7, a magnet 206F is supported on the showerhead 22F (e.g., in a recess 292 on the inner waterway member 198F), and the nozzle member 264 covers the magnet 206F. The illustrated magnet 206F is located out of the waterway 46F, enclosed and sealed between the members 198F, 264. The magnet 206F is held in the recess 292, for example, by adhesive (epoxy), press-fit, welding, etc. In other constructions (not shown), the magnet 206F may be supported in another manner (e.g., molded into the inner waterway member 198F or the nozzle member 264) and/or in another location on the showerhead 22F.

FIG. 7 illustrates an alternative construction of the waterway assembly 190. The waterway assembly 190 includes outer and inner waterway members 194, 198 cooperating to define the waterway 46E and the inlet and outlet chambers 102E, 62E, respectively. The waterway members 194, 198 include cooperating recesses to provide the receptacle 94E.

The waterway members 194, 198 are connected, for example, by welding (e.g., ultrasonic), adhesive, etc., to provide a fluid tight seam. The inner waterway member 198 includes a spray face assembly 202 providing the outlets 66 and arranged in the face plane 90E. The spray face assembly 202 includes a soft thermoplastic elastomer (TPE) overmold and the nozzles/outlets 66E are self-cleaning.

A magnet 206 is supported on the waterway assembly 190 (e.g., in a recess on the inner waterway member 198), and a cap 210 covers the magnet 206. The illustrated magnet 206 is supported in the inlet chamber 102E, and the cap 210 is connected to the waterway member 198 to enclose the magnet 206, for example, by welding (e.g., ultrasonic), adhesive, etc., to seal the magnet 206. In other constructions (not shown), the magnet 206 may be supported in another manner (e.g., molded into the inner waterway member 198) and/or in another location on the showerhead 22E.

The second device 16F is illustrated in more detail in FIGS. 9A-9I. As mentioned above, the second device 16F may include an entertainment device (e.g., a speaker 18F, a display, a bubble blower, etc.), a light source, a time keeping device (e.g., a clock, a timer), a dispenser (e.g., of shampoo, soap, aroma, essential oils, softeners, purifiers, etc.) or a combination of such components.

The second device 16F may be removably connectable to a shower component, such as, for example, different style/model showerheads (e.g., any of the showerheads shown in FIGS. 2-6D, 11, 13A-13E, 15, a rain can, a hand shower, a wall-mounted water tile, etc., or to a non-shower component, such as a wall of the shower enclosure, a support external to a shower (for example, a support post 132 shown in FIG. 8B), to provide a modular system. In such a system, a single second device 16F is removably connectable to the showerhead 22F and to another different component. The other component includes complementary connecting structure (e.g., frictional structure/materials, force-applying structure, inter-engaging connecting members, etc.) and may include a housing defining a receptacle for supporting the second device 16F.

Also, in such a system, multiple different second devices 16F are removably connectable to each support component. Different second devices 16F of the same type (e.g., different speakers 18F) may be differentiated by different materials, markings, colors, etc.

For example, a different individual speaker 18F (e.g., multiple individual speakers 18F) for each individual in a household is removably connectable to the shower device 14F (and/or to other support devices/components in the system). Also, one type of second device 16F (e.g., a speaker 18F) and another different type of second device 1F6 (e.g., a different entertainment device, a light source, a time keeping device, a dispenser, combination, etc.) may be removably connectable to the shower device 14F.

The illustrated second device 16F (e.g., a speaker 18F shown in FIGS. 9A-9I) includes a housing 106F connected to a face 212F, for example, by welding (e.g., ultrasonic), adhesive, etc., to seal the second device 16F to be water resistant or waterproof. The housing 106F defines a container for components/materials associated with the second device 16F (e.g., power components 138F, output components 110F, material to be dispensed, etc.). The components of the second device 16F depend on the type of device. The housing assembly (the housing 106F and/or the face 212F) may formed of and/or include covering layers of elastomeric materials (e.g., thermoplastic elastomer (TPE), rubber, etc.) to protect the second device 16 and its components if the second device 16 is dropped, thrown, impacted, etc.

For audio output devices (e.g., including a speaker), the output components 110F include speaker components 110F producing an audio output through an outlet (such as the illustrated outlet 114F in the face 212F). In other constructions (not shown), the speaker outlet 114F may be arranged on a different portion of the housing 106F. With the speaker 18F, a screen 122F is disposed behind the face 212F and is preferably micro-etched to provide sound permeability/water impermeability.

Figure 8A:
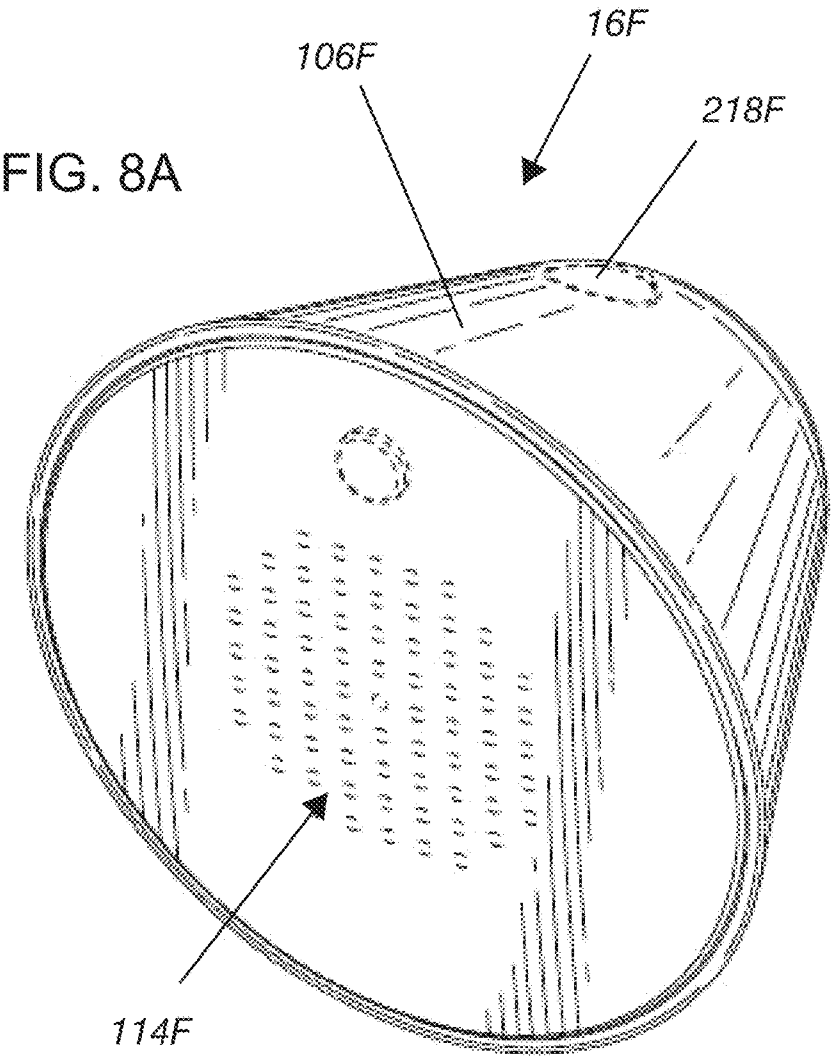
Figure 8C:
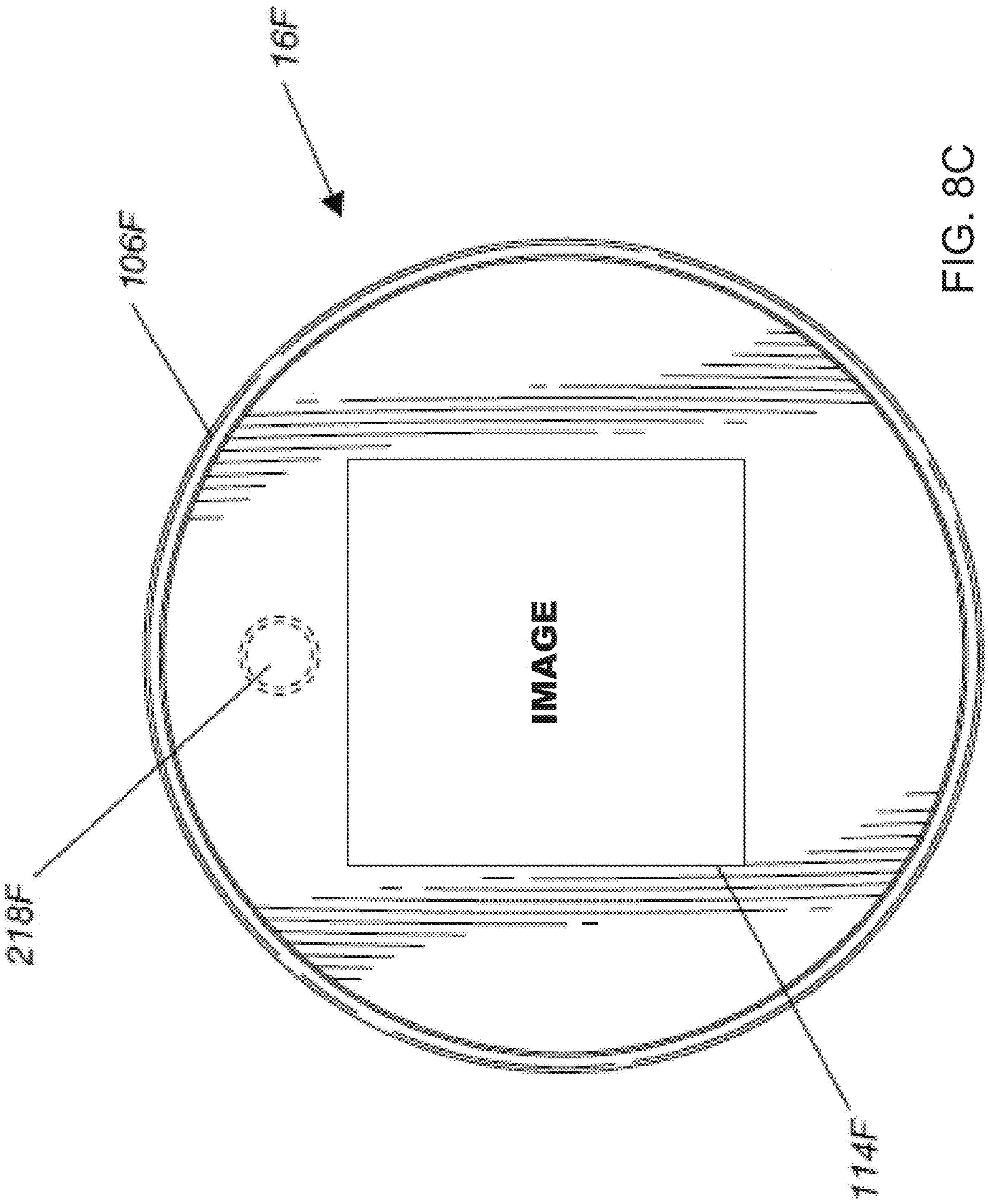
Figure 8D:
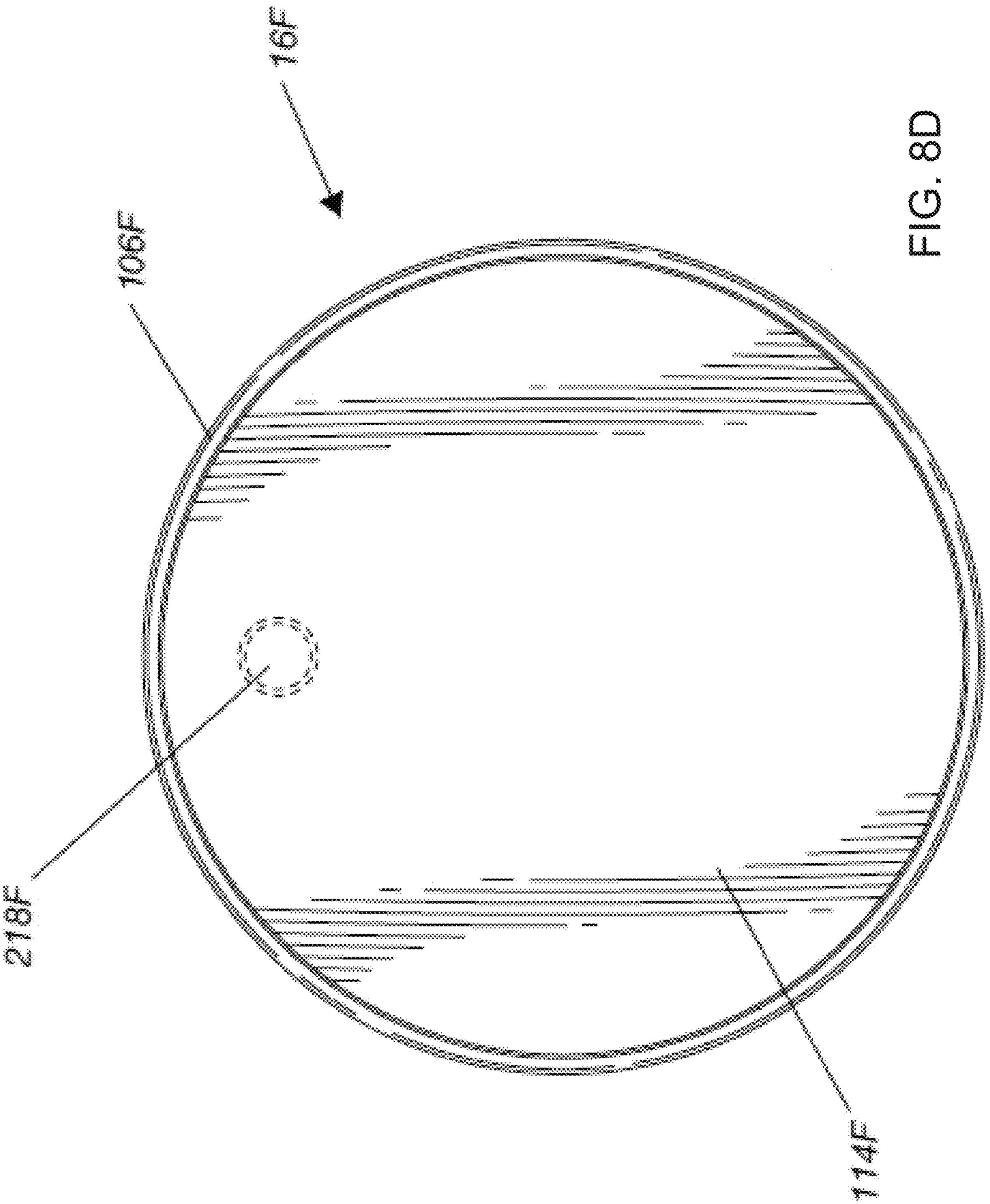
Figure 8E:
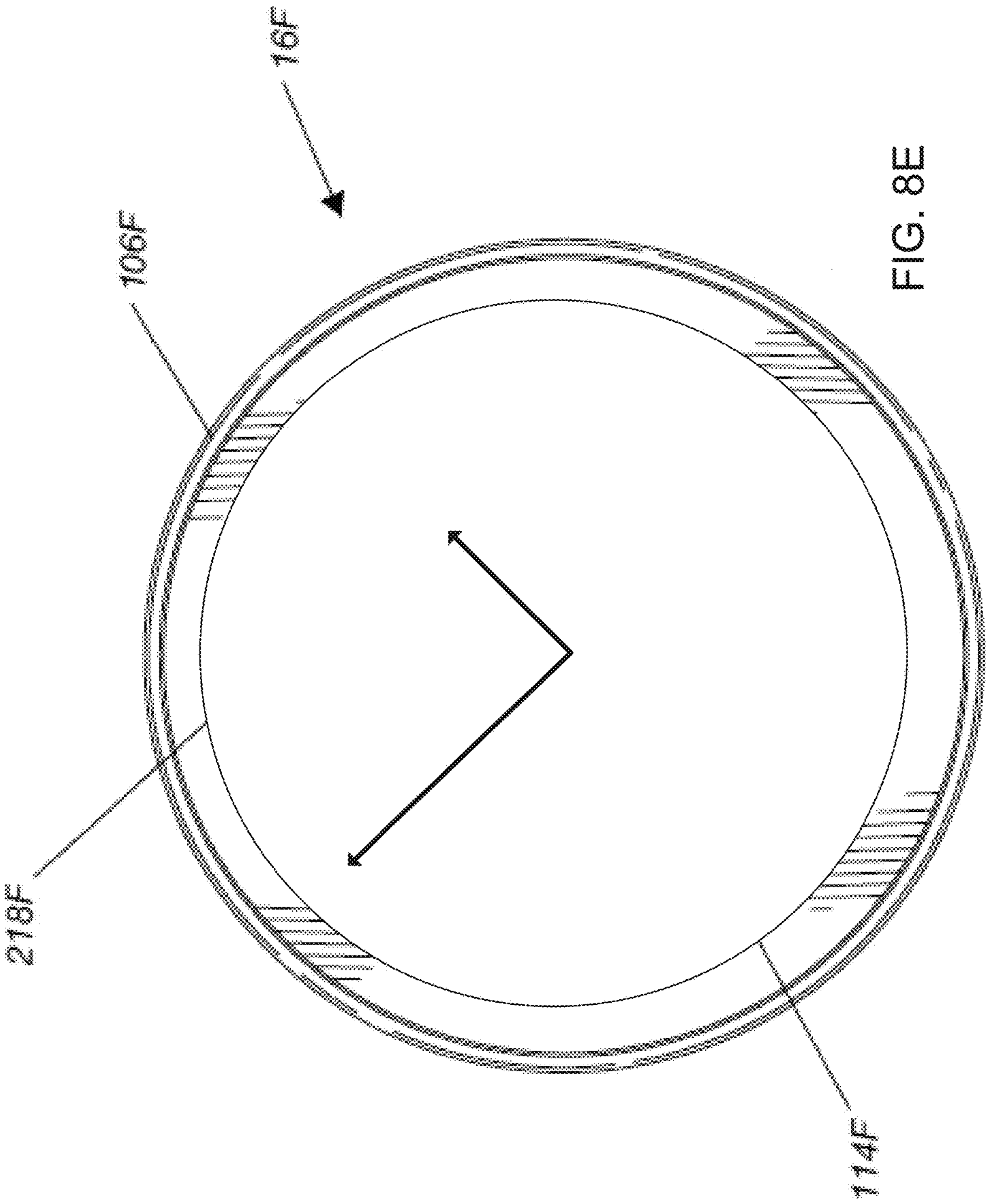

For visual output devices (e.g., a display (FIG. 8C), a light (FIG. 8D), an indicator (FIG. 8E), etc.), the output components 110F include components producing the visual output, for example, on the face 212F or other portion of the housing 106F. In such constructions, the face 212F may not include the illustrated openings (shown in phantom in FIG. 8A) in the outlet 114F.

For material dispensing devices, the output components 110F include a dispensing mechanism (e.g., a pump, a valve, etc.) to dispense material from the device 16F and a reservoir to contain material to be dispensed. The material may be dispensed through openings in the outlet 114F. The dispensing mechanism may be powered by the power source 138F (e.g., a battery-powered pump or valve). Alternatively, the dispensing mechanism may be operated by manual actuation (e.g., by the button 218F). In some constructions, fluid flow (e.g., water flow from the shower device 14F) may power the dispensing mechanism or cause dispensing of material (e.g., by mixing with water from the shower device 14F).

The output components 110F may receive a signal to output and/or for control from a remote source (not shown), such as a phone, computer, other remotely-communicating source device, etc. (e.g., cell phone, smart phone (iPhone), desktop computer, laptop computer, tablet computer (iPad), MP3 player (iPod), other comparable device, shower device controls, etc.).

Communication components 134F (e.g., Bluetooth or IEEE 802.11 ("Wi-Fi") compatible devices) provide a wireless interface between the output components 110F and the remote source. The communication components 134F may provide one- or two-way communication. If two-way communication is provided, the second device 16F and/or the shower device 14F may include input components (control buttons 224 (see FIG. 12B), a key pad, a touch pad, touch screen, a microphone, etc.) capable of generating a signal to be sent to the remote source via the communication components 134F to communicate with a remote device (e.g., to control operation of a remote source).

The second device 16F also includes a power source or power components, such as a battery 138F, for powering components of the second device 16F. A switch (e.g., button 218F) operates the output components 110F, and an indicator 222F (e.g., a LED; see FIGS. 6A, 9A and 9C) lights to indicate that the second device 16F is "ON". In the illustrated construction, the indicator 222F is incorporated into the button 218F.

In the illustrated construction, the battery 138F is rechargeable when the second device 16F is removed from the receptacle 94F. In other constructions (not shown), the battery may be removable for charging and/or replacement. In some constructions (not shown), the battery may be part of a battery pack removable from the housing 106F as a unit (e.g., the rear portion of the second device may form the removable battery pack and be separable from the front portion). In other constructions (not shown), the battery may be supported in a closeable compartment on the housing 106F (e.g., in the front face, a side wall, the rear wall). In still other constructions (not shown), the second device 16F may be powered by line power, for example, when the second device 16 is not removable from the shower device 14 (e.g., formed with the shower device 14 as a unit, formed separately and then non-removably attached to the shower device 14, etc.).

The second device 16F also includes (see FIGS. 9E and 9G) a printed circuit board (PCB) 214F connected to the output components 110F. The PCB 214F provides the communication components 134F and includes a port 216F (e.g., a mini-USB port) connectable to an external source (e.g., a power source (not shown) to charge the battery 138F, an audio source (not shown), etc.). In the illustrated construction, the housing 106F includes structure (e.g., ridges 294) to support components of the second device 16F (e.g., the battery 138F), in this case, in spaced relation from the wall of the housing 106F. As shown in FIGS. 9E, 9G and 10B-10C, a magnet 226F is supported and connected to the housing 106F, for example, in a recess 295 by adhesive, (epoxy), press-fit, welding, etc.

The second device 16F includes a cover 296 to close the port 216F. The cover 296 includes (see FIGS. 9B, 9D-9E, 9G and 18) a barbed projection 300 which is inserted through an opening 304 (see FIGS. 9E and 9G-9I) in the housing 106F. In the closed position (see FIGS. 9B, 9D-9E and 18), the cover 296 engages the housing 106F to provide a water-resistant or water-tight seal. The cover 296 is moved (e.g., pivoted about the projection 300, flexed, etc.) to uncover the port 216F. The cover 296 may be biased toward the closed position so that, when the port 216F is not in use, the cover 296 closes the port 216F.

Figure 10A:
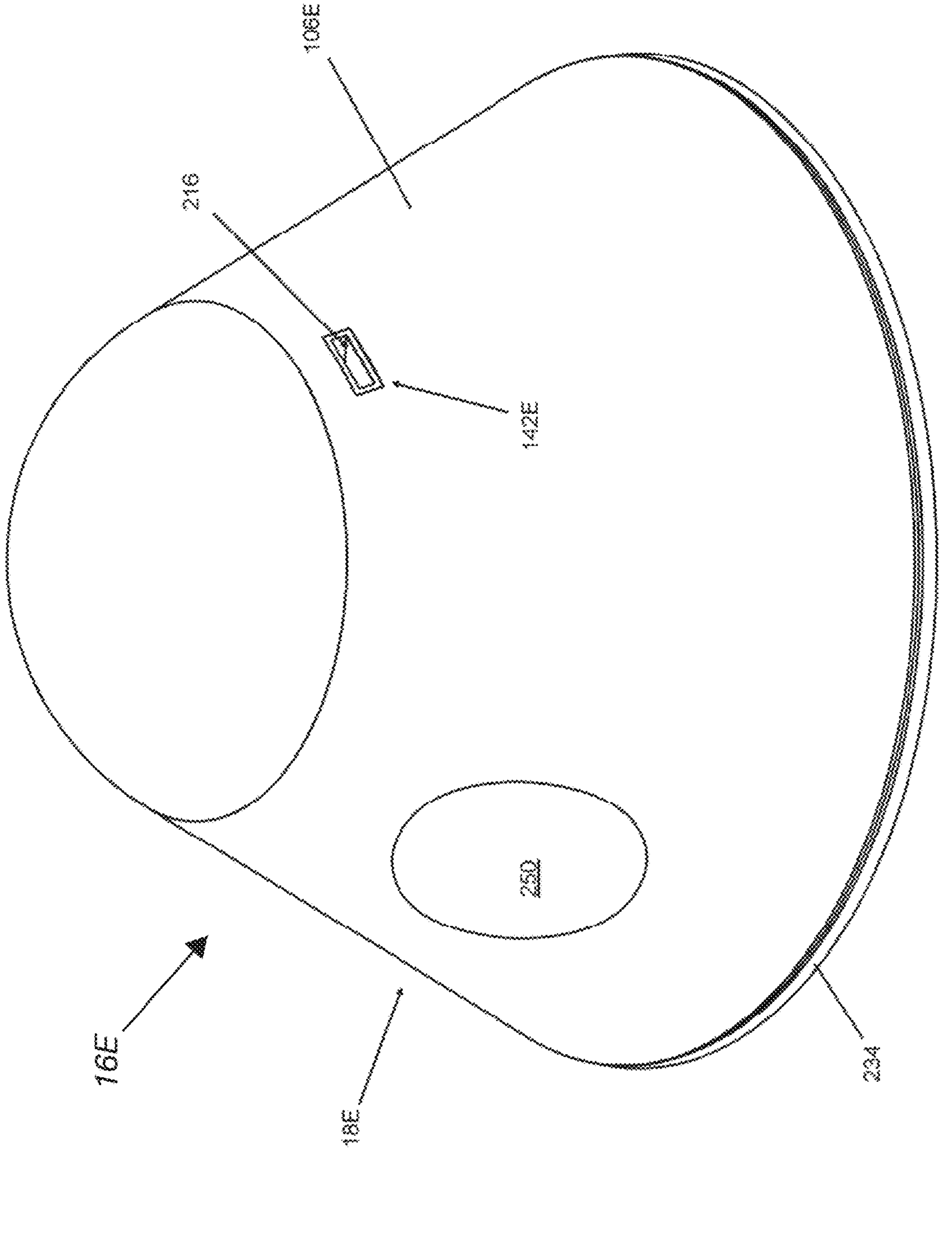
FIGS. 10A-10C are views of an alternative construction of a second device, such as a speaker assembly, shown in FIGS. 9A-9I.
Figure 10B:
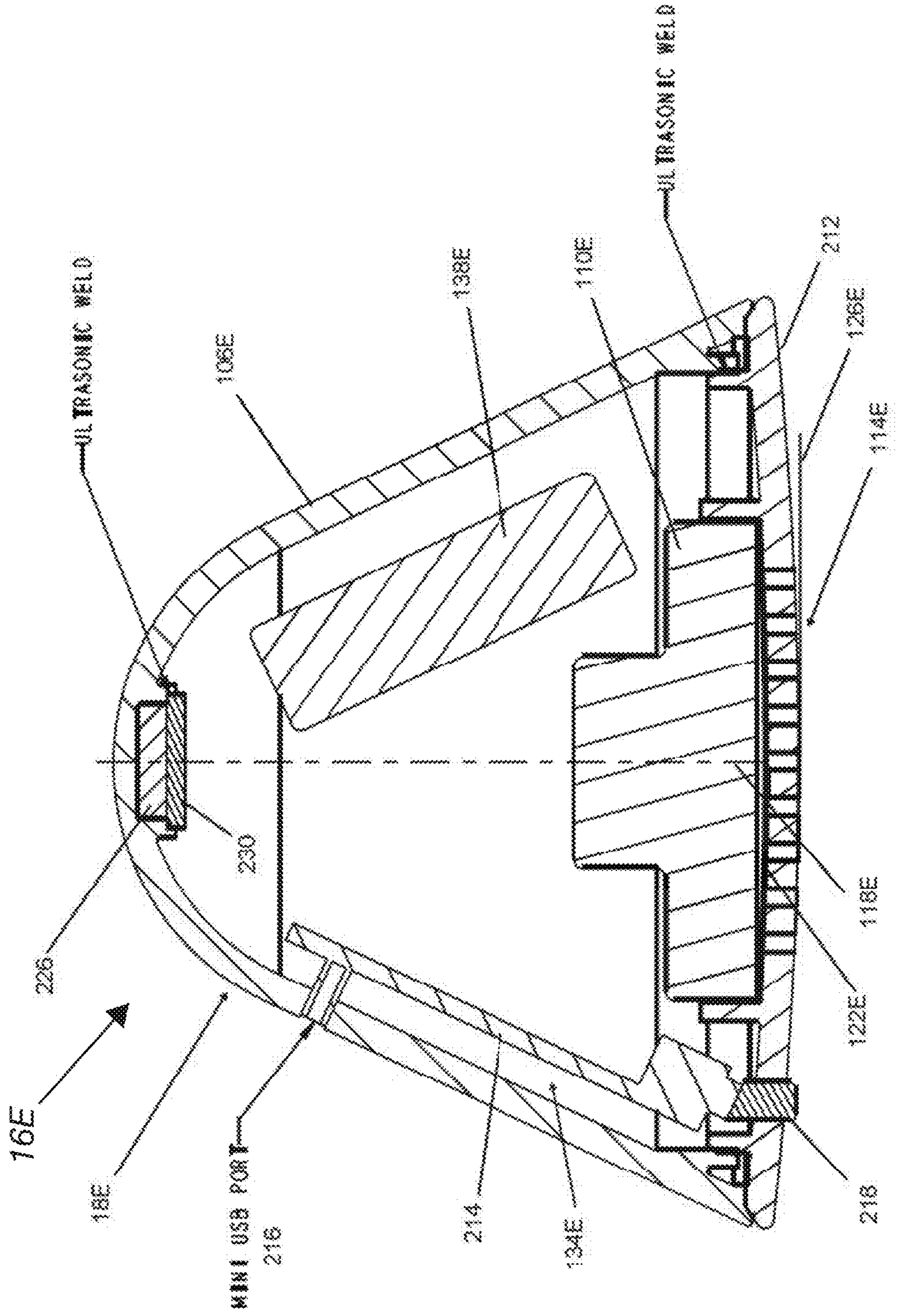
Figure 10C:
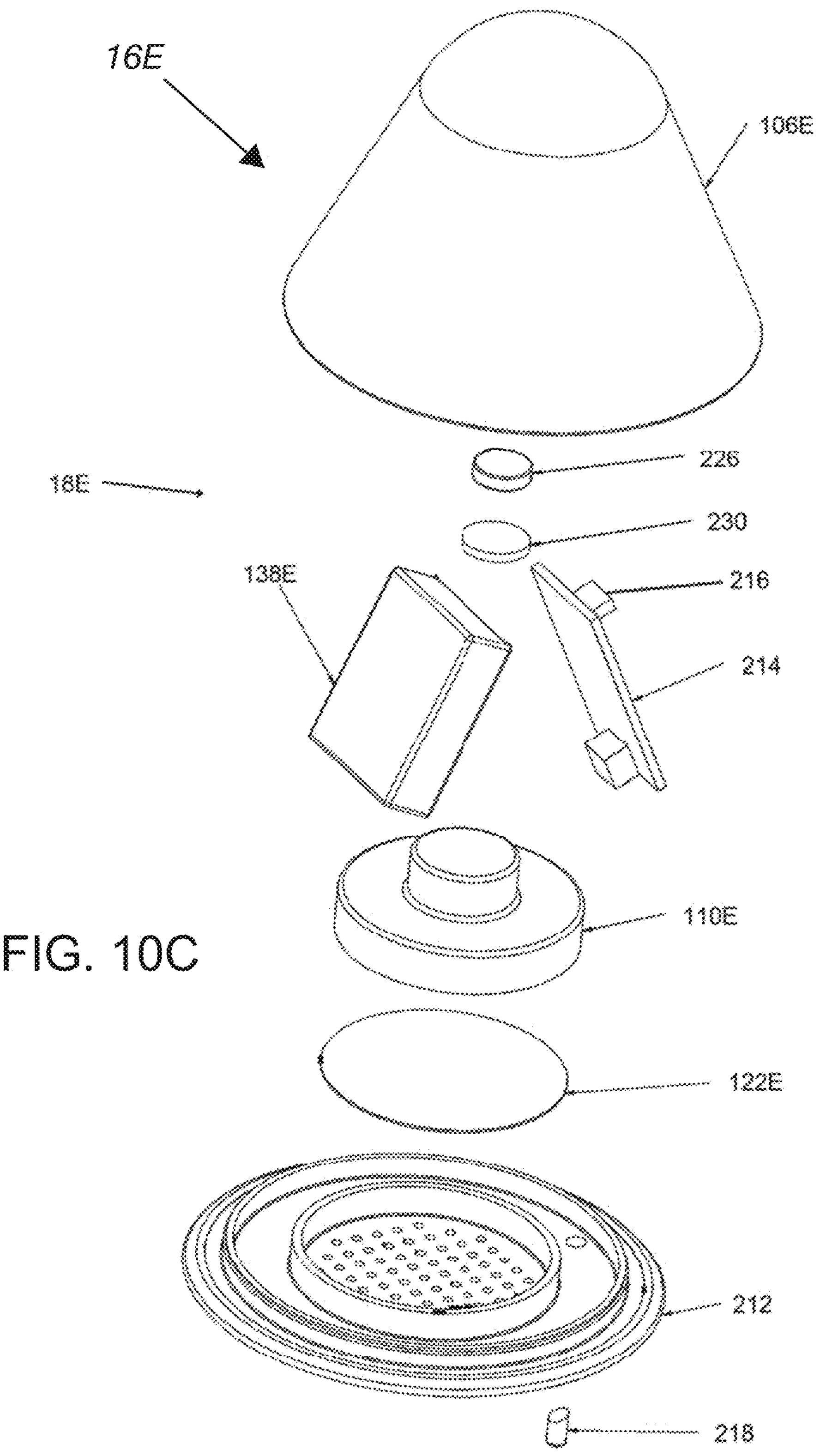

FIGS. 10A-10C illustrate an alternative construction of a second device 16E. As shown in FIG. 10A, a stop feature, such as a "flat" 250, is molded on housing 106E to prevent the second device 16E from moving (e.g., rolling) when supported on a flat surface (e.g., in use on a countertop, during charging, etc.). The second device 16E may have another stop feature shape (e.g., a two-dot pattern texture (not shown), raised ridges 252 (see FIG. 12A) on the housing 106E acting in a similar manner.

In other constructions (see FIGS. 20A-21B), a stand 550 may be provided for the second device 16. The stand 550 is constructed to support the second device 16 separately from the shower device 14 (e.g., for storage, use, battery charging, etc. of the second device 16). In the illustrated construction, the stand 550 has a recess 554 for receiving a portion of the second device 16. With the stand 550, the second device 16 (e.g., the speaker 18) is supported in an appropriate orientation for use.

As illustrated (see FIGS. 10A-10B), a cover is not provided for the port 216. When used with a shower device 14E, the wall of the receptacle 94E covers the port 216 to inhibit water from entering the port 216. In other constructions, a separate cover (not shown but similar to the cover 296 in see FIGS. 9B, 9D-9E, 9G and 18) for the port 216 may be provided.

As shown in FIG. 10B, a magnet 226 is supported on the housing 106E, and a cap 230 covers the magnet 226. The cap 230 is connected to the housing 106E to enclose the magnet 230 in the housing 106E, for example, by welding (e.g., ultrasonic), adhesive, etc.

As shown in FIGS. 6C-6D and 7, the waterway assembly 190F (members 194F, 198F, 264) include cooperating recesses to provide the receptacle 94F. In the assembly 10F, the second device 16F (e.g., the speaker 18F) is inserted into and removed from the receptacle 94F through the front of the showerhead 22F. In the illustrated construction, the waterway 46F is annular and extends around the receptacle 94F. Water enters the showerhead 22F and is directed to the inlet chamber 102F behind the second device 16F. Water flows from the shower inlet 38F to the shower outlets 66F and is diverted around the second device 16F.

Figure 15:
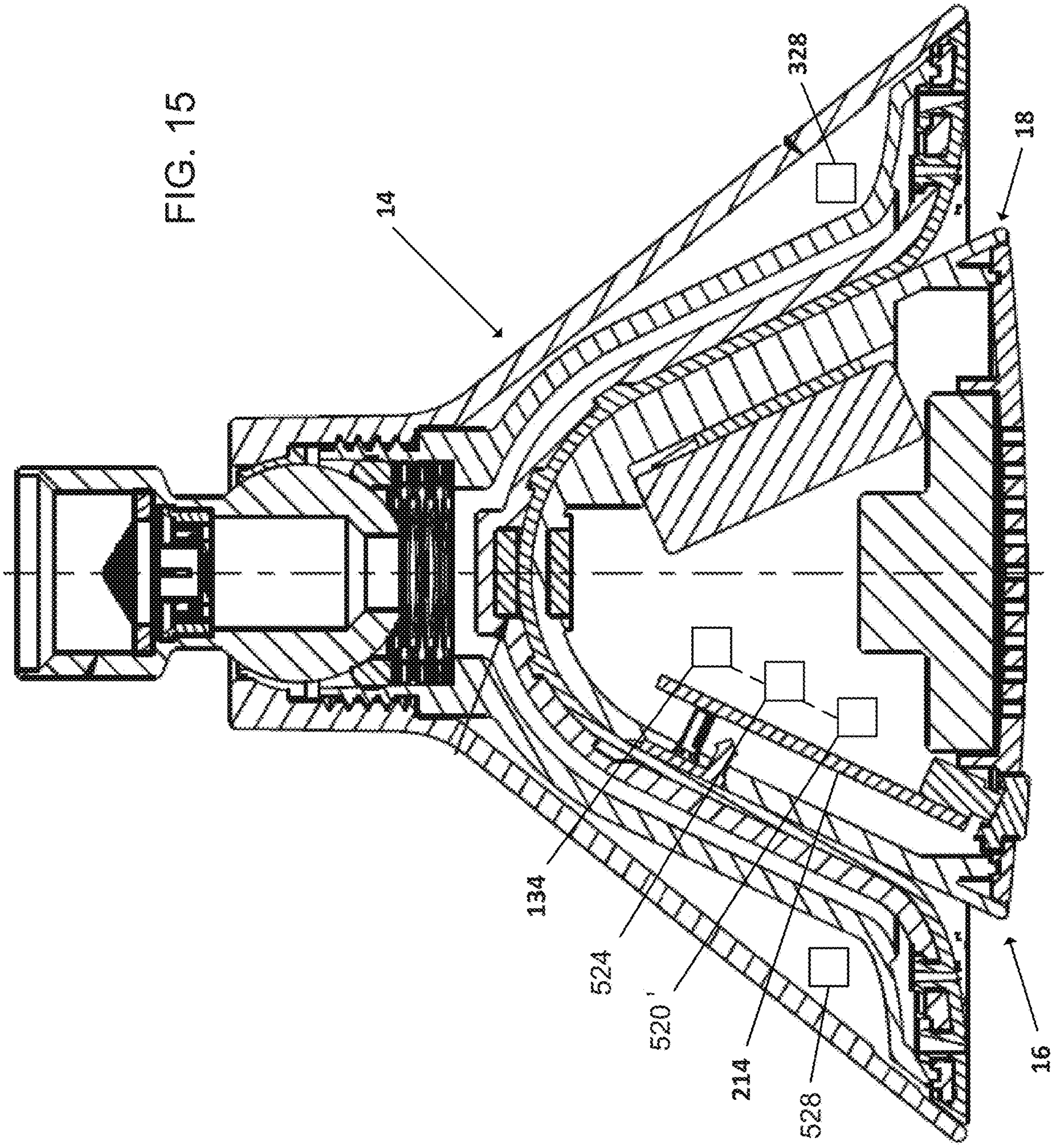
FIG. 15 is a cross-sectional view of a shower assembly and schematically illustrates an alternative construction of a sensor and control assembly.

As shown in FIGS. 6B-6C and 15 (and in FIGS. 11A-11B), the second device 16F (e.g., the speaker 18F) projects from the showerhead 22F so that the second device plane 126F is positioned forwardly of the face plane 90F. In other constructions (not shown), the planes 126, 90 may be generally aligned. In still other constructions (see, for example, FIGS. 1A-5), the second device plane 126 is recessed from faceplate plane 90. With a speaker 18F or other second device capable of outputting sound, acoustic analysis of the shower assembly 10 indicates that the "best" sound production is achieved without any geometry of the showerhead 22F (e.g., the flared surface 86 of the face plate 58) applied to the sound outputting device, in other words, with the second device plane 126 aligned with or positioned forwardly of the shower outlet plane 90.

Even with a forward position of the second device 16 relative to the faceplate plane 90, the orientation of the nozzle axes 274 in a direction away from the second device 16F inhibits water from contacting and potentially damaging or adversely affecting operation of the second device 16F. The nozzles 268 are positioned about the periphery of the housing 106F but are oriented to direct water flow outside of the periphery of the second device 16F. However, in constructions of the second device 16 in which water facilitates operation of the second device 16 (e.g., in some constructions of a material dispenser), nozzles 268 may instead be oriented toward the second device 16.

As shown in FIGS. 6B-6D and 15, the illustrated showerhead housing 30F is generally conical. In other constructions, the showerhead 22 may have a different shape with the outer housing 30 being, for example, cup-shaped, semi-spherical (see FIGS. 11A-11B), bell-shaped (not shown), cylindrical (not shown), etc. In the alternative constructions, the internal components (e.g., the waterway assembly 190F) are common between the constructions with only the different-shaped outer housing 30 being changed/substituted. With alternative outer housings 30, the appearance of the showerhead 22 may thus be easily changed by the manufacturer, distributor or end user. In still further alternative constructions, the outer housing 30 may be common between the constructions, and the internal components (e.g., the waterway assembly 190F) may be changed/substituted.

As shown in FIGS. 6C-6D, 8A, 9A-9B, 9D-9E, 10A-10B, 14-15, 18 and 20A-21B, the illustrated second device 16F is also generally conical. In other constructions, the second device 16 may have a different shape, such as, for example, bell-shaped (see FIGS. 12A-12B), cylindrical (see FIGS. 1A-4), etc. The receptacle 94 has a shape which is complementary to the shape of the second device 16 (e.g., a generally conical receptacle 94F, shown in FIG. 6C, for receiving a generally conical second device 16F). The receptacle 94 and the second device 16 preferably have symmetry about the output axis 118 of the second device 16 such that the second device 16 can be supported in the receptacle 94F in a plurality of rotational orientations.

The illustrated connecting structure 130F provides a magnetic docking arrangement. In the illustrated construction, the showerhead 22F and the second device 16F include cooperating magnets 206F, 226F to releasably retain the second device 16F on the showerhead 22F. In other constructions (not shown), rather than a magnet, one of the showerhead 22F and the second device 16F may include another type of magnetic element (e.g., an element formed of a ferromagnetic material, etc.) which is attracted to the remaining magnet. In still other constructions (not shown), the magnet(s) 206F, 226F may be positioned in a different location on the showerhead 22F and/or on the second device 16F.

The second device 16F is arranged to provide a grip surface (the rim 234F) so that a user can overcome the force of the connecting structure 130F to remove the second device 16F from the showerhead 22F. A space 238F is provided between the rim 234F and the waterway assembly 190F to enable user to grasp the second device housing 106F. In the illustrated construction (see FIG. 6B), the space 238F is an axial space because the second device 16F projects from the showerhead 22F.

In constructions in which the second device 16 is aligned with or recessed into the showerhead 22, an annular space may be provided so that the rim 234 may be gripped. Still other arrangements may be provided to allow access to the second device 16. For example, a recess or opening (not shown) may be provided on the showerhead 22 to allow access to rim 234 of the second device 16. In other constructions, portions of the second device housing 106 may extend beyond the waterway assembly 190. For example, wings (not shown) on the second device 16 project to the radial edge of showerhead 22. In other constructions (not shown), the second device 16 may include a material (e.g., elastomeric) and/or shape(s) (e.g., scallop shape) providing an improved grip surface.

The pattern of the showerhead outlets 66 and of the face of the second device 16 (e.g., the speaker 18) may be coordinated. In the illustrated construction (see FIGS. 9A and 9C), the outlets 66F are arranged in a generally uniform two-hole pattern for universal nesting of the second device 16F (e.g., the speaker 18F) in the showerhead 22F.

As shown in FIG. 11A, the assembly 10 may include a light source 254 which emits light from the receptacle 94 around the second device 16. In the construction shown in FIG. 11A, the light source 254 is supported on the housing 106 and reflects out of the receptacle 94. In other constructions (see FIG. 8D), the second device 16 may itself be a light source (e.g., having one or more LEDs) with light being output from the face 212.

In an exemplary process of assembling the shower assembly 10F, the waterway members 194F, 198F are connected, for example, by welding (ultrasonic), adhesive, etc. The magnet 206F is positioned in the recess 292 and connected to the inner waterway member 198F, for example, by adhesive (epoxy), press-fit, welding, etc. The nozzle member 264 is assembled to the inner waterway member 198F, with each nozzle 268 being inserted into an associated opening 260, the barbs 272 engaging the inner waterway member 198F and the edge 276 being wrapped around the edge 280 of the inner waterway member 198F.

The components of the ball joint 34F are connected to the waterway assembly 190F, and a selected showerhead housing 30F (e.g., a conical housing 30F) is threaded on, completing assembly of the showerhead 22F. The second device 16F (a speaker 18F) is inserted into the receptacle 94F and connected to the showerhead 22F by the connecting structure 130F (e.g., the magnets 206F, 226F).

In some constructions (see FIGS. 13A-13E), the shower device 14 may include a multi-function shower device to selectively provide different shower functions, modes (e.g., a soft spray mode, a pulse spray mode, an aerated spray mode, a cyclone spray mode, use of different numbers of spray nozzles, flow rates, pressures, etc.). The terms "mode" and "function" may be used interchangeably herein.

An example of a suitable multi-function shower device and spray engine and its operation are illustrated and described in U.S. Patent Application Publication No. US 2014/0138461 A1, published May 22, 2014, the entire contents of which is hereby incorporated by reference. The illustrated exemplary shower device may be modified to incorporate a second device 16, for example, by replacing its central soft spray mode with or reconfiguring the spray modes around a central receptacle for the second device 16.

Figure 13A:
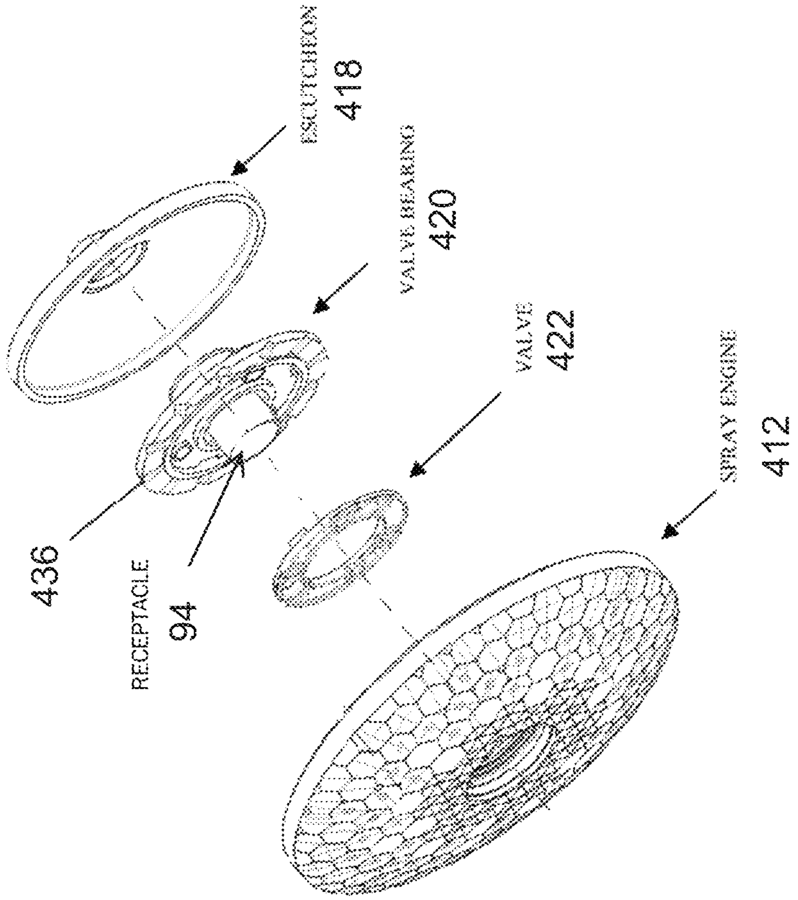
FIGS. 13A-13E are views of an alternative construction of a shower device, such as a multi-function shower device, for use with a second device.
Figure 13B:
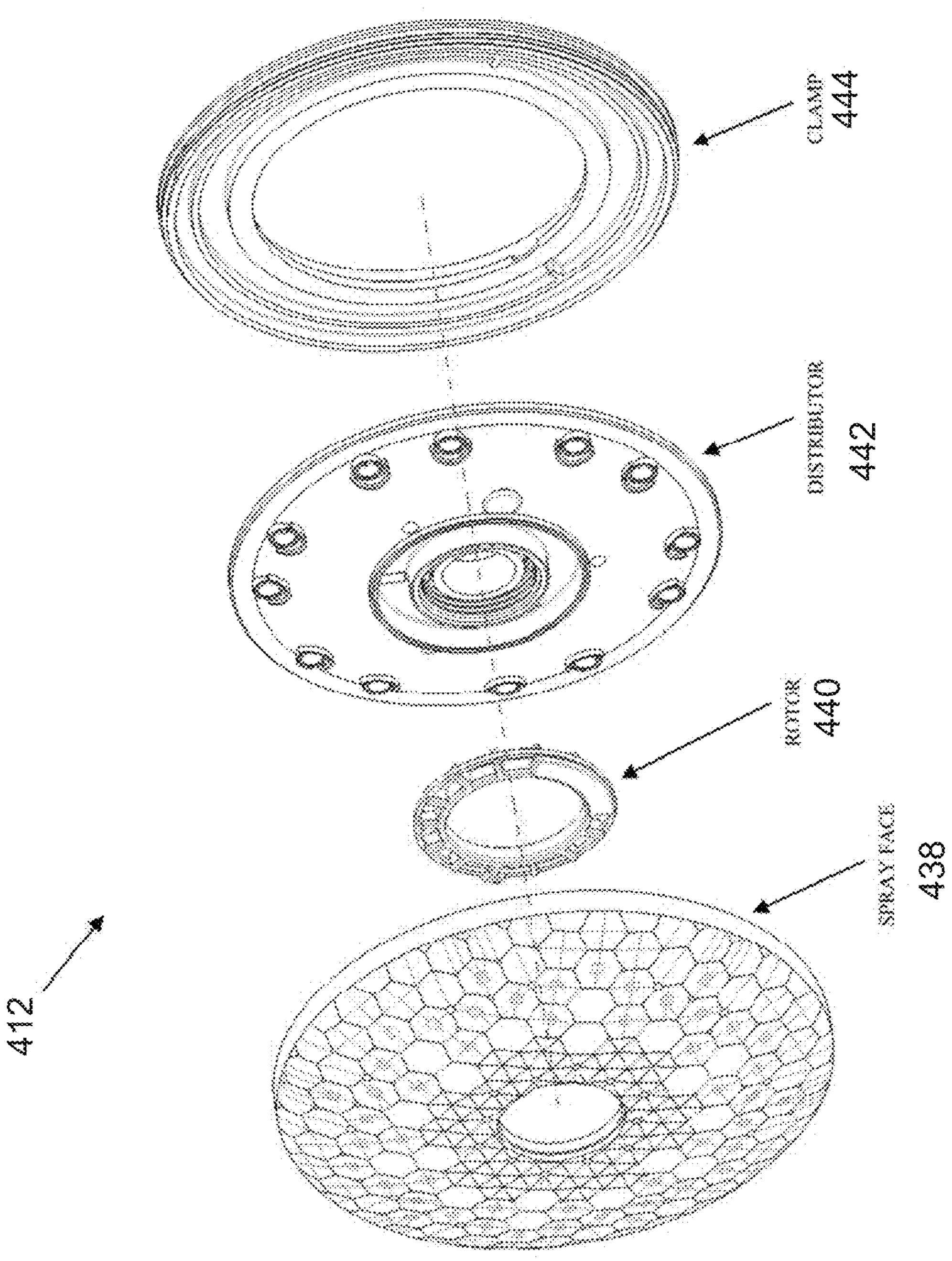

As shown in FIG. 13A, the illustrated multi-function shower device 14 includes a spray engine 412, a valve bearing 420 and a valve 422. As shown in FIG. 13B, the spray engine 412 includes a spray face 438, a distributor 442 and a clamp 444. In the illustrated construction, the spray engine 412 provides a pulse spray mode, an aerated spray mode and a cyclone spray mode. The illustrated spray engine 412 is continuously rotatable (can rotate infinitely in either direction) with respect to the valve bearing 420 and valve 422 to change between various functions, or spray modes, of the shower device 414.

Figure 13C:
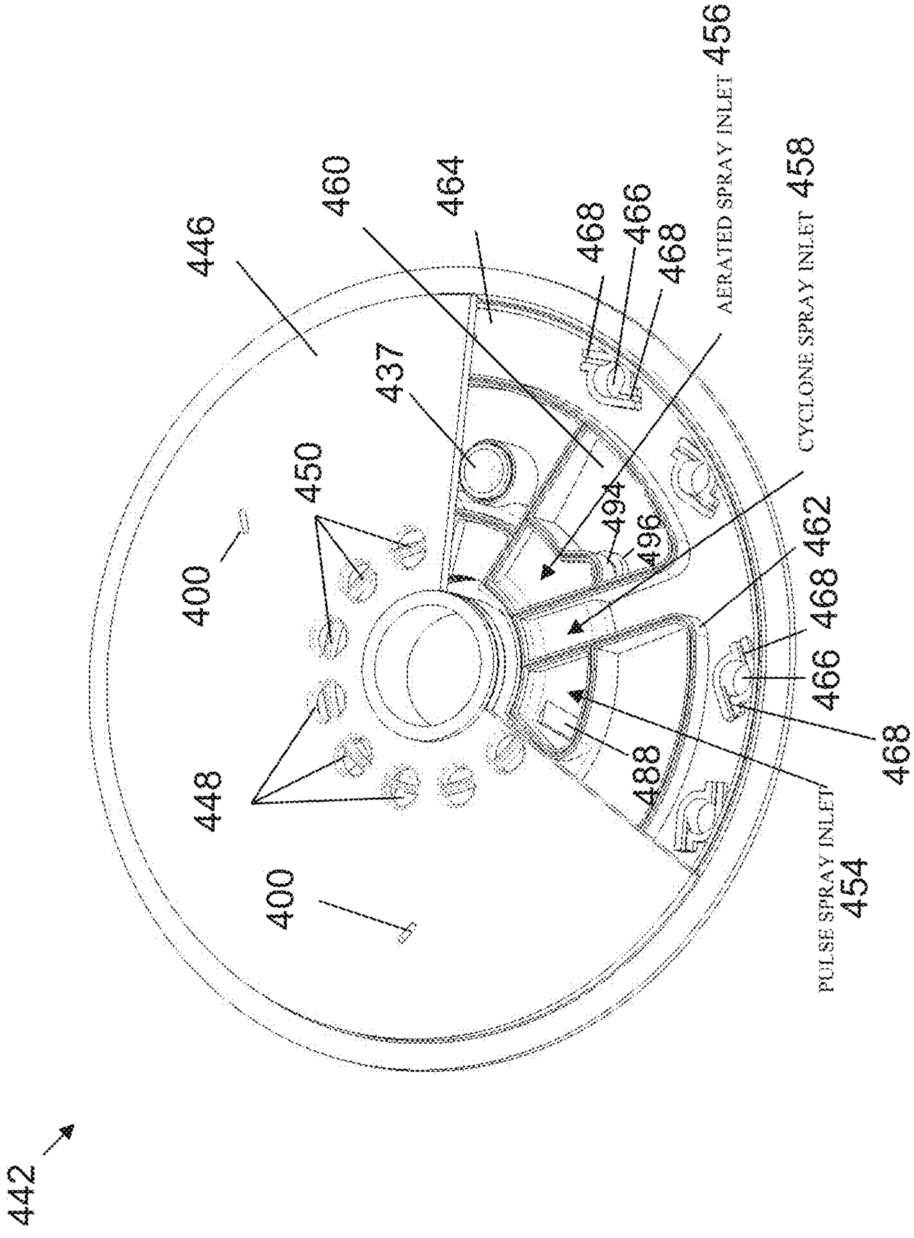

FIG. 13C illustrates a rear view of the distributor 442, the side of the distributor 442 from which fluid enters. The distributor 442 has a plurality of ports 448, and each of the discrete rotational positions of the spray engine 412 corresponds to one port 448 (e.g., the shower device 14 employs the same number of ports as discrete rotational positions).

Figure 13D:
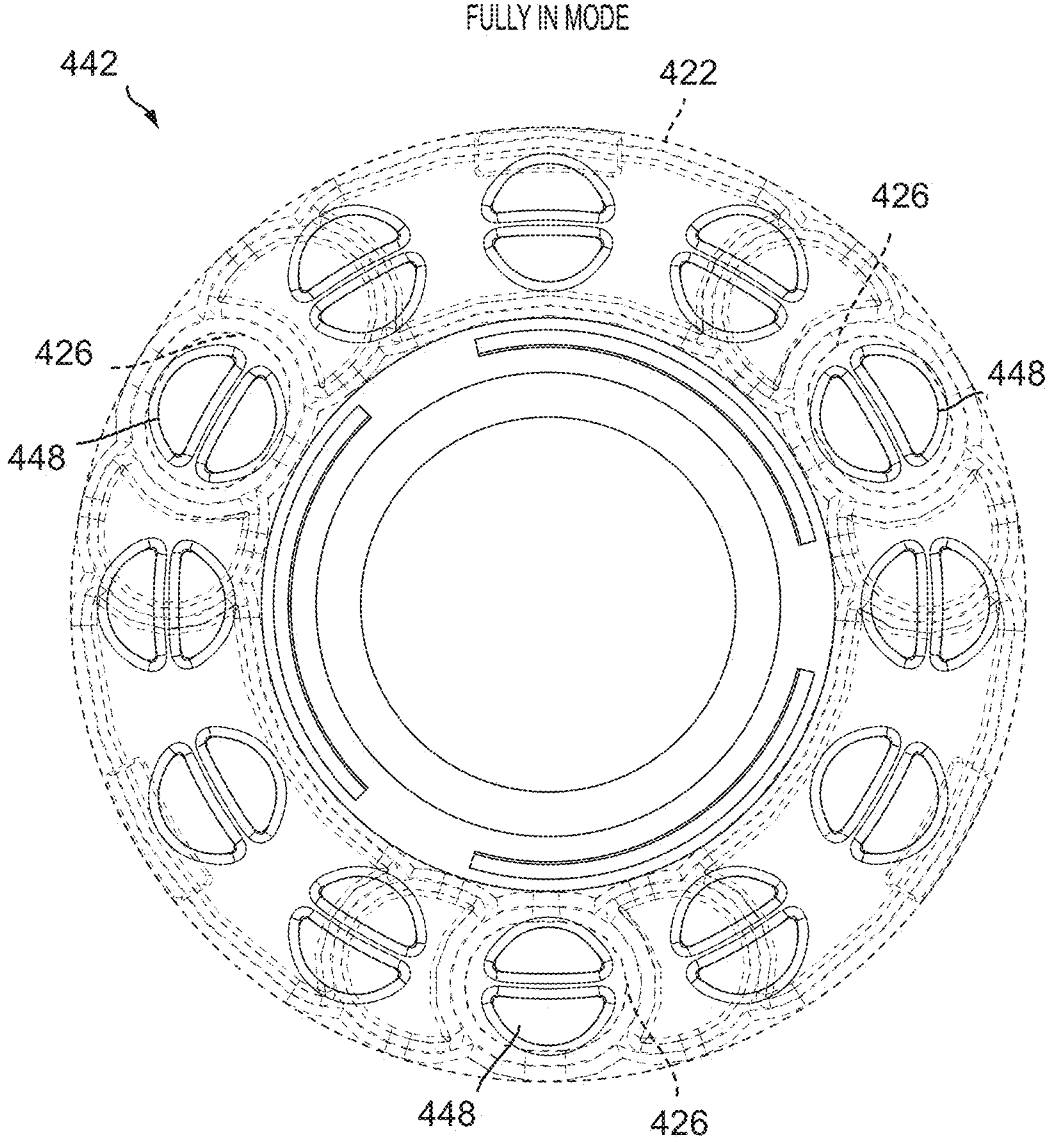

The distributor 442 also includes a plurality of discrete inlets 454, 456, 458, and each of the ports 448 is aligned with an inlet 454, 456, 458. In the illustrated construction, the distributor 442 includes three of each of the inlets 454, 456, 458. In a given position of the spray engine 412 with respect to the valve 422 (see FIG. 13D), a set of three associated ports 448, each spaced 120 degrees apart, aligns with the three flow ports 426 in the valve 422. FIG. 13D illustrates the ports 448 in one of the discrete rotational positions of the spray engine 412 (e.g., fully in a spray mode).

As described above, each set of three ports 448 corresponds with a set of spray inlets 454, 456, 458 corresponding with a single spray mode. The shower device 414 may include one, two, three, four, five or more modes and be scaled to various sizes (e.g., from 90 mm to 160 mm diameter). Any combination of number of modes and size may be employed.

The shower device 414 includes a receptacle 94 for receiving a second device 16. A connecting structure (not shown, but similar to those described above) is provided to releasably connect the second device 16 to the shower device 14.

In the illustrated construction, the valve bearing 420 provides the receptacle 94, and the spray engine 412 is pivotable relative to the receptacle 94 and relative to the second device 16 supported in the receptacle 94. Accordingly, during adjustment of the shower function, the second device 16 does not pivot and thus remains in the position/orientation in which it is installed, thereby maintaining input components, logos, etc. in a desired position/orientation.

In other constructions (not shown), the receptacle 94 may be provided by the pivotable spray engine 412. In such constructions, the receptacle 94 and the second device 16 pivot with the spray engine 412 during adjustment of the shower mode.

Figure 13E:
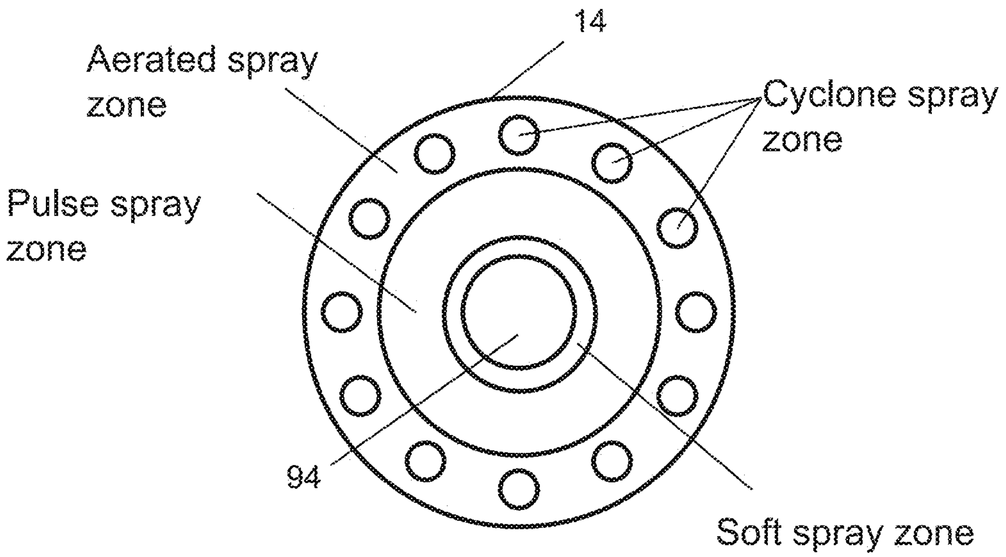

FIG. 13E schematically illustrates the spray face 438 divided into a plurality of spray zones with a receptacle 94 in the center. The illustrated shower device 414 is constructed with a centrally-located receptacle 94 and concentric spray zones (a soft spray zone 470, a pulse spray zone 472 and an aerated spray zone 474). A cyclone spray zone 476 is provided in the aerated spray zone 474. A second device 16 is supportable in the receptacle 94.

In some constructions (see FIGS. 14-15), input components to control operation of the second device 16 may include the second device 16 itself. For example, manipulation of the second device 16 may control operation of the second device 16 and/or the remote source (e.g., for a speaker 18, adjust the volume, tone, quality of the output, adjust output between multiple second devices 16, control playback or mode of the remote source (forward, reverse, change track, change from one mode (media playback) to another mode (phone), pivot the display to be upright, etc.). For other configurations of the second device 16 (e.g., a light, a dispenser, etc.), manipulation of the second device 16 may control similar operational characteristics (e.g., the brightness of the light, the dispensing rate for the dispenser, etc.) or other characteristics.

Figure 14:
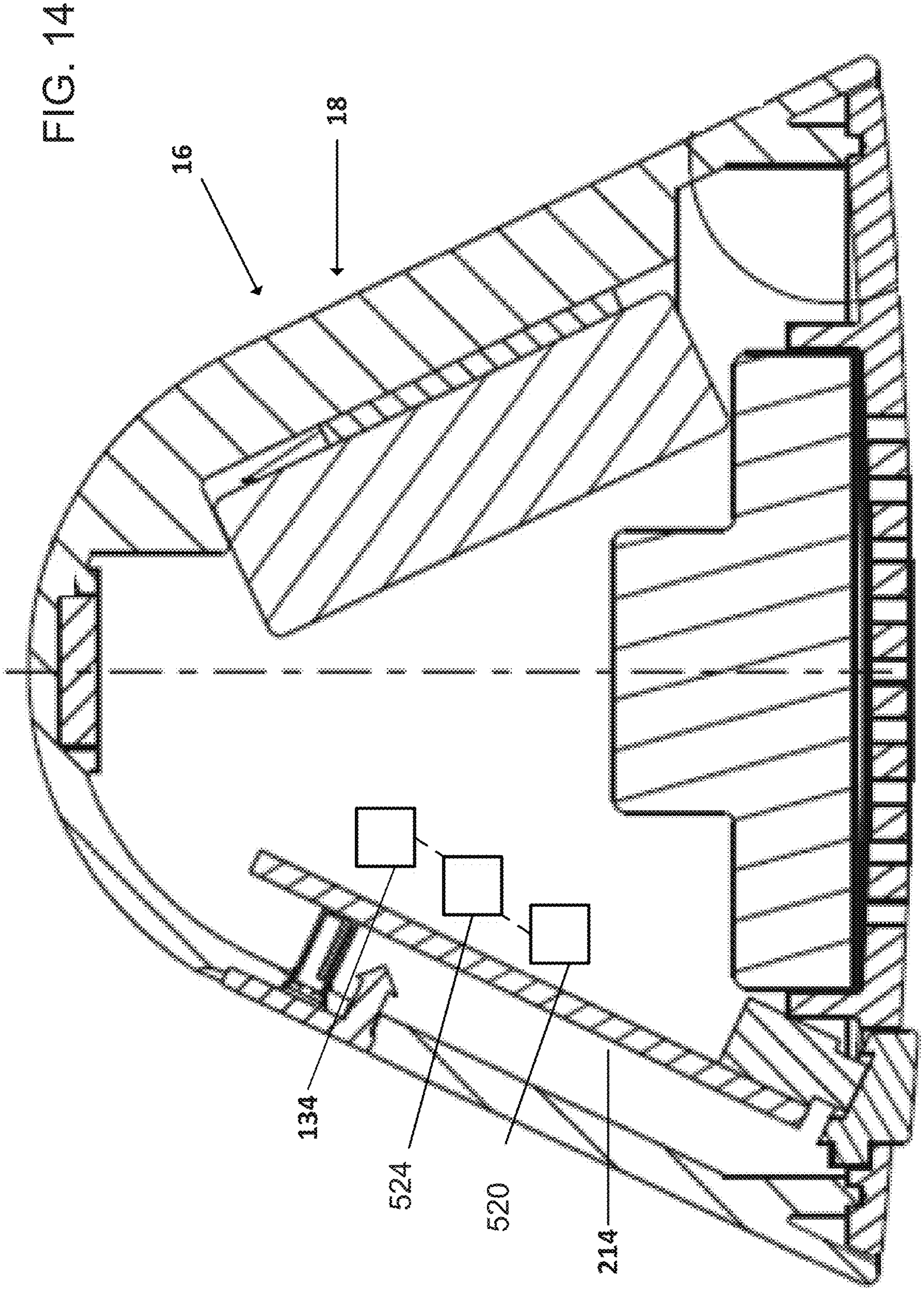
FIG. 14 is a cross-sectional view of a second device and schematically illustrates a sensor and control assembly.

As shown in FIG. 14, the second device 16 may include a sensor 520 operable to sense a characteristic of the second device 16 (e.g., a position, orientation or change of position/orientation of the second device 16 (for example, relative to the shower device 14 or support 132 or relative to the environment, etc.)). The sensor 520 may include an accelerometer, gyroscope, other device, etc., supported by the housing 106 and operable to sense the characteristic. Based on the sensed characteristic, control components 524 (e.g., of the PCB 214) control operation of the second device 16 and/or of the remote source, (e.g., adjust the volume, control playback (forward, reverse, skip/change track), etc.).

The control components 524 include combinations of hardware and software that are operable to, among other things, configure and control operation of the second device 16 and/or the remote source. The control components include a processing unit (e.g., a microprocessor, a microcontroller, or another suitable programmable device), non-transitory computer-readable media, and an input/output interface. The processing unit, the media, and the input/output interface are connected by one or more control and/or data buses. The computer-readable media stores program instructions and data. The processing unit is configured to retrieve instructions from the media and execute the instructions to perform the control processes and methods described herein.

The input/output interface transmits data from the control components 524 to external systems, networks, and/or devices and receives data from external systems, networks, and/or devices. The input/output interface stores data received from external sources to the media and/or provides the data to the processing unit.

In the illustrated construction, the sensor 520 senses the orientation/change in position of the second device 16 relative to the environment. In one example (e.g., for a speaker 18, based on the change in position, the control components adjust the volume of the output (e.g., pivoting the speaker 18 clockwise increases the volume; pivoting counterclockwise decreases the volume). In another example, based on the change in position, the control components control playback (e.g., pivoting the speaker 18 clockwise skips forward to the next track; pivoting counterclockwise skips backward to the previous track).

An example of a suitable sensor 520, such as an accelerometer, and its operation to control a device are illustrated and described in U.S. Patent Application Publication No. US 2010/0219775 A1, published Sep. 2, 2010, the entire contents of which is hereby incorporated by reference.

A circuit (not shown) for the sensor 520 includes a 3-axis accelerometer circuit (not shown). The accelerometer circuit includes an inertial sensor (not shown) having internal sensing elements measuring the Earth's static gravitational field by providing acceleration information in three axes (e.g., mutually orthogonal axes X, Y and Z) and outputting signals based on the sensed conditions. In other constructions, the accelerometer circuit may be a single axis or 2-axis accelerometer circuit.

The sensor 520 and control components 524 provide control of the second device 16/remote source even when the second device 16 is not supported in the shower device (e.g., on a counter top, in a stand (such as the stand 550), floating in a tub, etc.). For example, the volume may be adjusted as the second device 16 is rolled on the counter top, pivoted in the stand, etc., with external structure (e.g., raised ridges 252 (see FIG. 12A)) providing defined volume positions.

In the tub, the control arrangement may provide additional functionality as the second device 16 bobs in the water. For example, when the sensor 520 senses a constantly or frequently changing orientation (e.g., of the second device 16 bobbing in a tub), the control components 524 may cause the second device 16 to emit light, change emitted light color, glow (when the second device 16 includes a light source or light-emitting device), shake (when the second device 16 includes a mechanism to cause shaking/vibration), etc.

In another construction (see FIG. 15), the sensor 520' may be part of a sensor assembly and cooperate with structure on the shower device 14 or the support 132. For example, the sensor 520' may include a Hall effect sensor, and one or more magnets 528 may be supported on the shower device 14. As the second device 16 is adjusted relative to the shower device 14, the Hall effect sensor senses the change, and the control components 524 adjust operation (e.g., volume) accordingly.

In operation, the control components 524 may determine the initial characteristic (e.g., position) of the second device 16 (e.g., when the second device 16 is turned "ON", when the second device 16 is connected to the shower device 14/support 132, etc.). For this initial position, the control components 524 set an initial operational condition for the second device 16 and/or the remote source (e.g., an initial volume level). This initial operational condition (and others) may be set during manufacture and/or programmed by the user. When a user adjusts the second device 16 (e.g., by pivoting about the axis 118 (see FIG. 14)), the sensor 520, 520' senses the change in position, and the control components 524 adjust, for example, the output volume accordingly.

Figure 16A:
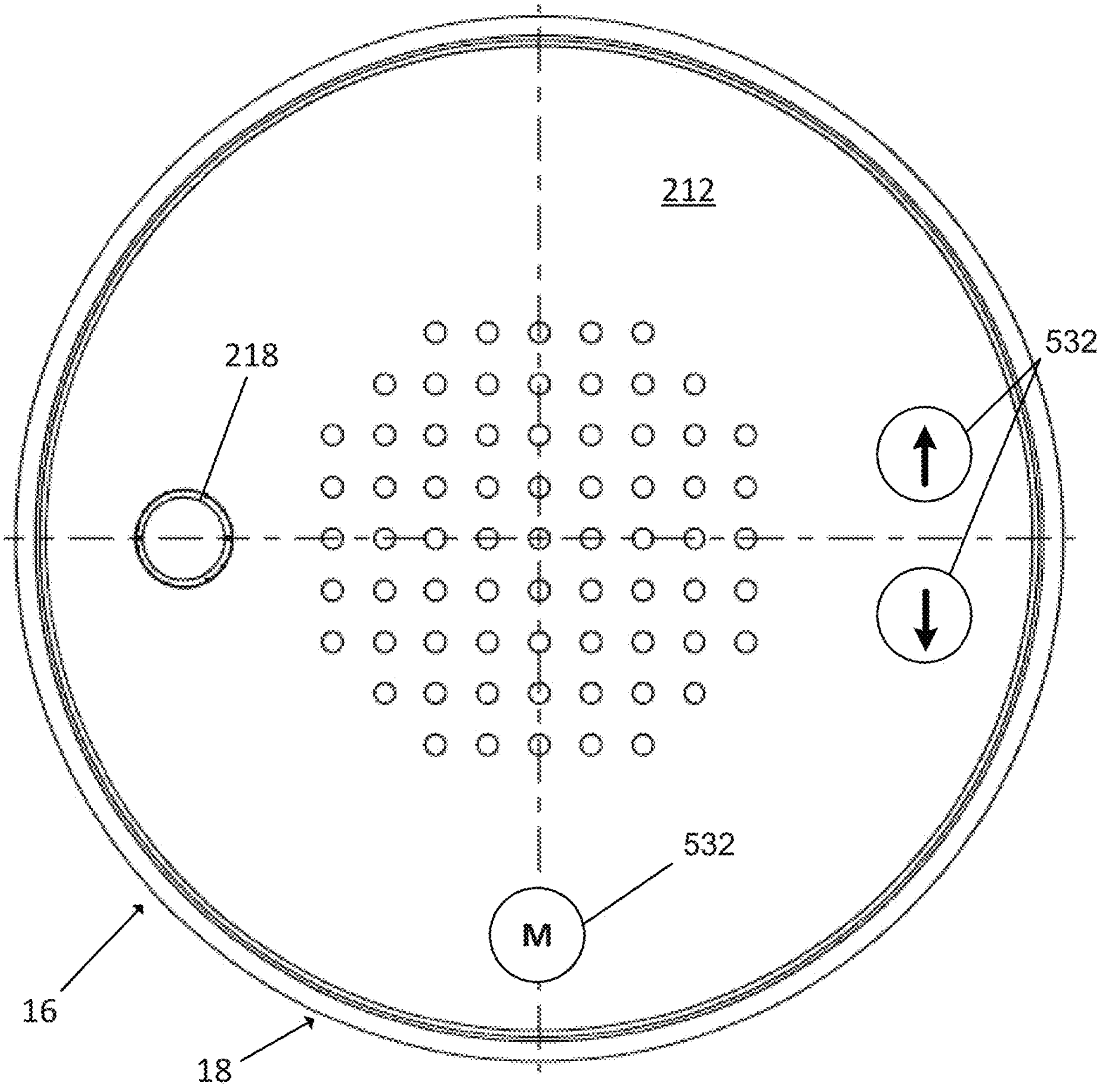
FIG. 16A is a front view of a second device and illustrates an alternative construction of input components.

A mode select button M (see FIG. 16A) may also be incorporated into the second device 16. Based on input to the mode select button M and subsequent manipulation of the second device 16 by the user (as sensed by the sensor 520, 520'), the control components 524 adjust the selected operation accordingly. For example, the mode select button M may be used to select between volume, track selection, etc., such that, when "volume" mode is selected, manipulation of the second device 16 by the user controls the volume accordingly and, when "track selection" mode is selected, the same manipulation of the second device 16 by the user controls the track selection accordingly.

In some constructions (see FIG. 16A), input components to control operation of the second device 16 may include one or more touch sensors 532 (e.g., capacitive, resistive, etc.). In the illustrated construction, the second device 16 includes a touch sensor 532 for the mode select button M of the second device 16/remote source to be controlled (e.g., volume, tone, quality of the output, balance/fade between multiple second devices 16, playback or mode of the remote source (forward, reverse, change track, change from one mode (media playback) to another mode (phone), etc.) and two touch sensors 532 (shown with arrows) to provide the user input in the selected mode. The ON/OFF button 218 may also include a touch sensor 532.

Figure 16B:
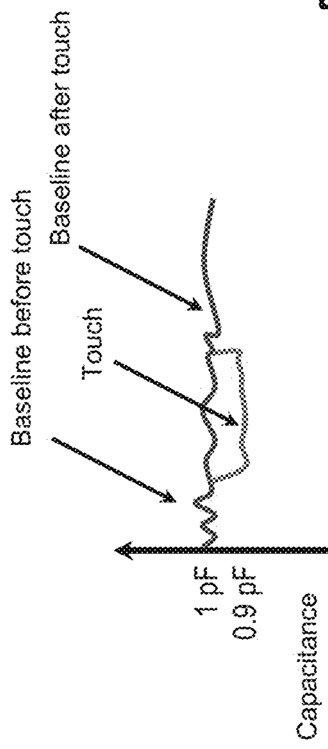
FIGS. 16B-16E are schematic views of constructions of an input component.
Figure 16C:
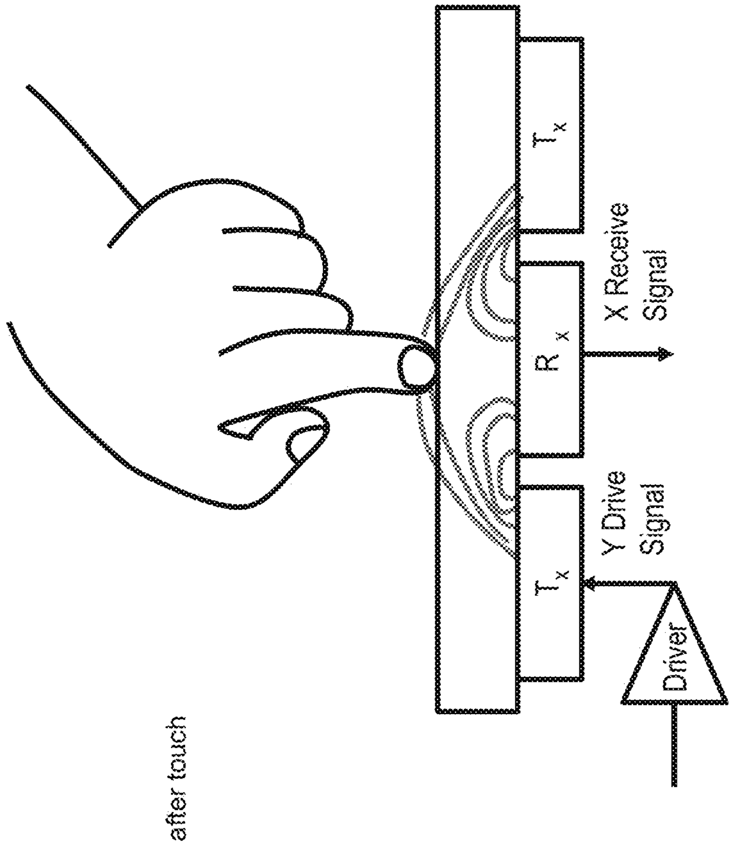

The capacitive touch sensor(s) 532 (see FIG. 16C) generally include a conductive sensor surface insulated with respect to ground. The control components 524 sense the touch of the user on the sensor surface (e.g., closing a circuit; see FIG. 16B) and control operation of the second device 16 and/or the remote source based on the user input.

Examples of a capacitive touch sensor 532 and its operation to control a device are illustrated and described in U.S. Pat. No. 8,847,913, issued Sep. 30, 2014, U.S. Pat. No. 6,734,685, issued May 11, 2004, U.S. Patent Application Publication No. US 2015/0002467 A1, published Jan. 1, 2015, U.S. Patent Application Publication No. US 2013/0263370 A1, published Oct. 10, 2013, and U.S. Patent Application No. 61/934,811, filed Feb. 2, 2014, the entire contents of all of which is hereby incorporated by reference.

Figure 16E:
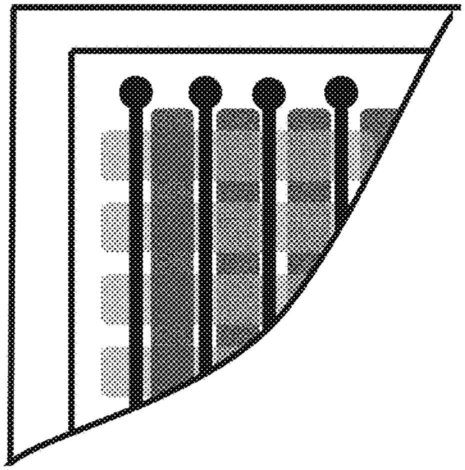
Figure 16D:
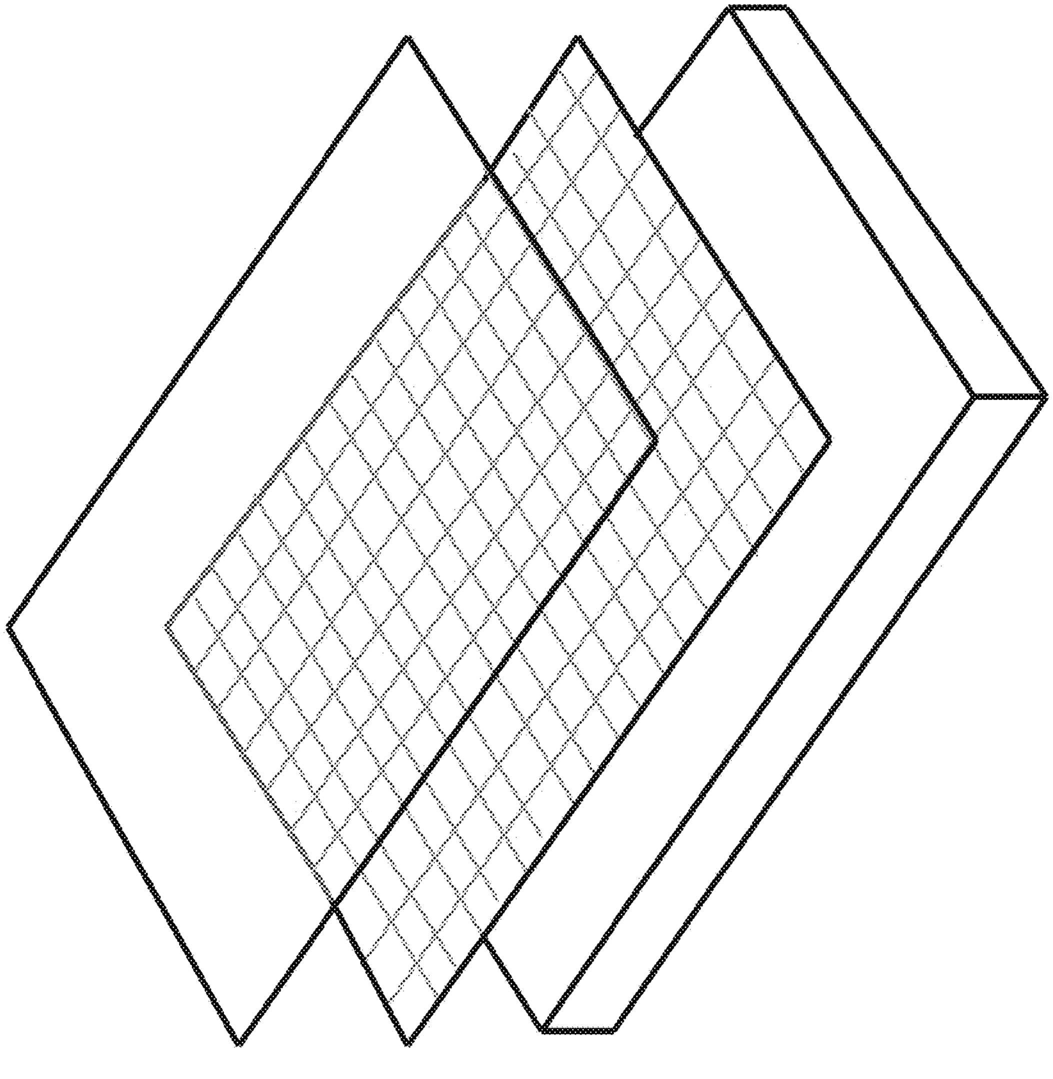

The resistive touch sensor(s) 532' (see FIGS. 16D-16E) may generally include two flexible sheets coated with a resistive material and separated by an air gap or microdots. When contact is made to the surface of the touch sensor, the two sheets are pressed together. On these two sheets are horizontal and vertical lines that, when pushed together, register the precise location of the touch.

Figure 17:
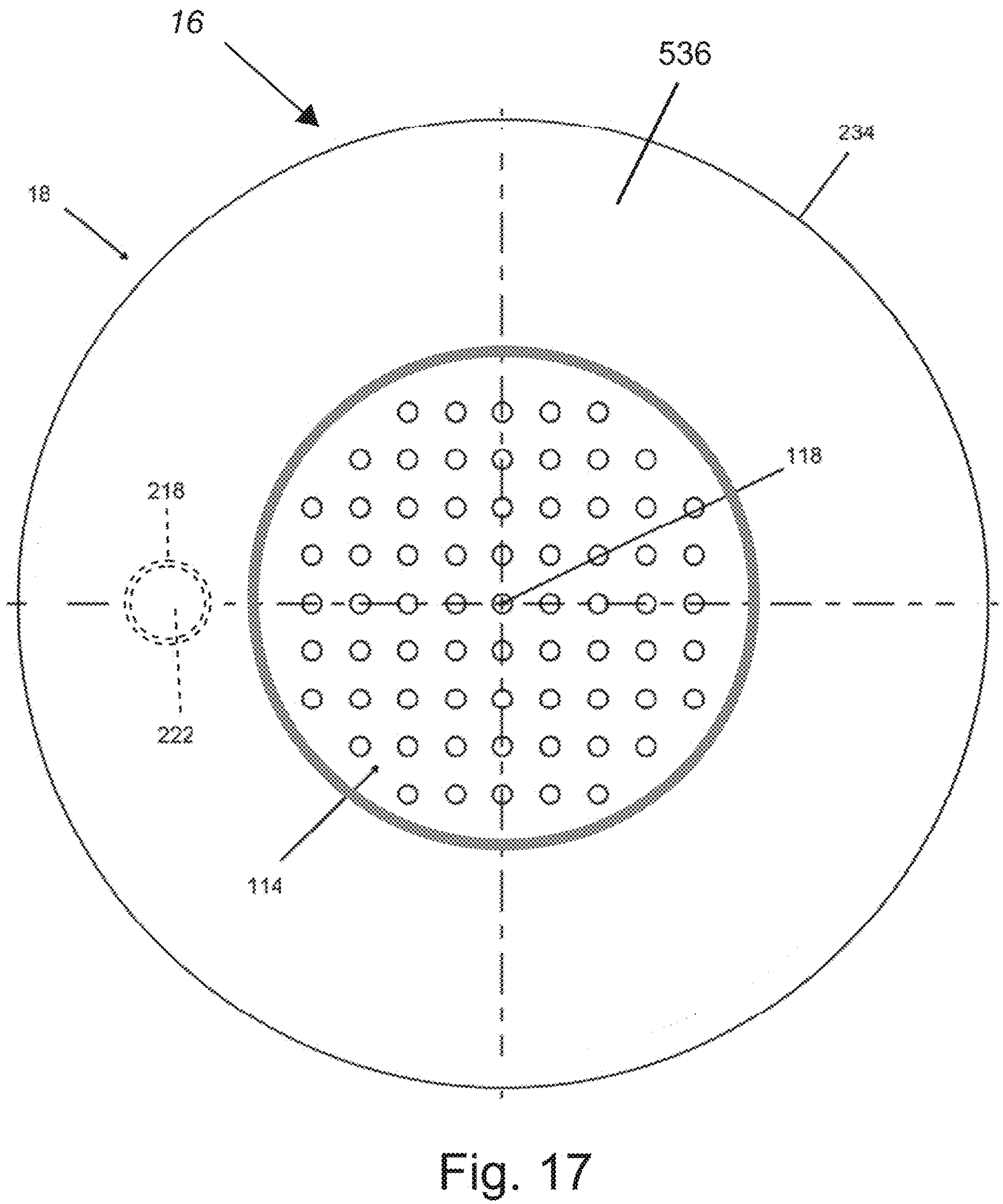
FIG. 17 is a front view of a second device and illustrates another alternative construction of an input component.

In an alternative construction (see FIG. 17), the ON/OFF button 218 (and/or the mode select button M) is covered by an elastomeric layer 536. In the illustrated construction, the layer 536 covers the face 212 radially outside of the speaker outlet 114. The button(s) 218, M are actuated through the layer 536. The layer 536 may also cover the interface between the face 212 and the housing 106 and the body of the housing 106. The layer 536 may improve sealing, gripping, etc., of the housing assembly. The layer 536 may also protect the second device 16, its components.

In some constructions (not shown), an input component may include a push button switch in the receptacle 94, for example, instead of the ON/OFF button 218, the mode selector M, etc. Such a button may be supported on the peak of the housing 106 or, in other constructions, in the bottom of the receptacle 94. Pushing the second device 16 into the receptacle 94 actuates the button. The control components 524 sense actuation of the button and control operation of the second device 16 and/or the remote source based on the user input.

Figure 18:
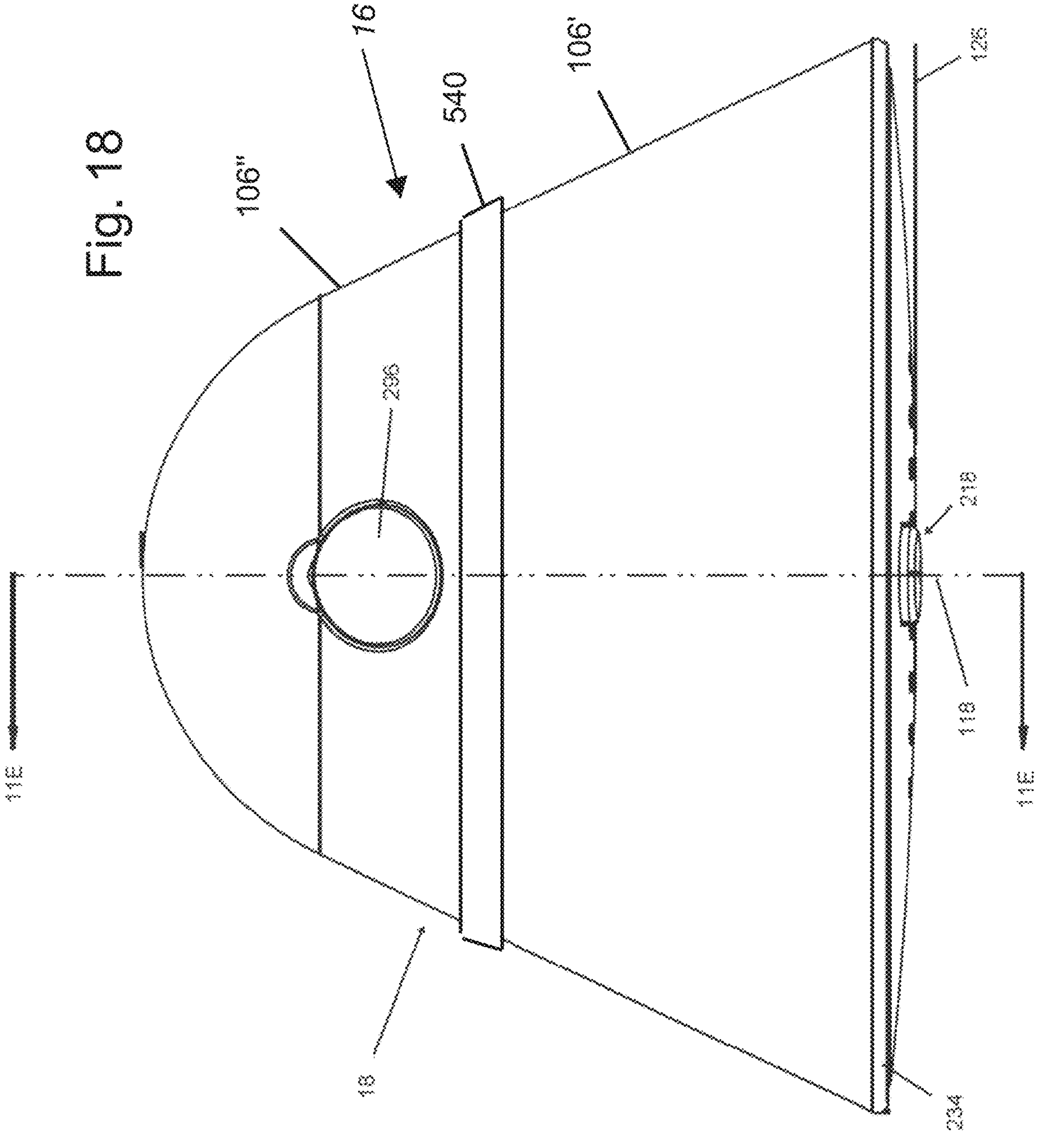
FIG. 18 is a side view of a second device and illustrates yet another alternative construction of an input component.

In another construction (see FIG. 18), the housing 106 may be constructed to provide an input component, for example, instead of the ON/OFF button 218, the mode selector M, etc. As shown in FIG. 18, the illustrated housing 106 is formed as an assembly including a front portion 106' and a rear portion 106" movable relative to one another.

To provide an input signal, the front portion 106' is moved relative to the rear portion 106" (e.g., by pushing the front portion 106' inwardly). The control components 524 sense relative movement between the housing portions 106', 106" and control operation of the second device 16 and/or the remote source based on the user input.

An intermediate member 540 connects the housing portions 106', 106" and seals the interface between the housing portions 106', 106". The intermediate member 540 is sufficiently flexible to allow relative movement between the housing portions 106', 106" to produce an input, while being sufficiently rigid to allow the housing 106 to house, protect, etc., the internal components of the second device 16.

In some constructions, the control components 524 may automatically control operation of the second device 16 and/or the remote source (e.g., in the case of a speaker 18, adjust the output volume based on one or more of the content, shower operation, ambient noise level, etc.). For example, the control components 524 may determine the content (e.g., music genre, conversation, etc.) being output, and, for certain content, the control components 524 may adjust the output to a preferred or optimal output level for the content. For example, the control components 524 may increase the volume for talk radio output which, compared to music, can be more difficult to hear when ambient noise levels interfere.

As another example, in a multi-function shower device, as discussed below, certain spray modes (e.g., pulse mode, aerated mode, cyclone mode, etc.) may create more noise than other modes (e.g., soft spray mode). The control components 524 may determine the shower mode (e.g., via a mode sensor or signal) and, based on the determined mode, set the output level of the second device 16 accordingly (louder for louder spray modes; quieter for quieter spray modes).

Additionally or alternatively, a sensor (e.g., a microphone) may be used to determine the ambient noise, and the control components 524 may adjust the output level based on the sensed ambient noise. In some constructions, based on a sensed input (e.g., a user singing along), the control components 524 may adjust other aspects of the output (e.g., auto-tune, add background beats, etc.).

In some constructions (see, e.g., FIG. 19), the shower device 14 may include structure to adjust the user experience (e.g., flow rate, shower mode, etc.) based on the output of the second device 16 and/or remote source. For example, the shower device 14 may include a selectively operated valve assembly operable to provide different flow rates, modes, etc. The valve assembly may be solenoid-controlled to open and close, to increase and decrease the flow rate. Based on the output, the control components 524 may control the valve assembly or communicate with shower control components to control the valve assembly (e.g., adding "beats" of water flow along with the beat of the music, decreasing/stopping flow during a phone conversation, etc.).

An example of a shower device and valve assembly and its operation are illustrated in U.S. Patent Application Publication No. US 2013/0092752 A1, published Apr. 18, 2013, the entire contents of which is hereby incorporated by reference.

Figure 19:
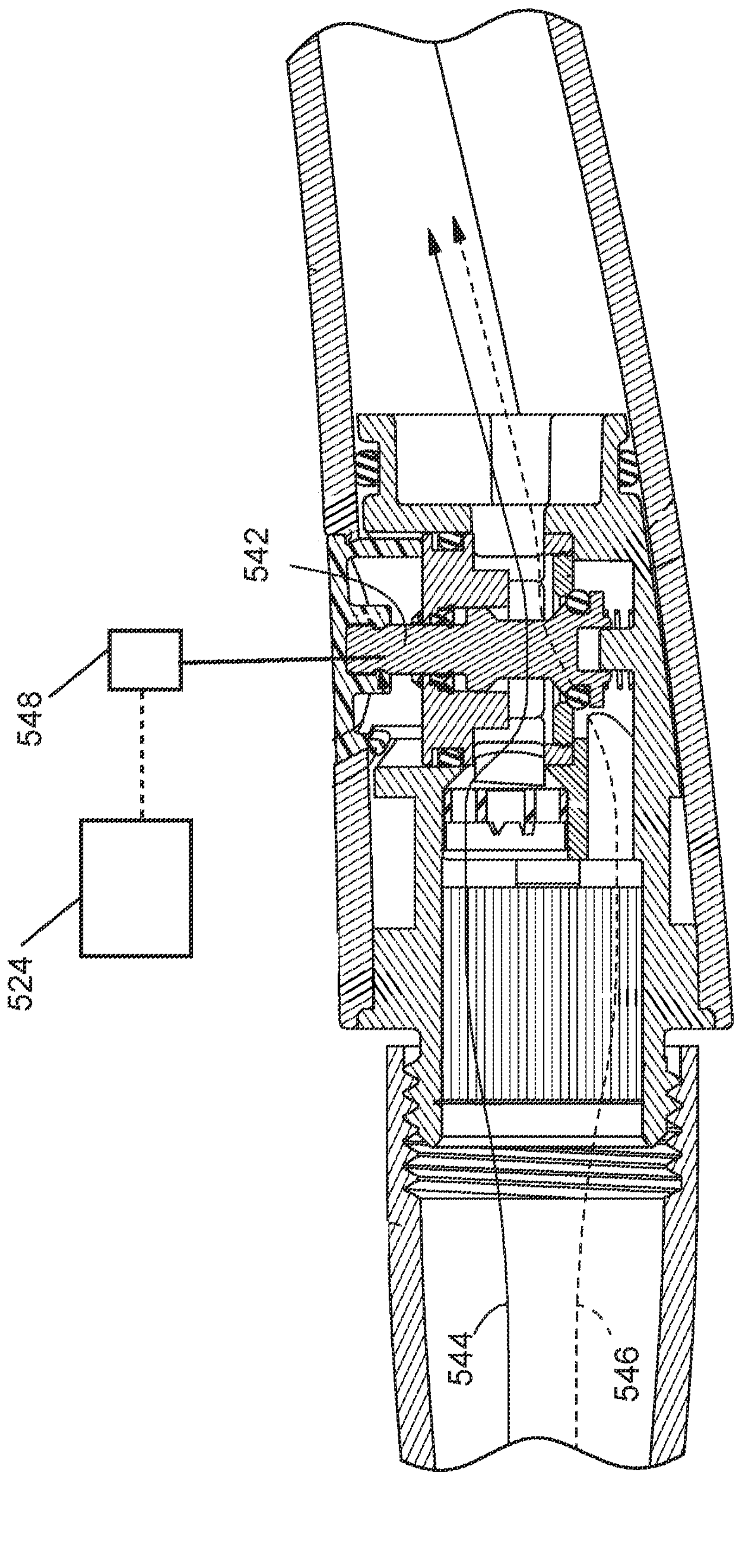
FIG. 19 is a side cross-sectional view of a portion of a shower device and a valve assembly.

FIG. 19 illustrates a shower device 14 with a solenoid-controlled valve assembly 542 controlled by the control components 524 to change the flow rate. In the illustrated construction, the shower device 14 includes a primary flow path 544 and a selectively openable supplemental flow path 546. The primary flow path 544 maintains a given flow rate suitable for most showering functions (wetting, warming, etc.). The supplemental flow path 546 combines with the primary flow path 544 to provide a higher flow rate.

In the illustrated construction, the supplemental flow path 546 is normally closed by the valve assembly 542. A solenoid 548, under control of the control components 524 controls the valve assembly 542. When the solenoid 548 opens the valve assembly 542, the flow rate increases, and, when the valve assembly 542 closes, the flow rate returns to the normal flow rate. The control components 524 can thus control the valve assembly 542 to increase and decrease the flow rate (e.g., adding "beats" of water flow along with the beat of the music, decreasing/stopping flow during a phone conversation, etc.). In other constructions (not shown), the solenoid-controlled valve assembly 542 may adjust flow in a single flow path (between no flow and the maximum flow through the flow path).

In some constructions (not shown), the second device 16 may include non-transitory memory (e.g., RAM) to, for example, store data to be output by the second device 16 to enable the second device 16 to operate autonomously. Data may be uploaded to the memory wirelessly (e.g., by Bluetooth, Wi-Fi, "Bump" application provided by Bump Technologies, Inc., etc.).

The second device 16 may also include software for operation of the second device 16. For example, the second device 16 may be able to pair with and "remember" multiple remote sources without requiring one remote source to be "forgotten" when another remote source is to be paired. The second device 16 may include multiple remote sources in a "speed-dial" directory. The second device 16 and/or the remote source may be re-named in the device menu so that the second device 16 and remote source can be paired even when other devices/sources are within range which may be particularly useful in facilities with many devices and users (e.g., hotels, hospitals, offices, gyms, etc.).

The second device 16 and a remote device may be paired by a "Bump" application. To facilitate pairing when multiple remote sources are used with the second device 16, any "auto-pairing" function may be disabled, enabling the second device 16 to pair to the closest remote source. Also, the last pairing for the second device 16 may be overridden so that the closest remote source can be paired.

In some constructions, the power source (e.g., the battery 138) of the second device 16 may be wirelessly charged (e.g., by inductive charging). In such constructions (see FIGS. 20A-20B), a charging stand 550 defines a recess 554 for receiving the second device 16. A primary coil 558 is supported in the stand 550 and is connected to a power source (e.g., AC line power) by a plug 562. The second device 16 (e.g., a speaker 18) includes a secondary coil 566. The second device 16 is supported in the stand 550, and, when the primary coil 558 is energized, the secondary coil 566 produces a current to inductively charge the power source (e.g., the battery 138) of the second device 16.

Examples of a wireless (induction) charging system and its operation to charge a battery are illustrated and described in U.S. Pat. No. 6,677,726, issued Jan. 13, 2004, and in U.S. Patent Application Publication No. US 2009/0052721 A1, published Feb. 26, 2009, the entire contents of both of which is hereby incorporated by reference.

In some constructions (see FIGS. 21A-21B), the second device 16 and the stand 550 provide an integrated charging system. The stand 550 includes contacts 580 connected through a power supply 584 to a power source (e.g., AC line power). The second device 16 includes contacts 588 engaging the stand contacts 580 when the second device 16 is supported by the stand 550. A power supply 592 is connected between the contacts 588 and the power source (e.g., the battery 138) of the second device 16, and, when the second device 16 is supported by the stand 550 and the stand 550 is connected to the external power source, the device power source (e.g., the battery 138) is charged. An exemplary charging system is provided in the touch screen remote and magnetic docking station for the Numi Comfort Heights® toilet sold by Kohler Co.

Figure 20A:
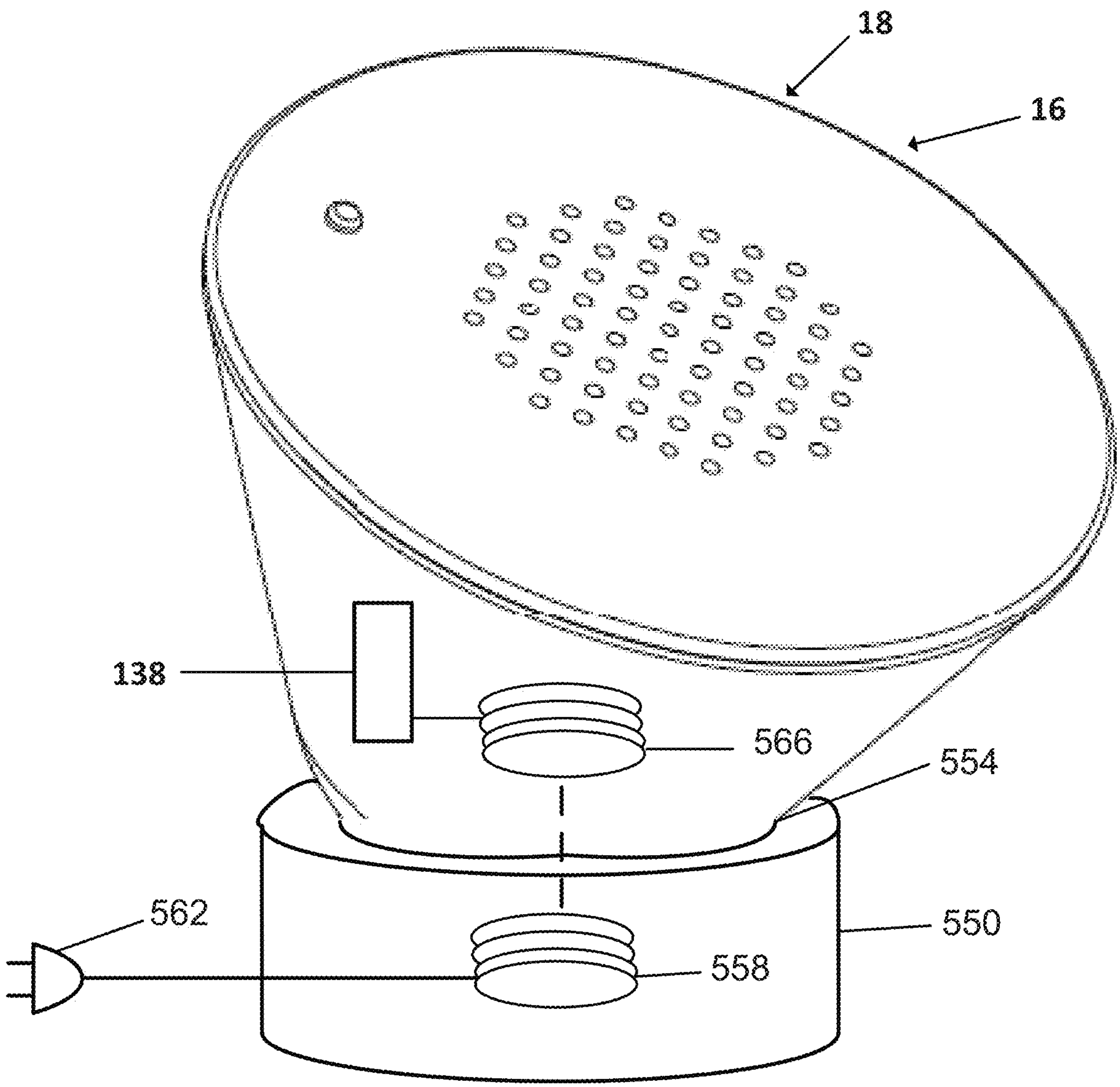
FIGS. 20A-20B are perspective views of a second device and a stand and schematically illustrate charging assemblies.
Figure 20B:
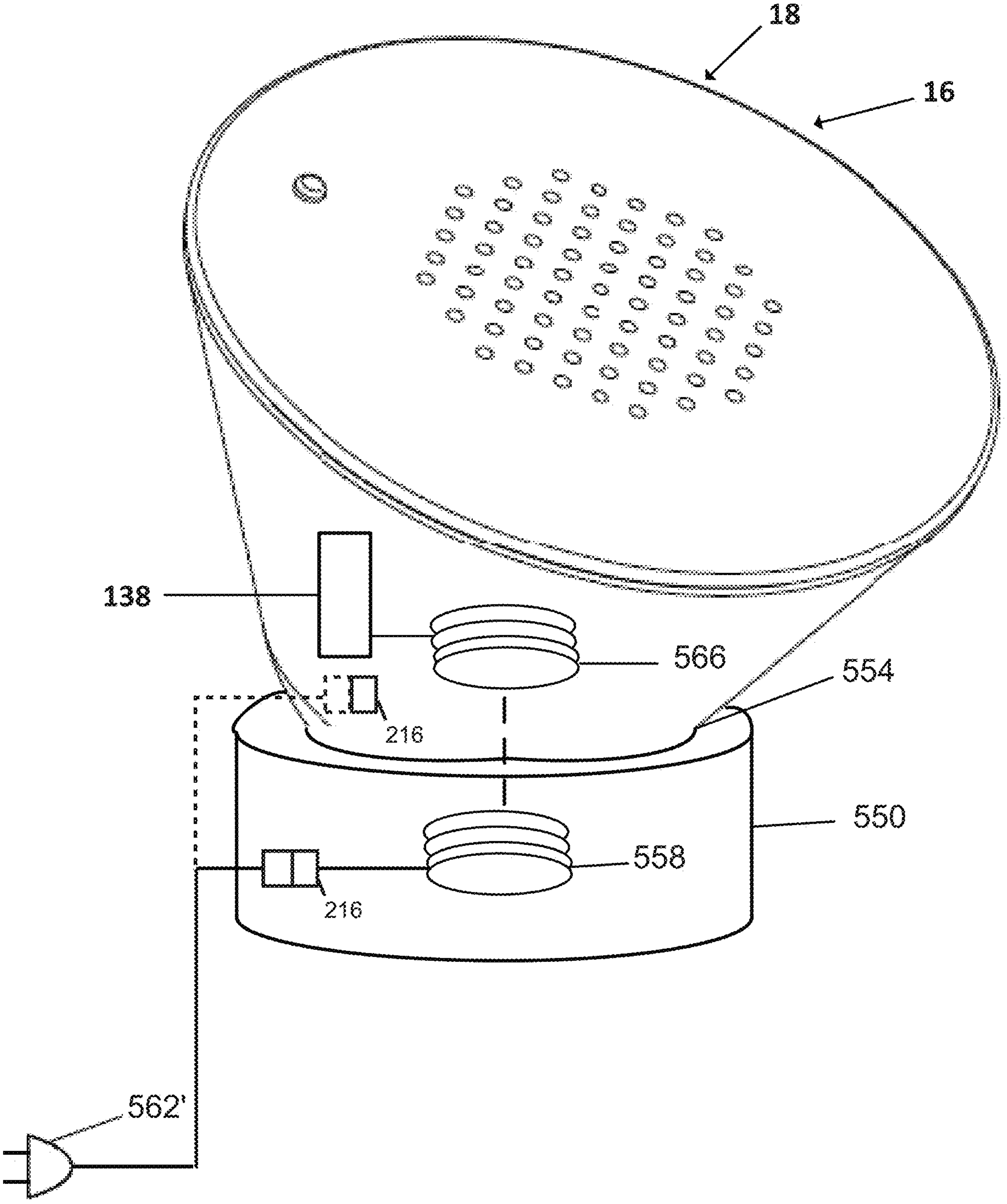
Figure 21A:
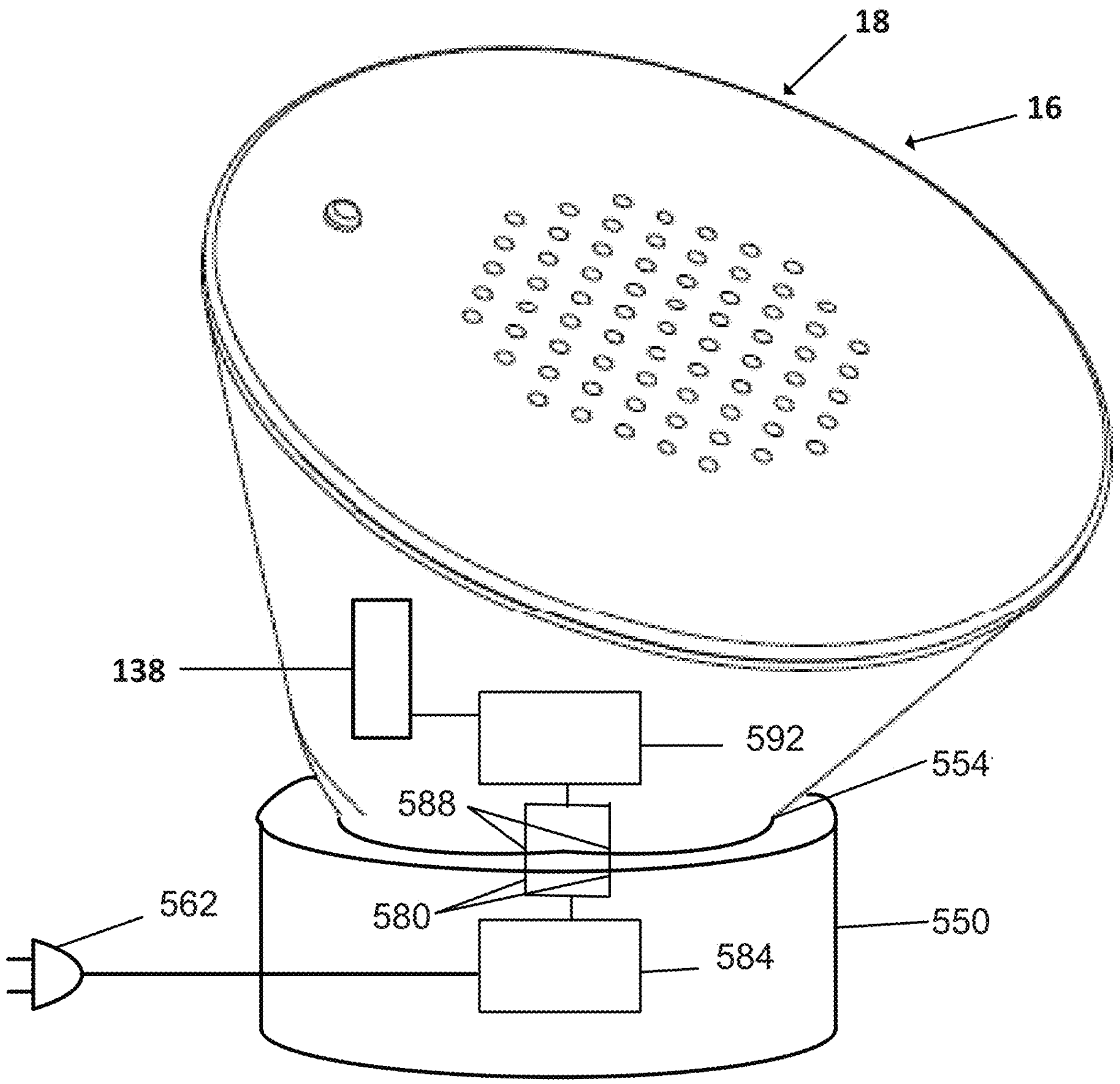
FIGS. 21A-21B are perspective views of a second device and a stand and schematically illustrate alternative constructions of charging assemblies.
Figure 21B:
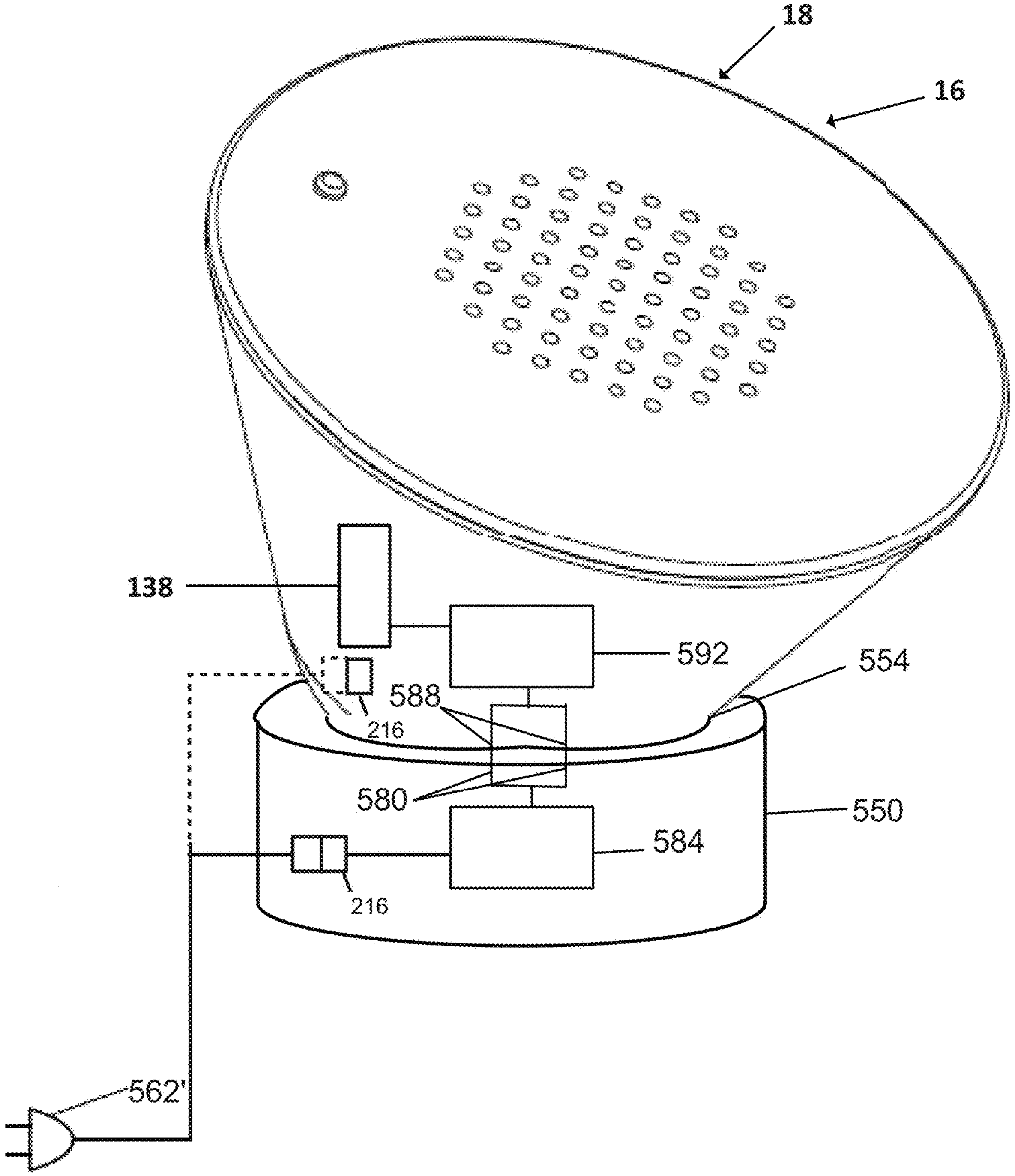

As shown in FIGS. 20B and 21B, the second device 16 may be charged on the stand 550 or by connection to an external power source (not shown) such as line power through a cord 562' (e.g., a removable power cord, USB cord, etc.). The 562' may be alternatively connectable to a port 216 (e.g., as described above) of the second device 16 or to a port 216 of the stand 550.

In some constructions, the second device 16 includes an indicator (not shown) for gauging battery life. The indicator may include a light, such as a light emitting diode (LED). The light may be integrated with the ON/OFF button 218 (e.g., the indicator 222). The indicator provides one indication (e.g., the light maintains a continuous predetermined color (e.g., blue)) when battery life is above a level (e.g., 10% of battery life). The indicator provides another indication (e.g., the light blinks a predetermined color (e.g., red)) when the battery life reaches or is below a predetermined level (e.g., 10% of battery life, about 15 minutes left, etc.).

Thus, the invention may generally provide an assembly of a speaker, a sensor operable to sense an orientation of a speaker housing; and control components operable to determine the orientation of the speaker housing and control speaker components based on the orientation of the speaker housing. An assembly may generally include a multi-mode shower device, and a speaker supportable by the shower device in a receptacle. A speaker supportable on a shower device may include a touch sensor. A speaker may include an input component arranged on the speaker to be positioned in the receptacle when the speaker is supported by the shower device.

Control components may determine a characteristic of the assembly and control the speaker components based on the characteristic. Control components may determine one of content of the audio output and a mode of the speaker and control a valve assembly to adjust the flow based on the one of the content and the mode.

A speaker may include a rechargeable power source and a stand to inductively charge the power source. A speaker may include s speaker electrical contact electrically connected to the stand electrical contact when the speaker is supported on the stand so that current may be suppliable from the external power source to charge the rechargeable power source.

One or more independent features and independent advantages of the invention may be set forth in the following claims:

The invention claimed is:

1. An assembly comprising:

a speaker including
- a speaker housing,
- a magnet operable to releasably retain the speaker on a support,
- speaker components supported in the speaker housing and operable to produce an audio output,
- a rechargeable power source operable to power the speaker components; and a stand operable to support the speaker, the stand including
- a stand housing, and
- a stand electrical circuit connectable to an external power source; and a shower device providing the support, the shower device including a magnetic connecting structure cooperating with the magnet to releasably couple the speaker to the shower device;

wherein the speaker and the stand are operable to perform a charging operation, the charging operation including the speaker supported on the stand and power supplied to the rechargeable power source, and wherein, during the charging operation, the speaker components are operable to produce the audio output.

2. The assembly of claim 1, wherein the speaker further includes a speaker electrical contact and a speaker electrical circuit electrically connected between the rechargeable power source and the speaker electrical contact, wherein the stand further includes a stand electrical contact electrically connected to a stand electrical circuit, and wherein the assembly further comprises a power cord removably, selectively and alternatively directly physically engageable to the stand electrical contact to electrically connect the external power source to the stand electrical circuit and to the speaker electrical contact to electrically connect the external power source to the speaker electrical circuit to charge the rechargeable power source.

3. The assembly of claim 2, wherein the speaker defines a speaker port, the speaker electrical contact being provided by the speaker port, and wherein the assembly further comprises a cover engageable with the speaker housing to selectively cover and uncover the speaker port, the speaker port being uncovered to connect with the power cord.

4. The assembly of claim 1, wherein the speaker includes a secondary coil, wherein the stand includes a primary coil connectable to the external power source, and wherein in the charging operation, the primary coil is energized and the secondary coil generates a current to charge the rechargeable power source.

5. The assembly of claim 1, wherein the speaker is supported by the stand in an orientation in which the audio output projects in a primary direction extending away from the stand.

6. The assembly of claim 1, wherein the stand defines a recess for receiving a portion of the speaker.

7. The assembly of claim 1, wherein the speaker includes an indicator configured to provide an indication relating to battery life of the rechargeable power source.

8. The assembly of claim 1, wherein the charging operation includes power supplied to the speaker passing from the external power source and through the stand electrical circuit.

9. An assembly comprising:

a speaker including
- a speaker housing,
- a magnet operable to releasably retain the speaker on a support,
- speaker components supported in the speaker housing and operable to produce an audio output,
- a rechargeable power source operable to power the speaker components, and
- a secondary coil;

a stand operable to support the speaker, the stand including
- a stand housing, and
- a primary coil connectable to an external power source; and a shower device providing the support, the shower device including a magnetic connecting structure cooperating with the magnet to releasably couple the speaker to the shower device;

wherein the speaker and the stand are operable to perform a charging operation, the charging operation including the speaker supported on the stand and power supplied to the rechargeable power source through the primary coil and the secondary coil, and wherein, during the charging operation, the speaker components are operable to produce the audio output.

10. The assembly of claim 9, wherein the secondary coil generates a current to charge the rechargeable power source through wireless induction.

11. The assembly of claim 9, wherein the speaker further includes a speaker electrical contact and a speaker electrical circuit electrically connected between the rechargeable power source and the speaker electrical contact, wherein the stand includes a stand electrical contact electrically connected to the primary coil, and wherein the assembly further comprises a power cord removably, selectively and alternatively directly physically engageable to the stand electrical contact to electrically connect the external power source to the primary coil and to a speaker electrical contact to electrically connect the external power source to the speaker electrical circuit to charge the rechargeable power source.

12. The assembly of claim 11, wherein the speaker defines a speaker port, the speaker electrical contact being provided by the speaker port, and wherein the assembly further comprises a cover engageable with the speaker housing to selectively cover and uncover the speaker port, the speaker port being uncovered to connect with the power cord.

13. The assembly of claim 9, wherein the speaker is supported by the stand in an orientation in which the audio output projects in a primary direction extending away from the stand.

14. The assembly of claim 9, wherein the stand defines a recess for receiving a portion of the speaker.

15. The assembly of claim 9, wherein the speaker includes an indicator configured to provide an indication relating to battery life of the rechargeable power source.

16. The assembly of claim 9, wherein the charging operation includes the external power source energizing the primary coil such that the secondary coil generates a current to charge the rechargeable power source.

* * * * *